(12) United States Patent
Tanji et al.

(10) Patent No.: US 12,486,357 B2
(45) Date of Patent: Dec. 2, 2025

(54) FLUORINE-CONTAINING ETHER COMPOUND, LUBRICANT FOR MAGNETIC RECORDING MEDIUM, AND MAGNETIC RECORDING MEDIUM

(71) Applicant: Resonac Corporation, Tokyo (JP)

(72) Inventors: Yutaka Tanji, Tokyo (JP); Daisuke Yagyu, Tokyo (JP)

(73) Assignee: Resonac Corporation, Tokyo (JP)

( * ) Notice: Subject to any disclaimer, the term of this patent is extended or adjusted under 35 U.S.C. 154(b) by 0 days.

(21) Appl. No.: 18/861,249

(22) PCT Filed: Sep. 29, 2023

(86) PCT No.: PCT/JP2023/035696
§ 371 (c)(1),
(2) Date: Oct. 29, 2024

(87) PCT Pub. No.: WO2024/071399
PCT Pub. Date: Apr. 4, 2024

(65) Prior Publication Data
US 2025/0282911 A1 Sep. 11, 2025

(30) Foreign Application Priority Data
Sep. 30, 2022 (JP) .................................. 2022-158422

(51) Int. Cl.
*C10M 107/38* (2006.01)
*C08G 65/00* (2006.01)
(Continued)

(52) U.S. Cl.
CPC ......... *C08G 65/007* (2013.01); *C10M 107/30* (2013.01); *C10M 107/38* (2013.01);
(Continued)

(58) Field of Classification Search
CPC ............ C08G 65/007; C08G 2650/48; C10M 107/30; C10M 107/38; C10M 2213/0606; G11B 5/7257; C10N 2040/18
See application file for complete search history.

(56) References Cited

U.S. PATENT DOCUMENTS 10,262,685 B2 4/2019 Pathem
10,540,997 B2 1/2020 Yang

FOREIGN PATENT DOCUMENTS

JP 6804981 B2 12/2020
WO 2016/084781 A1 6/2016
(Continued)

*Primary Examiner* — Taiwo Oladapo
(74) *Attorney, Agent, or Firm* — Sughrue Mion, PLLC

(57) ABSTRACT

A fluorine-containing ether compound represented by the following formula. $R^1-CH_2-R^2[-CH_2-R^3-CH_2-R^2]_x-CH_2-R^4$ (x is 1 or 2, $R^2$ is a perfluoropolyether chain, $R^3$ is represented by Formula (2), and $R^1$ and $R^4$ are each a terminal group having 1 to 50 carbon atoms, which has 1 to 4 polar groups, and in Formula (2), a1 and a2 are each 0 to 5, b is 0 or 1, and Y is an acyclic divalent saturated hydrocarbon group having 2 to 8 carbon atoms)

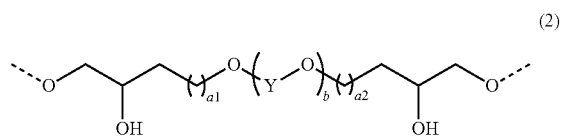

13 Claims, 1 Drawing Sheet

(51) Int. Cl.
*C10M 107/30* (2006.01)
*G11B 5/725* (2006.01)
*C10N 40/18* (2006.01)

(52) U.S. Cl.
CPC ........ *G11B 5/7257* (2020.08); *C08G 2650/48* (2013.01); *C10M 2213/0606* (2013.01); *C10N 2040/18* (2013.01)

(56) References Cited

FOREIGN PATENT DOCUMENTS

| | | |
|---|---|---|
| WO | 2018/147017 A1 | 8/2018 |
| WO | 2018/159250 A1 | 9/2018 |
| WO | 2021/019998 A1 | 2/2021 |
| WO | 2021/020066 A1 | 2/2021 |
| WO | 2021/065380 A1 | 4/2021 |
| WO | 2021/251335 A1 | 12/2021 |
| WO | 2022/113854 A1 | 6/2022 |

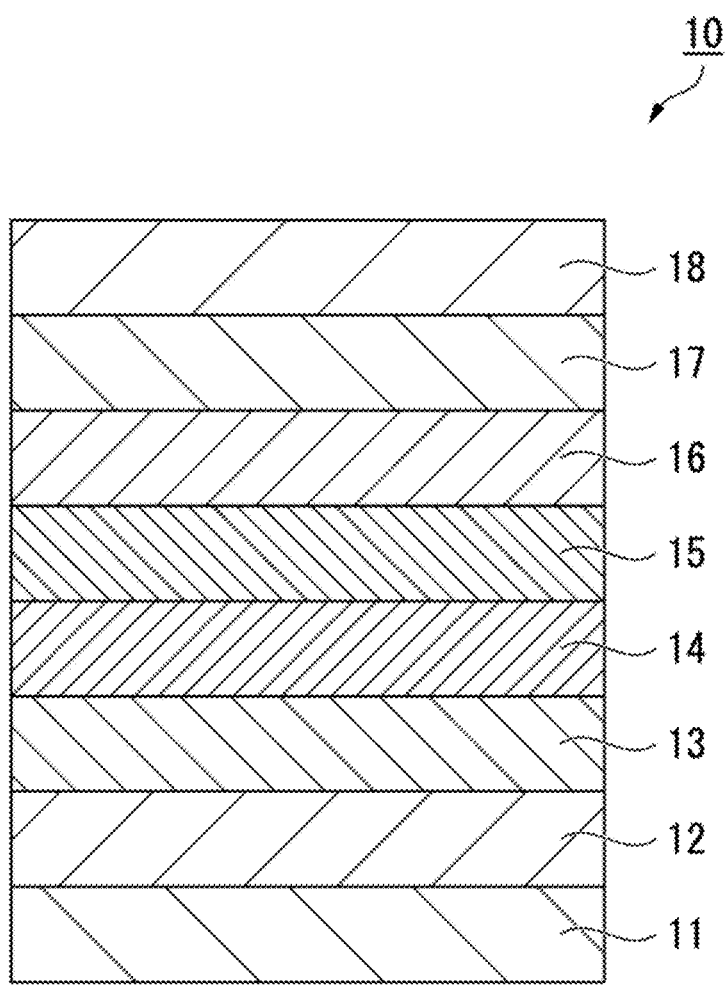

FLUORINE-CONTAINING ETHER COMPOUND, LUBRICANT FOR MAGNETIC RECORDING MEDIUM, AND MAGNETIC RECORDING MEDIUM

TECHNICAL FIELD

The present invention relates to a fluorine-containing ether compound, a lubricant for a magnetic recording medium, and a magnetic recording medium.

This is a National Stage of International Application No. PCT/JP2023/035696 filed Sep. 29, 2023, claiming priority based on Japanese Patent Application No. 2022-158422 filed Sep. 30, 2022, the content of which is incorporated herein by reference.

BACKGROUND ART

Development of a magnetic recording medium suitable for a high recording density has been advanced in order to increase a recording density in a magnetic recording and reproducing device.

In the related art, as the magnetic recording medium, there is a magnetic recording medium in which a recording layer is formed on a substrate and a protective layer made of carbon and the like is formed on the recording layer. The protective layer protects the information recorded in the recording layer and also improves the slidability of a magnetic head. However, the durability of the magnetic recording medium is not sufficiently obtained simply by providing the protective layer on the recording layer. Therefore, a lubricant is generally applied to a surface of the protective layer to form a lubricating layer.

As a lubricant used in a case of forming a lubricating layer of a magnetic recording medium, for example, a lubricant that contains a compound having a polar group such as a hydroxy group and an amino group at a terminal of a fluorine-based polymer having a repeating structure including $-CF_2-$ has been proposed.

For example, Patent Document 1 and Patent Document 2 disclose a fluorine-containing ether compound having a skeleton where two perfluoropolyether chains are bonded through divalent linking groups having methylene groups ($-CH_2-$) bonded to both ends of a glycerin structure ($-O-CH_2-CH(OH)-CH_2-O-$), in which terminal groups that are organic groups having a polar group are bonded to both terminals of the skeleton through the methylene groups.

Patent Document 3 and Patent Document 4 disclose a fluorine-containing ether compound having a skeleton where two perfluoropolyether chains are bonded through divalent linking groups including a methylene group ($-CH_2-$) and a group ($-CH(OH)-$) obtained by substituting one of hydrogen atoms of a methylene group with a hydroxy group, and having two hydroxy groups, in which terminal groups that are organic groups having a polar group are bonded to both terminals of the skeleton through the methylene groups.

Patent Document 5 discloses a fluorine-containing ether compound having a skeleton where two or three perfluoropolyether chains are bonded to each other through divalent linking groups including a methylene group ($-CH_2-$) and a group ($-CH(OH)-$) obtained by substituting one of hydrogen atoms of a methylene group with a hydroxy group, and having two hydroxy groups, in which terminal groups that are organic groups having a polar group are bonded to both terminals of the skeleton through the methylene groups.

Patent Document 6 and Patent Document 7 disclose a fluorine-containing ether compound having a skeleton where two perfluoropolyether chains are bonded to each other through divalent linking groups including a benzene ring or an alicyclic structure, in which terminal groups that are organic groups having a polar group and are bonded to both terminals of the skeleton through methylene groups ($-CH_2-$).

Patent Document 8 discloses a fluorine-containing ether compound in which perfluoropolyether chains are bonded to both terminals of a chain-like structure consisting of a difluoromethylene group ($-CF_2-$) through a linking group including at least one polar group, and a structural unit having a hydroxy group is bonded to a terminal of the perfluoropolyether chain.

CITATION LIST

Patent Documents

Patent Document 1: U.S. Pat. No. 10,540,997 (B)
Patent Document 2: PCT International Publication No. WO2021/251335 (A)
Patent Document 3: PCT International Publication No. WO2021/020066 (A)
Patent Document 4: Japanese Patent No. 6804981 (B)
Patent Document 5: U.S. Pat. No. 10,262,685 (B)
Patent Document 6: PCT International Publication No. WO2021/065380 (A)
Patent Document 7: PCT International Publication No. WO2022/113854 (A)
Patent Document 8: PCT International Publication No. WO2018/159250A (A)

SUMMARY OF INVENTION

Technical Problem

In recent years, it is required to further reduce a magnetic spacing (a distance between a magnetic head and a magnetic layer of a magnetic recording medium) in order to increase the capacity of the magnetic recording medium. Therefore, it is required to further reduce a thickness of a lubricating layer in the magnetic recording medium.

However, in general, in a case where the thickness of the lubricating layer is reduced, the corrosion resistance of the magnetic recording medium tends to be decreased. In addition, in a case where spin-off (a phenomenon in which a lubricant scatters or evaporates due to a centrifugal force and heat generated in association with rotation of the magnetic recording medium) occurs by reduction in the thickness of the lubricating layer, it is impossible to maintain a sufficient film thickness to satisfy the function of the lubricating layer.

The present invention has been made in view of the circumstances, and an object of the present invention is to provide a fluorine-containing ether compound, which can form a lubricating layer having excellent corrosion resistance and capable of suppressing spin-off, and can thus be suitably used as a material for a lubricant for a magnetic recording medium.

Another object of the present invention is to provide a lubricant for a magnetic recording medium capable of forming a lubricating layer which includes the fluorine-containing ether compound of the present invention and has good corrosion resistance and a high spin-off suppressing effect.

Still another object of the present invention is to provide a magnetic recording medium which has a lubricating layer including the fluorine-containing ether compound of the present invention, and has good corrosion resistance and a high spin-off suppressing effect.

Solution to Problem

The present invention includes the following aspects.

[1] A fluorine-containing ether compound represented by Formula (1).

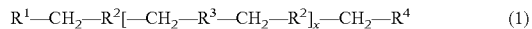

(in Formula (1), x represents 1 or 2; $R^2$ is a perfluoropolyether chain; (x+1) pieces of $R^2$'s may be partially or entirely the same as or different from each other; $R^3$ is a divalent linking group represented by Formula (2); in a case where x is 2, two $R^3$'s may be the same as or different from each other; $R^1$ and $R^4$ are each a terminal group having 1 to 50 carbon atoms, which has 1 to 4 polar groups; and $R^1$ and $R^4$ may be the same as or different from each other)

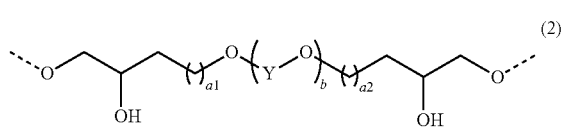

(in Formula (2), a1 and a2 each represent an integer of 0 to 5; a1 and a2 may be the same as or different from each other, and at least one of a1 and a2 is 1 or more; b represents 0 or 1; Y is an acyclic divalent saturated hydrocarbon group having 2 to 8 carbon atoms; the saturated hydrocarbon group is a partially fluorinated saturated hydrocarbon group which does not include an ether oxygen atom between carbon atoms, or a non-fluorinated saturated hydrocarbon group which may include an ether oxygen atom between carbon atoms and may have only one polar group, provided that in a case where the non-fluorinated saturated hydrocarbon group has the polar group, the polar group is bonded to a carbon atom other than a bonding terminal of Y; and an oxygen atom at a left terminal of Formula (2) is bonded to a methylene group on an $R^1$ side in Formula (1), and an oxygen atom at a right terminal is bonded to a methylene group on an $R^4$ side in Formula (1)).

[2] The fluorine-containing ether compound according to [1],
in which Formula (2) is a linking group represented by any of Formulae (2-1) to (2-5).

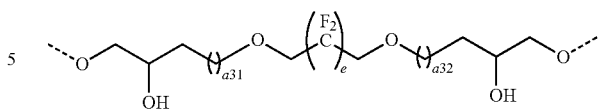

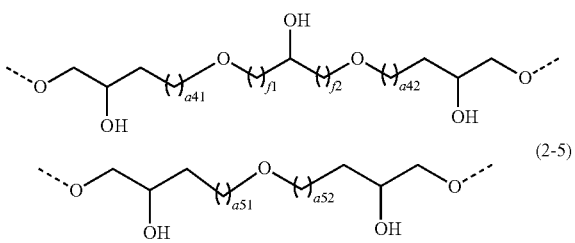

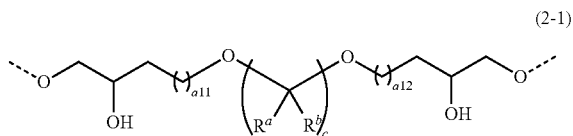

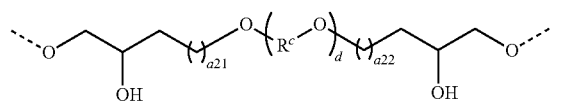

(in Formula (2-1), a11 and a12 each represent an integer of 0 to 5; a11 and a12 may be the same as or different from each other; a total value of a11 and a12 is 1 to 6; c represents an integer of 2 to 8; c pieces of $R^a$'s and $R^b$'s each independently represent a hydrogen atom or a methyl group; a total number of carbon atoms included in the c pieces of ($—CR^aR^b—$)'s is 2 to 8; and an oxygen atom at a left terminal of Formula (2-1) is bonded to the methylene group on the $R^1$ side in Formula (1), and an oxygen atom at a right terminal is bonded to the methylene group on the $R^4$ side in Formula (1))

(in Formula (2-2), a21 and a22 each represent an integer of 0 to 5; a21 and a22 may be the same as or different from each other; a total value of a21 and a22 is 1 to 6; d represents an integer of 2 to 4; d pieces of $R^c$'s each independently represent $—CH_2CH_2—$, $—CH_2CH_2CH_2—$, $—CH(CH_3)CH_2—$, or $—CH_2CH(CH_3)—$; a total number of carbon atoms included in the d pieces of $R^c$'s is 4 to 8; and an oxygen atom at a left terminal of Formula (2-2) is bonded to the methylene group on the $R^1$ side in Formula (1), and an oxygen atom at a right terminal is bonded to the methylene group on the $R^4$ side in Formula (1))

(in Formula (2-3), a31 and a32 each represent an integer of 0 to 5; a31 and a32 may be the same as or different from each other; a total value of a31 and a32 is 1 to 6; e represents an integer of 1 to 6; and an oxygen atom at a left terminal of Formula (2-3) is bonded to the methylene group on the $R^1$ side in Formula (1), and an oxygen atom at a right terminal is bonded to the methylene group on the $R^4$ side in Formula (1))

(in Formula (2-4), a41 and a42 each represent an integer of 1 to 5; a41 and a42 may be the same as or different from each other; a total value of a41 and a42 is 2 to 6; f1 and f2 each represent an integer of 1 to 6; f1 and f2 may be the same as or different from each other, and a total value of f1 and f2 is 2 to 7; and an oxygen atom at a left terminal of Formula (2-4) is bonded to the methylene group on the $R^1$ side in Formula (1), and an oxygen atom at a right terminal is bonded to the methylene group on the $R^4$ side in Formula (1))

(in Formula (2-5), a51 and a52 each represent an integer of 0 to 5; a51 and a52 may be the same as or different from each other; a total value of a51 and a52 is 1 to 6; and an oxygen atom at a left terminal of Formula (2-5) is bonded to the methylene group on the $R^1$ side in Formula (1), and an oxygen atom at a right terminal is bonded to the methylene group on the $R^4$ side in Formula (1))

[3] The fluorine-containing ether compound according to [1] or [2], in which $R^1$ and $R^4$ in Formula (1) are each independently a terminal group represented by Formula (3).

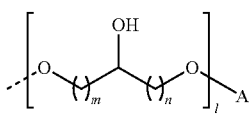

(in Formula (3), l represents an integer of 1 to 3; 1 pieces of m's each independently represent an integer of 1 to 6; 1 pieces of n's each independently represent an integer of 1 to 6; in one repeating unit, at least one of m and n is 1; and A represents an alkyl group which may have a polar group, an organic group including a carbon-carbon unsaturated bond, which may have a polar group, or a hydrogen atom))

[4] The fluorine-containing ether compound according to any one of [1] to [3], in which $R^1$ and $R^4$ in Formula (1) are each independently a terminal group represented by Formula (3-1) or (3-2).

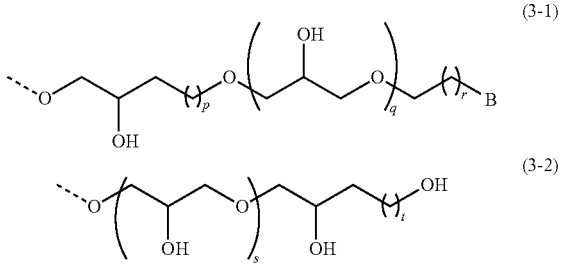

(in Formula (3-1), p represents an integer of 0 to 3, q represents an integer of 0 to 2, and r represents an integer of 1 to 5; a total value of p and r is 1 to 5; and B represents a polar group)

(in Formula (3-2), s represents an integer of 0 to 2, and t represents an integer of 1 to 5).

[5] The fluorine-containing ether compound according to any one of [1] to [4], in which $R^1$ and $R^4$ in Formula (1) are the same as each other.

[6] The fluorine-containing ether compound according to any one of [1] to [5], in which a total number of the polar groups contained in $R^1$ and the polar groups contained in $R^4$ in Formula (1) is 2 to 6.

[7] The fluorine-containing ether compound according to any one of [1] to [6], in which all of the polar groups contained in $R^1$, the polar groups contained in $R^3$, and the polar groups contained in $R^4$ in Formula (1) are hydroxy groups.

[8] The fluorine-containing ether compound according to any one of [1] to [7], in which the (x+1) pieces of $R^2$'s in Formula (1) are each independently a perfluoropolyether chain represented by Formula (4).

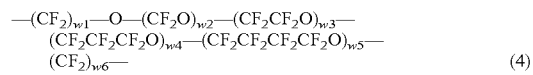

(in Formula (4), w2, w3, w4, and w5 each indicate an average degree of polymerization and each independently represent 0 to 20, provided that all of w2, w3, w4, and w5 are not 0 at the same time; w1 and w6 are each an average value indicating the number of $CF_2$'s and each independently represent 1 to 3; and ($CF_2O$), ($CF_2CF_2O$), ($CF_2CF_2CF_2O$), and ($CF_2CF_2CF_2CF_2O$), which are repeating units in Formula (4), is not particularly limited in the sequence order)

[9] The fluorine-containing ether compound according to any one of [1] to [7], in which the (x+1) pieces of $R^2$'s in Formula (1) are each independently any one selected from perfluoropolyether chains represented by Formulae (4-1) to (4-4).

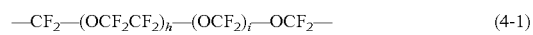

(in Formula (4-1), h and i each indicate an average degree of polymerization, h represents 1 to 20, and i represents 0 to 20)

(in Formula (4-2), j indicates an average degree of polymerization and represents 1 to 15)

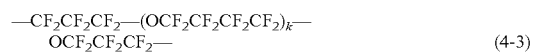

(in Formula (4-3), k indicates an average degree of polymerization and represents 1 to 10)

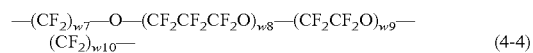

(in Formula (4-4), w8 and w9 each indicate an average degree of polymerization and each independently represent 1 to 20; and w7 and w10 are each an average value indicating the number of $CF_2$'s and each independently represent 1 or 2)

[10] The fluorine-containing ether compound according to any one of [1] to [9], in which the fluorine-containing ether compound has a number-average molecular weight in a range of 500 to 10,000.

[11] A lubricant for a magnetic recording medium, including:

the fluorine-containing ether compound according to any one of [1] to [10].

[12] A magnetic recording medium including, in the following order, on a substrate, at least:

a magnetic layer;

a protective layer; and a lubricating layer, in which the lubricating layer includes the fluorine-containing ether compound according to any one of [1] to [10].

[13] The magnetic recording medium according to [12], in which an average film thickness of the lubricating layer is 0.5 nm to 2.0 nm.

Advantageous Effects of Invention

The fluorine-containing ether compound of the present invention is a compound represented by Formula (1) and is suitable as a material for a lubricant for a magnetic recording medium.

Since the lubricant for a magnetic recording medium of the present invention includes the fluorine-containing ether compound of the present invention, it is possible to form a lubricating layer having good corrosion resistance and a high spin-off suppressing effect.

The magnetic recording medium of the present invention includes a lubricating layer including the fluorine-containing ether compound of the present invention. Therefore, the magnetic recording medium of the present invention has good corrosion resistance and a high spin-off suppressing effect, and excellent reliability and durability. In addition, since the magnetic recording medium of the present invention has a lubricating layer having good corrosion resistance and suppressed spin-off, the thickness of the lubricating layer can be reduced and the floating amount of a magnetic head can be further reduced.

BRIEF DESCRIPTION OF DRAWINGS

The FIGURE is a schematic cross-sectional view showing an embodiment of the magnetic recording medium of the present invention.

DESCRIPTION OF EMBODIMENTS

The present inventors have conducted extensive studies as shown below in order to accomplish the objects.

In the related art, a fluorine-containing ether compound having polar groups such as a hydroxy group at a terminal and a central part of a chain-like structure has been preferably used as a material for a lubricant for a magnetic recording medium (which may hereinafter be simply referred to as a "lubricant") which is applied onto a surface of a protective layer. The polar groups in the fluorine-containing ether compound are bonded to active points on the protective layer to improve the adhesion of the lubricating layer to the protective layer.

However, in a case where a lubricating layer of thin thickness is formed on the protective layer, using a lubricant including the fluorine-containing ether compound in the related art, it is difficult to realize a lubricating layer having good corrosion resistance and a high spin-off suppressing effect, as shown below.

In a case where a fluorine-containing ether compound in which divalent linking groups having a hydroxy group are arranged among a plurality of perfluoropolyether chains is used, the hydroxy group contained in the divalent linking group is inhibited from being adsorbed to the protective layer by the bulky perfluoropolyether chains arranged on both neighboring sides of the divalent linking group. In a case where the divalent linking group arranged between the perfluoropolyether chains has only one hydroxy group, the hydroxy group contained in the divalent linking group may be inhibited from being adsorbed to the protective layer by the perfluoropolyether chain, and the divalent linking group may be unable to be involved in the interaction with an active point on the protective layer.

Moreover, in a fluorine-containing ether compound in which a divalent linking group having a rigid structure is arranged among a plurality of perfluoropolyether chains, even in a case where the divalent linking group has a plurality of hydroxy groups, the hydroxy groups contained in the divalent linking group may be unable to be involved in the interaction with an active point on the protective layer. This is because since the divalent linking group having a rigid structure cannot move freely, it may move by the linkage with the perfluoropolyether chains arranged on both neighboring sides of the divalent linking group, and may be detached from the protective layer in a case where the perfluoropolyether chains move molecularly.

Moreover, even in a fluorine-containing ether compound in which a flexible divalent linking group having a plurality of hydroxy groups is arranged among a plurality of perfluoropolyether chains, in a case where the plurality of hydroxy groups contained in the divalent linking group are in close proximity to each other, the hydroxy groups are likely to interact with each other in the molecule. As a result, the hydroxy groups contained in the divalent linking group arranged between the perfluoropolyether chains are not likely to be involved in the interaction with polar groups included in other fluorine-containing ether compound molecules present in the lubricating layer.

In this way, in a case where the fluorine-containing ether compound included in the lubricant includes a polar group which is not involved in <1> an interaction with an active point on the protective layer or <2> an interaction with a polar group included in another fluorine-containing ether compound present in the lubricating layer, water which causes corrosion is likely to be incorporated in the vicinity of the polar group. In addition, in a case where the adhesion between the lubricating layer and the protective layer is insufficient, the lubricant in the lubricating layer is more likely to scatter or evaporate due to centrifugal force and heat generation associated with the rotation of the magnetic recording medium. Therefore, in a case where the polar group in the fluorine-containing ether compound included in the lubricant is not likely to be involved in the interaction of <1> or <2>, the corrosion resistance and the spin-off suppressing effect of the lubricating layer are poor.

Therefore, the present inventors have focused on the polar group in the fluorine-containing ether compound included in the lubricating layer, and the interactions of <1> and <2>, and have conducted extensive studies.

As a result, the present inventors have found that the fluorine-containing ether compound may be a fluorine-containing ether compound in which divalent linking groups linking a plurality of perfluoropolyether chains through methylene groups (—$CH_2$—) have a structure represented by Formula (2) consisting of specific two unit structures and a specific linked structure arranged between the specific two unit structures, in which terminal groups having a polar group are contained at both terminals of the molecule.

In the two unit structures included in the divalent linking group represented by Formula (2), an ether oxygen atom (—O—), a methylene group (—$CH_2$—), and a methylene group (—CH(OH)—) in which one hydrogen atom is substituted with a hydroxy group are bonded in this order from the terminal side of the divalent linking group. Furthermore, the linked structure arranged between the two unit structures consists of an alkylene group having 1 to 6 carbon atoms, bonded to each unit structure, and a linking group including an ether oxygen atom, which is arranged between the alkylene groups ("—O—(—Y—O—)$_b$— (b is 0 or 1)" in Formula (2)). At least one of the two alkylene groups contained in the linked structure has 2 to 6 carbon atoms. In addition, the linking group including an ether oxygen atom is a linking group in which only the ether oxygen atom is present, or an acyclic saturated hydrocarbon group (Y in Formula (2)) having 2 to 8 carbon atoms is arranged between two ether oxygen atoms. In a case where the acyclic saturated hydrocarbon group is a non-fluorinated saturated hydrocarbon group, it may have only one polar group. With the fluorine-containing ether compound having a divalent linking group represented by Formula (2), the following actions and functions (a) to (d) are obtained.

(a) The two unit structures each have hydroxy groups which are polar groups. In addition, in a case where a linking group including an ether oxygen atom of a linked structure arranged between the two unit structures includes an acyclic and non-fluorinated saturated hydrocarbon group (Y in Formula (2)) and the saturated hydrocarbon group has only one polar group, one polar group is also contained between the two unit structures. Therefore, the divalent linking group represented by Formula (2) has two or three polar groups which can be involved in the interaction with an active point on the protective layer. Accordingly, for example, even in a case where some of the polar groups included in the divalent linking group represented by Formula (2) are inhibited from being adsorbed to the protective layer by the bulky perfluoropolyether chains arranged on both neighboring sides of the divalent linking group represented by Formula (2), the divalent linking group represented by Formula (2) can be involved in the interaction with an active point on the protective layer.

(b) In each unit structure, an ether oxygen atom which imparts flexibility, a methylene group which provides rigidity, and a methylene group obtained by substituting one of hydrogen atoms with a hydroxy group are arranged in this order from the perfluoropolyether chain side. In addition, the linked structure arranged between the two unit structures consists of two alkylene groups having 1 to 6 carbon atoms, which provides rigidity, and a linking group ("—O—(—Y—O—)$_b$— (b is 0 or 1)" in Formula (2)) including an ether oxygen atom, which is arranged between the two alkylene groups and imparts flexibility, and at least one alkylene group of the two alkylene groups has 2 to 6 carbon atoms. In addition, the linking group including an ether oxygen atom is a linking group in which only the ether oxygen atom imparting flexibility is present, or an acyclic saturated hydrocarbon group (Y in Formula (2)) having 2 to 8 carbon atoms is arranged between two ether oxygen atoms. Therefore, the divalent linking group represented by Formula (2) has moderate flexibility, and there is no hindrance of the motion of each unit structure due to a highly rigid structure of the divalent linking group represented by Formula (2). As a result, the hydroxy groups contained in each unit structure can each move independently and freely, and can easily interact with active points on the protective layer or with the polar groups included in other fluorine-containing ether compounds present in the lubricating layer.

(c) The hydroxy groups contained in each unit structure are sufficiently separated from each other by two alkylene groups having 1 to 6 carbon atoms (at least one of the two alkylene groups has 2 to 6 carbon atoms) contained in a linked structure arranged between the two unit structures and a linking group including an ether oxygen atom ("—O—(—Y—O—)$_b$— (b is 0 or 1)" in Formula (2)) arranged therebetween.

More specifically, in a case where the linking group including an ether oxygen atom is only an ether oxygen atom, at least 6 atoms including an alkylene group having 1 to 6 carbon atoms, an ether oxygen atom, and an alkylene group having 2 to 6 carbon atoms, are present between the hydroxy groups contained in the two unit structures. Therefore, the hydroxy groups contained in each of the two unit structures are not likely to interact with each other.

Moreover, in a case where the linking group including an ether oxygen atom is a linking group in which an acyclic saturated hydrocarbon group having 2 to 8 carbon atoms and not including a polar group is arranged between two ether oxygen atoms, two or more ether oxygen atoms, which impart flexibility, are included between the hydroxy groups contained in the two unit structures. However, in this case, at least 8 atoms including an alkylene group having 1 to 6 carbon atoms, an atom in a linking group including an ether oxygen atom, and an alkylene group having 2 to 6 carbon atoms, are present between the hydroxy groups contained in the two unit structures. In addition, the acyclic saturated hydrocarbon group having 2 to 8 carbon atoms and not including a polar group is moderately bulky and is arranged between two ether oxygen atoms. Thus, even in a case where two or more ether oxygen atoms are included between the two unit structures, the hydroxy groups contained in each of the two unit structures are not likely to interact with each other.

Moreover, in a case where the linking group including an ether oxygen atom is a linking group in which an acyclic and non-fluorinated saturated hydrocarbon group having 2 to 8 carbon atoms is arranged between two ether oxygen atoms, and the saturated hydrocarbon group has only one polar group, the polar group is bonded to a carbon atom other than a bonding terminal of the saturated hydrocarbon group. In this case, the polar group in the linking group including the ether oxygen atom and the hydroxy group contained in the at least one of unit structures are sufficiently separated from each other. Specifically, at least 6 atoms including atoms in the alkylene group having 2 to 6 carbon atoms and the linking group including an ether oxygen atom are present between the polar group in the linking group including an ether oxygen atom and a hydroxy group contained in at least one of unit structures. Therefore, the polar group in the linking group including an ether oxygen atom and the hydroxy group contained in at least one of unit structures are not likely to interact with each other.

Thus, the hydroxy groups included in the divalent linking group represented by Formula (2) are not likely to interact with each other within the same fluorine-containing ether compound molecule.

(d) The linked structure arranged between the two unit structures has two alkylene groups having 1 to 6 carbon atoms, and at least one of the two alkylene groups contained in the linked structure has 2 to 6 carbon atoms to impart hydrophobicity. Therefore, the divalent linking group represented by Formula (2) can suppress the incorporation of water which causes corrosion.

With the fluorine-containing ether compound having a divalent linking group represented by Formula (2), the actions and functions of (a) to (c) are obtained, from which it is presumed that the compound is likely to be involved in the interactions of <1> and <2>. The interaction between the polar group included in the divalent linking group represented by Formula (2) and <1> contributes to the improvement of adhesion between the lubricating layer and the protective layer. In addition, the interaction between the polar group included in the divalent linking group represented by Formula (2) and <2> is an intermolecular interaction with other fluorine-containing ether compounds, and contributes to the formation of a film which is dense and is not likely to be separated from the protective layer. Therefore, the lubricating layer including the fluorine-containing ether compound is dense and not likely to be separated, and has high adhesion to the protective layer, and thus, spin-off is not likely to occur. In addition, since a polar group which is not involved in the interactions of <1> and <2> is present, the incorporation of water is not likely to occur and the corrosion resistance is good.

Furthermore, in the fluorine-containing ether compound having a divalent linking group represented by Formula (2), the actions and the functions of (d) can be obtained, which makes it possible to form a lubricating layer having good corrosion resistance.

Moreover, in the fluorine-containing ether compound, the perfluoropolyether chain is arranged between the terminal group having a polar group and the divalent linking group represented by Formula (2). Therefore, the interaction between the polar group in the terminal group and the polar group in the divalent linking group in the molecule is suppressed by the perfluoropolyether chain, and the terminal group and the linking group can interact with the protective layer each independently. Thus, two or three perfluoropolyether chains have a terminal group or a linking group at both ends thereof, which can interact with the protective layer. Therefore, the fluorine-containing ether compound can suppress the perfluoropolyether chain in the fluorine-containing ether compound from floating up and becoming bulky, and can form a lubricating layer of even thinner thickness. In other words, the lubricating layer including the fluorine-containing ether compound can maintain the function as a lubricating layer even in a case where the thickness is small.

Furthermore, the present inventors have confirmed that by using the lubricant including the fluorine-containing ether compound, it is possible to form a lubricating layer having good corrosion resistance and a high spin-off suppressing effect even in a case where the thickness is small, thereby leading to the present invention.

Hereinafter, the fluorine-containing ether compound, the lubricant for a magnetic recording medium, and the magnetic recording medium of the present invention will be described in detail. Furthermore, the present invention is not limited to embodiments shown below.

[Fluorine-Containing Ether Compound]

The fluorine-containing ether compound of the present embodiment is represented by Formula (1).

$$R^1-CH_2-R^2[-CH_2-R^3-CH_2-R^2]_x-CH_2-R^4 \quad (1)$$

(in Formula (1), x represents 1 or 2; $R^2$ is a perfluoropolyether chain; (x+1) pieces of $R^2$'s may be partially or entirely the same as or different from each other; $R^3$ is a divalent linking group represented by Formula (2); in a case where x is 2, two $R^3$'s may be the same as or different from each other; $R^1$ and $R^4$ are each a terminal group having 1 to 50 carbon atoms, which has 1 to 4 polar groups; and $R^1$ and $R^4$ may be the same as or different from each other)

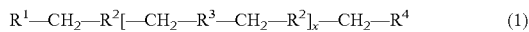

(2)

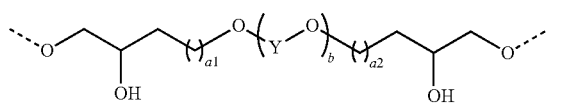

(in Formula (2), a1 and a2 each represent an integer of 0 to 5; a1 and a2 may be the same as or different from each other, and at least one of a1 and a2 is 1 or more; b represents 0 or 1; Y is an acyclic divalent saturated hydrocarbon group having 2 to 8 carbon atoms; the saturated hydrocarbon group is a partially fluorinated saturated hydrocarbon group which does not include an ether oxygen atom between carbon atoms, or a non-fluorinated saturated hydrocarbon group which may include an ether oxygen atom between carbon atoms and may have only one polar group, provided that in a case where the non-fluorinated saturated hydrocarbon group has the polar group, the polar group is bonded to a carbon atom other than a bonding terminal of Y; and an oxygen atom at a left terminal of Formula (2) is bonded to a methylene group on an $R^1$ side in Formula (1), and an oxygen atom at a right terminal is bonded to a methylene group on an $R^4$ side in Formula (1)).

As shown in Formula (1), the fluorine-containing ether compound of the present embodiment has a skeleton where the divalent linking group represented by $R^3$ and the perfluoropolyether chain represented by $R^2$ (which may hereinafter be referred to as a PFPE chain) are linked to each other through a methylene group. The terminal group represented by $R^1$ is bonded to one end of the skeleton through a methylene group, and the terminal group represented by $R^4$ is bonded to the other end of the skeleton through a methylene group.

In the fluorine-containing ether compound represented by Formula (1), x is 1 or 2. Since in the fluorine-containing ether compound represented by Formula (1), x is 1 or 2, the number (x+1) of the PFPE chains represented by $R^2$ is 2 or 3. Therefore, in the fluorine-containing ether compound represented by Formula (1), $R^3$, which is the divalent linking group represented by Formula (2), is arranged between the adjacent $R^2$'s, unlike a compound in which the number of the PFPE chains is 1. Thus, the fluorine-containing ether compound represented by Formula (1) can form a lubricating layer which has excellent adhesion to the protective layer and is not likely to cause spin-off, for example, as compared with a compound in which the number of PFPE chains is 1. In addition, the fluorine-containing ether compound represented by Formula (1) has molecules that are not too large, and thus, can move freely, as compared with a compound in which the number of PFPE chains is 4 or more. Thus, the fluorine-containing ether compound represented by Formula (1) is more likely to wet-spread over the protective layer and can form a lubricating layer that is thin and has an even film thickness, as compared with a compound having 4 or more PFPE chains.

(Divalent Linking Group Represented by $R^3$)

In the fluorine-containing ether compound represented by Formula (1), x pieces of $R^3$'s each represent a divalent linking group represented by Formula (2). The divalent linking group represented by Formula (2) consists of two unit structures and a linked structure arranged between the two unit structures.

In the two unit structures included in the divalent linking group represented by Formula (2), an ether oxygen atom (—O—), a methylene group (—CH$_2$—), and a methylene group (—CH(OH)—) in which one hydrogen atom is substituted with a hydroxy group are bonded in this order from the terminal side of the divalent linking group. Therefore, $R^3$ is bonded to the methylene group bonded to $R^2$ through an ether bond. The ether oxygen atom contained in each unit structure imparts moderate flexibility to the fluorine-containing ether compound represented by Formula (1), and increases the affinity between the hydroxy group contained in each unit structure and the protective layer.

In the divalent linking group represented by Formula (2), a1 and a2 each represent an integer of 0 to 5. a1 and a2 may be the same as or different from each other, and at least one of a1 and a2 is 1 or more, Therefore, in the divalent linking group represented by Formula (2), the linked structure arranged between the two unit structures is a linked structure in which an alkylene group having 1 to 6 carbon atoms (a1+1 in Formula (2)) bonded to one unit structure, a linking group ("—O—(—Y—O—)$_b$— (b is 0 or 1)" in Formula (2)) including an ether oxygen atom, and an alkylene group having 1 to 6 carbon atoms (a2+1 in Formula (2)) bonded to the other unit structure are bonded together in this order, and at least one alkylene group of the two alkylene groups has 2 to 6 carbon atoms.

The divalent linking group represented by Formula (2) has one or more carbon atoms in the two alkylene groups contained in the linked structure arranged between the two unit structures, and has two or more carbon atoms in at least one of the alkylene groups (a1 and/or a2 in Formula (2) is 1 or more). Therefore, the distance between the hydroxy groups contained in each of the two unit structures is appropriate, and the hydroxy groups contained in the two unit structures can each move independently. In addition, the alkylene group having 2 to 6 carbon atoms has excellent hydrophobicity, as compared with the alkylene group having one carbon atom. In the divalent linking group represented by Formula (2), at least one of the two alkylene groups having 1 to 6 carbon atoms has 2 to 6 carbon atoms, which can suppress the induction of water which causes corrosion. It is preferable that the divalent linking group represented by Formula (2) has two or more carbon atoms in each of the two alkylene groups (a1 and a2 in Formula (2) are each 1 or more). This is because the distance between the hydroxy groups contained in each of the two unit structures is more appropriate, the hydrophobicity of the divalent linking group represented by Formula (2) is further improved, and the corrosion resistance of the lubricating layer including the fluorine-containing ether compound represented by Formula (1) is better.

Since the two alkylene groups in the divalent linking group represented by Formula (2) each have 6 or less carbon atoms (a1 and a2 in Formula (2) are each 5 or less), the hindrance of the motion of each unit structure due to the rigidity of the linked structure arranged between the two unit structures can be suppressed. The number of carbon atoms in each of the two alkylene groups is preferably 4 or less (a1 and a2 in Formula (2) are each preferably 3 or less).

In the divalent linking group represented by Formula (2), b represents 0 or 1. That is, the linking group ("—O—(—Y—O—)$_b$— (b is 0 or 1)" in Formula (2)) including an ether oxygen atom is only an ether oxygen atom (—O—) (b in Formula (2)=0), or a linking group in which an acyclic saturated hydrocarbon group (Y in Formula (2)) having 2 to 8 carbon atoms is arranged between two ether oxygen atoms (b in Formula (2)=1). In the divalent linking group represented by Formula (2), since the distance between the hydroxy groups contained in the unit structure is more likely to be appropriate, the linking group including an ether oxygen atom is preferably a linking group in which an acyclic saturated hydrocarbon group having 2 to 8 carbon atoms is arranged between two ether oxygen atoms (b in Formula (2)=1). The acyclic saturated hydrocarbon group may be linear or branched.

In the divalent linking group represented by Formula (2), the linking group including an ether oxygen atom contained in the divalent linking group represented by Formula (2) can be appropriately selected according to the performance required for a lubricant including the fluorine-containing ether compound.

Since the acyclic saturated hydrocarbon group having 2 to 8 carbon atoms, which is Y in Formula (2), has two or more carbon atoms, in a case where b in Formula (2) is 1, the distance between the hydroxy groups contained in each of the two unit structures is appropriate. The number of carbon atoms of the acyclic saturated hydrocarbon group represented by Y in Formula (2) is preferably 3 or more since the distance between the hydroxy groups contained in each unit structure is more appropriate and the corrosion resistance of a lubricant including the fluorine-containing ether compound are even better.

In addition, in a case where Y in Formula (2) is an acyclic and non-fluorinated saturated hydrocarbon group, it may have only one polar group, provided that the polar group is bonded to a carbon atom other than a bonding terminal of Y. That is, the polar group is bonded to a carbon atom other than a terminal atom of Y, which is bonded to oxygen atoms on both neighboring sides of Y in Formula (2).

In addition, since the acyclic saturated hydrocarbon group represented by Y in Formula (2) has 8 or less carbon atoms, the motion of the two unit structures is suppressed from being hindered due to the bulkiness of Y in Formula (2).

Since Y in the divalent linking group represented by Formula (2) is the acyclic saturated hydrocarbon group having 2 to 8 carbon atoms, for example, the divalent linking group represented by Formula (2) has higher flexibility and the motion of the unit structure is not likely to be hindered, as compared with a case where Y is a hydrocarbon group having an unsaturated bond.

Since Y in the divalent linking group represented by Formula (2) is the acyclic saturated hydrocarbon group having 2 to 8 carbon atoms, for example, the divalent linking group represented by Formula (2) has higher fluidity and the motion of the unit structure is not likely to be hindered, as compared with a case where Y is a hydrocarbon group having a cyclic structure.

The acyclic saturated hydrocarbon group having 2 to 8 carbon atoms (Y in Formula (2)) included in a case where b in the divalent linking group represented by Formula (2) is 1 is a partially fluorinated saturated hydrocarbon group or a non-fluorinated saturated hydrocarbon group.

In a case where Y in the divalent linking group represented by Formula (2) is the partially fluorinated saturated hydrocarbon group, the hydrophilicity of the divalent linking group represented by Formula (2) is decreased, as compared with a case where Y is the non-fluorinated saturated hydrocarbon group. As a result, the fluorine-containing ether compound can suppress the induction of water which causes corrosion, and can form a lubricating layer having good corrosion resistance.

In a case where Y in the divalent linking group represented by Formula (2) is the partially fluorinated saturated hydrocarbon group, an ether oxygen atom is not included between carbon atoms for a reason shown below. In a case where the partially fluorinated saturated hydrocarbon group includes an ether oxygen atom between carbon atoms, the divalent linking group represented by Formula (2) includes a PFPE chain, and thus, only one polar group is present between the PFPE chain in the divalent linking group represented by Formula (2) and the PFPE chain represented by $R^2$. Since the polar group is inhibited from being adsorbed to the protective layer by the PFPE chain in the divalent linking group represented by Formula (2) and the PFPE chain represented by $R^2$, the polar group is not likely to interact with an active point on the protective layer. As a result, the adhesion between the lubricating layer and the protective layer is insufficient.

In a case where Y in the divalent linking group represented by Formula (2) is the non-fluorinated saturated hydrocarbon group, it may include an ether oxygen atom between carbon atoms or may have only one polar group, provided that the polar group is bonded to a carbon atom other than a bonding terminal of Y.

In a case where the saturated hydrocarbon group represented by Y in Formula (2) is the non-fluorinated saturated hydrocarbon group including an ether oxygen atom (—O—) between carbon atoms, Y has a structure having higher flexibility. Therefore, the hydroxy groups contained in the two unit structures can each move independently and freely, and can easily interact with active points on the protective layer or the polar groups included in other fluorine-containing ether compounds present in the lubricating layer.

In a case where the saturated hydrocarbon group represented by Y in Formula (2) is the non-fluorinated saturated hydrocarbon group and has only one polar group, a part of the saturated hydrocarbon group represented by Y in Formula (2), an alkylene group having 1 to 6 carbon atoms (or an alkylene group having 2 to 6 carbon atoms), and an ether oxygen atom arranged therebetween are each arranged between the polar group included in Y in Formula (2) and the hydroxy group contained in each unit structure. Therefore, the distance between the polar group included in Y in Formula (2) and the hydroxy group contained in each unit structure is appropriate.

In a case where the saturated hydrocarbon group represented by Y in Formula (2) includes a polar group, the fluorine-containing ether compound can form a lubricating layer having even better adhesion between the lubricating layer and the protective layer. In a case where the saturated hydrocarbon group represented by Y in Formula (2) includes a polar group, it has only one polar group. Therefore, it can be suppressed that the hydrophilicity of the fluorine-containing ether compound is excessively increased to induce water which causes corrosion.

Examples of the polar group which may be contained in the saturated hydrocarbon group represented by Y in Formula (2) include a hydroxy group (—OH), an amino group (—$NH_2$), a carboxy group (—COOH), a formyl group (—(C=O)H), a carbonyl group (—CO—), a sulfo group (—$SO_3H$), a cyano group (—CN), and a group having an amide bond (—$NR^7COR^8$ or —$CONR^9R^{10}$; $R^7$, $R^8$, $R^9$, and $R^{10}$ are each independently a hydrogen atom or an organic group). Among these, a polar group selected from the group consisting of the hydroxy group, the cyano group, and the group having an amide bond is more preferable. A reason therefor is that the hydroxy group, the cyano group, and the group having an amide bond are chemically stable, and a lubricating layer including a fluorine-containing ether compound having the polar group is not deteriorated for a long period of time. In addition, another reason is that the hydroxy group, the cyano group, and the group having an amide bond have an acidity which is not excessively high and have almost no effect on the corrosion of a substrate.

The divalent linking group represented by Formula (2) is a group in which two unit structures each have one hydroxy group. Furthermore, in a case where the linking group including an ether oxygen atom in the linked structure arranged between the two unit structures is a non-fluorinated and acyclic saturated hydrocarbon group, the saturated hydrocarbon group may have one polar group. Therefore, the divalent linking group represented by Formula (2) has two or three polar groups. Since the divalent linking group represented by Formula (2) has two or more polar groups, a sufficient interaction is obtained between the polar group contained in the divalent linking group represented by Formula (2) and an active point on the protective layer. Therefore, the lubricating layer including the fluorine-containing ether compound of the present embodiment has high adhesion to the protective layer. In addition, since there are three or less polar groups included in the divalent linking group represented by Formula (2), the aggregation due to excessively high polarity of the fluorine-containing ether compound, the reduction in adhesion to the protective layer, and the generation of spin-off can be prevented.

The two or three polar groups contained in the divalent linking group represented by Formula (2) are likely to interact with an active point on the protective layer or the polar group included in another fluorine-containing ether compound present in the lubricating layer. In addition, the divalent linking group represented by Formula (2) has good hydrophobicity. Thus, the fluorine-containing ether compound represented by Formula (1) can form a lubricating layer having good adhesion between the lubricating layer and the protective layer, less occurrence of spin-off, and good corrosion resistance.

It is preferable that Formula (2) representing $R^3$ is a linking group represented by any of Formulae (2-1) to (2-5).

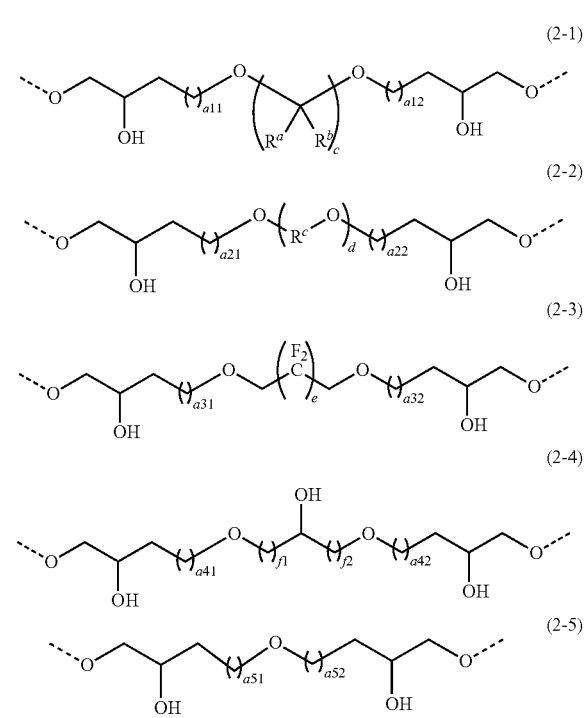

(in Formula (2-1), a11 and a12 each represent an integer of 0 to 5; a11 and a12 may be the same as or different from each other; a total value of a11 and a12 is 1 to 6; c represents an integer of 2 to 8; c pieces of $R^a$'s and $R^b$'s each independently represent a hydrogen atom or a methyl group; a total number of carbon atoms included in the c pieces of (—$CR^aR^b$—)'s is 2 to 8; and an oxygen atom at a left terminal of Formula (2-1) is bonded to the methylene group on the $R^1$ side in Formula (1), and an oxygen atom at a right terminal is bonded to the methylene group on the $R^4$ side in Formula (1))

(in Formula (2-2), a21 and a22 each represent an integer of 0 to 5; a21 and a22 may be the same as or different from each other; a total value of a21 and a22 is 1 to 6; d represents an integer of 2 to 4; d pieces of $R^c$'s each independently represent $-CH_2CH_2-$, $-CH_2CH_2CH_2-$, $-CH(CH_3)CH_2-$, or $-CH_2CH(CH_3)-$; a total number of carbon atoms included in the d pieces of $R^c$'s is 4 to 8; and an oxygen atom at a left terminal of Formula (2-2) is bonded to the methylene group on the $R^1$ side in Formula (1), and an oxygen atom at a right terminal is bonded to the methylene group on the $R^4$ side in Formula (1))

(in Formula (2-3), a31 and a32 each represent an integer of 0 to 5; a31 and a32 may be the same as or different from each other; a total value of a31 and a32 is 1 to 6; e represents an integer of 1 to 6; and an oxygen atom at a left terminal of Formula (2-3) is bonded to the methylene group on the $R^1$ side in Formula (1), and an oxygen atom at a right terminal is bonded to the methylene group on the $R^4$ side in Formula (1))

(in Formula (2-4), a41 and a42 each represent an integer of 1 to 5; a41 and a42 may be the same as or different from each other; a total value of a41 and a42 is 2 to 6; f1 and f2 each represent an integer of 1 to 6; f1 and f2 may be the same as or different from each other, and a total value of f1 and f2 is 2 to 7; and an oxygen atom at a left terminal of Formula (2-4) is bonded to the methylene group on the $R^1$ side in Formula (1), and an oxygen atom at a right terminal is bonded to the methylene group on the $R^4$ side in Formula (1))

(in Formula (2-5), a51 and a52 each represent an integer of 0 to 5; a51 and a52 may be the same as or different from each other; a total value of a51 and a52 is 1 to 6; and an oxygen atom at a left terminal of Formula (2-5) is bonded to the methylene group on the $R^1$ side in Formula (1), and an oxygen atom at a right terminal is bonded to the methylene group on the $R^4$ side in Formula (1))

The linking group represented by Formula (2-1) is a linking group in which b in Formula (2) is 1 and Y in Formula (2) is a non-fluorinated saturated hydrocarbon group and does not include an ether oxygen atom between carbon atoms. In Formula (2-1), c represents an integer of 2 to 8, and the total number of carbon atoms included in the c pieces of $(-CR^aR^b-)$'s is 2 to 8.

c pieces of $R^a$'s and $R^b$'s in Formula (2-1) each independently represent a hydrogen atom or a methyl group. Therefore, each of the c pieces of $(-CR^aR^b-)$'s in the linking group represented by Formula (2-1) may be any of $-CH_2-$, $-CH(CH_3)-$, and $-C(CH_3)_2-$. In a case where Y in Formula (2) consists of only a plurality of $-CH_2-$'s, it is more likely to secure the number of atoms between the hydroxy groups contained in each the two unit structures, and the distance between the two hydroxy groups is likely to be even more appropriate, as compared with Y having a branch and having the same number of carbon atoms. In addition, in a case where Y in Formula (2) includes $-CH(CH_3)-$ and/or $-C(CH_3)_2-$, Y is moderately bulky, and the interaction between the hydroxy groups contained in each of the two unit structures can be effectively suppressed.

In the linking group represented by Formula (2-1), since c is 2 or more, at least 9 atoms are present between the hydroxy groups contained in each of the two unit structures, and the distance between the two hydroxy groups is appropriate. Moreover, since c is 2 or more, the hydrophobicity of the saturated hydrocarbon group is good and the corrosion resistance of the lubricating layer including the fluorine-containing ether compound represented by Formula (1) is better.

In addition, the total number of carbon atoms included in the c pieces of $(-CR^aR^b-)$'s is 2 or more, and preferably 3 or more. This is because the hydrophobicity of the c pieces of $(-CR^aR^b-)$'s is good, the lubricating layer including the fluorine-containing ether compound represented by Formula (1) is not likely to incorporate water which causes corrosion, and the corrosion resistance is better.

In addition, since c in Formula (2-1) is 8 or less and the number of carbon atoms included in the saturated hydrocarbon groups (the total number of carbon atoms included in the c pieces of $(-CR^aR^b-)$'s) is 8 or less, the hindrance of the motion of the unit structure due to the rigidity of the saturated hydrocarbon group can be suppressed. c is preferably 4 or less.

In the linking group represented by Formula (2-1), a11 and a12 each represent an integer of 0 to 5, and are each preferably an integer of 1 to 3. a11 and a12 may be the same as or different from each other, It is preferable that a11 and a12 in Formula (2-1) are the same since it is easy to produce the fluorine-containing ether compound represented by Formula (1).

A total value of a11 and a12 is 1 to 6, and at least one of a11 and a12 is 1 or more, in the same manner as a1 and a2 in Formula (2).

The linking group represented by Formula (2-2) is a linking group in which b in Formula (2) is 1 and Y in Formula (2) is a non-fluorinated saturated hydrocarbon group and includes an ether oxygen atom between carbon atoms. d in Formula (2-2) represents an integer of 2 to 4. The total number of carbon atoms included in the d pieces of $R^c$'s is 4 to 8. The d pieces of $R^c$'s each independently represent $-CH_2CH_2-$, $-CH_2CH_2CH_2-$, $-CH(CH_3)CH_2-$, or $-CH_2CH(CH_3)-$, and since the flexibility that the unit structure can move freely is obtained, $-CH_2CH_2-$ or $-CH_2CH_2CH_2-$ is preferable, and $-CH_2CH_2-$ is more preferable.

Since d in Formula (2-2) is 2 or more and the number of carbon atoms included in the saturated hydrocarbon group (the total number of carbon atoms included in the d pieces of $R^c$'s) is 4 or more, the linking group represented by Formula (2-2) has a regular arrangement in which two or more repeating structures (($-R^c-O-$) in Formula (2-2)) consisting of an ether oxygen atom imparting flexibility and $R^c$ are included. Therefore, it is even more likely to obtain an intermolecular interaction between the fluorine-containing ether compounds, and an interaction between the fluorine-containing ether compound and the protective layer. Thus, the lubricating layer including the fluorine-containing ether compound represented by Formula (1) is a lubricating layer which is denser and has suppressed spin-off.

In Formula (2-2), d pieces of $R^c$'s may be different from each other, or may be partially or entirely the same as each other. In Formula (2-2), it is preferable that d pieces of $R^c$'s are entirely the same as each other. This is because $(-R^c-O-)$ in Formula (2-2) has a more regular arrangement, and thus, it is even more likely to obtain an intermolecular interaction.

Moreover, since d in Formula (2-2) is 2 or more and the total number of carbon atoms included in the d pieces of $R^c$'s is 4 or more, at least 12 atoms are present between the hydroxy groups contained in each of two unit structures, and even in a case where the saturated hydrocarbon group includes an ether oxygen atom between carbon atoms, the distance between the two hydroxy groups is appropriate. In addition, since d is 2 or more and the total number of carbon atoms included in the d pieces of Re is 4 or more, the hydrophobicity of the linking group represented by Formula (2-2) by d pieces of Re is good, and thus, the corrosion resistance of the lubricating layer including the fluorine-containing ether compound represented by Formula (1) is better. The total number of carbon atoms included in the d pieces of $R^c$'s may be 6 or more.

Since d in Formula (2-2) is 4 or less and the number of carbon atoms included in the saturated hydrocarbon group (the total number of carbon atoms included in the d pieces of $R^c$'s) is 8 or less, the effect of the rigidity of the saturated hydrocarbon group to hinder a motion of the unit structure is suppressed. d may be 3 or less. In addition, the total number of carbon atoms included in the d pieces of $R^c$'s may be 6 or less.

In the linking group represented by Formula (2-2), a21 and a22 each represent an integer of 0 to 5, and are each preferably an integer of 1 to 3. a21 and a22 may be the same as or different from each other, It is preferable that a21 and a22 in Formula (2-2) are the same since it is easy to produce the fluorine-containing ether compound represented by Formula (1).

A total value of a21 and a22 is 1 to 6, and at least one of a21 and a22 is 1 or more, in the same manner as a1 and a2 in Formula (2).

In the linking group represented by Formula (2-3), b in Formula (2) is 1 and Y in Formula (2) is a partially fluorinated saturated hydrocarbon group ($-CH_2-(CF_2)_e-CH_2-$) in Formula (2-3). e in Formula (2-3) represents an integer of 1 to 6. Therefore, the linking group represented by Formula (2-3) includes a linear perfluoroalkyl chain having 1 to 6 carbon atoms, which decreases the affinity with water. In a case where the linking group represented by Formula (2-3) is contained, a saturated hydrocarbon group ($-CH_2-(CF_2)_e-CH_2-$ in Formula (2-3)) including a perfluoroalkyl chain included between the two unit structures decreases the polarity of the entire molecule and improves the hydrophobicity, whereby the affinity with water which causes corrosion is decreased.

As a result, the lubricating layer including the fluorine-containing ether compound represented by Formula (1) suppresses the incorporation of water which causes corrosion and has even better corrosion resistance.

In the linking group represented by Formula (2-3), since c is 1 or more, at least 10 atoms are present between the hydroxy groups contained in each of the two unit structures, and the distance between the two hydroxy groups is appropriate. Moreover, since e is 1 or more, the number of groups ($-CF_2-$) obtained by substituting hydrogen atoms of methylene groups with fluorine atoms is 1 or more, the affinity with water is decreased, and the hydrophobicity of the saturated hydrocarbon group ($-CH_2-(CF_2)_e-CH_2-$ in Formula (2-3)) is good. e in Formula (2-3) is preferably two or more. In addition, since e in Formula (2-3) is 6 or less, the effect of the rigidity of the saturated hydrocarbon group to hinder the motion of the unit structure is suppressed. e in Formula (2-3) is preferably 4 or less.

In the linking group represented by Formula (2-3), a31 and a32 each represent an integer of 0 to 5, and are each preferably an integer of 1 to 3. a31 and a32 may be the same as or different from each other, It is preferable that a31 and a32 in Formula (2-3) are the same since it is easy to produce the fluorine-containing ether compound represented by Formula (1).

A total value of a31 and a32 is 1 to 6, and at least one of a31 and a32 is 1 or more, in the same manner as a1 and a2 in Formula (2).

The linking group represented by Formula (2-4) is a linking group in which b in Formula (2) is 1, Y in Formula (2) is a non-fluorinated saturated hydrocarbon group, and the saturated hydrocarbon group has only one polar group ($-(CH_2)_{f1}-CH(OH)-(CH_2)_{f2}-$ in Formula (2-4)). Since the linking group represented by Formula (2-4) has three hydroxy groups, an intermolecular interaction between the fluorine-containing ether compounds and an interaction between the fluorine-containing ether compound and the protective layer are sufficiently obtained. Therefore, a lubricating layer including the fluorine-containing ether compound having a linking group represented by Formula (2-4) has higher adhesion to the protective layer, is denser, and suppresses spin-off.

a41 and a42 in Formula (2-4) each represent an integer of 1 to 5, and are each preferably an integer of 1 to 3. a41 and a42 may be the same as or different from each other, It is preferable that a41 and a42 in Formula (2-4) are the same since it is easy to produce the fluorine-containing ether compound represented by Formula (1). A total value of a41 and a42 is 2 to 6.

In addition, f1 and f2 in Formula (2-4) each represent an integer of 1 to 6, and are each preferably an integer of 1 to 3. f1 and f2 may be the same as or different from each other. A total value of f1 and f2 is 2 to 7.

In the linking group represented by Formula (2-4), since a41 and a42 are each 1 or more and f1 and f2 are also each 1 or more, the distance between the hydroxy group included in the saturated hydrocarbon group ($-(CH_2)_{f1}-CH(OH)-(CH_2)_{f2}-$) in Formula (2-4), and the hydroxy group contained in each of the two unit structures is appropriate. That is, at least 6 atoms are present between the hydroxy group included in the saturated hydrocarbon group and the hydroxy group contained in each of the two unit structures. Thus, it is possible to suppress the hydroxy groups contained in the linking group represented by Formula (2-4) from being aggregated in the molecule.

In addition, in the linking group represented by Formula (2-4), a41 and a42 are each 5 or less, a total value of a41 and a42 is 6 or less, f1 and f2 are each 6 or less, and a total value of f1 and f2 is 7 or less. Therefore, in the linking group represented by Formula (2-4), the hindrance of the motion of each unit structure due to the rigidity of the saturated hydrocarbon group can be suppressed.

The linking group represented by Formula (2-5) is a linking group in which b in Formula (2) is 0. In the linking group represented by Formula (2-5), since two alkylene groups contained in the linked structure arranged between the two unit structures are bonded only through an ether oxygen atom that imparts flexibility, the hydroxy groups contained in the two unit structures can each move freely.

In addition, the linking group represented by Formula (2-5) can suppress the bulkiness caused by Y in Formula (2), as compared with the linking group in which b in Formula (2) is 1. Therefore, the lubricating layer including the fluorine-containing ether compound having the linking group represented by Formula (2-5) can maintain good corrosion resistance and spin-off resistance even in a case where a thickness thereof is further reduced, which is thus preferable.

In the linking group represented by Formula (2-5), a51 and a52 each represent an integer of 0 to 5, and are each preferably an integer of 0 to 3. a51 and a52 may be the same as or different from each other, It is preferable that one of a51 or a52 is 0 since it is easy to produce the fluorine-containing ether compound represented by Formula (1). A total value of a51 and a52 is 1 to 6, and at least one of a51 and a52 is 1 or more, in the same manner as a1 and a2 in Formula (2).

In the linking group represented by Formula (2-5), since a total value of a51 and a52 is 1 or more, the hydrophobicity of the fluorine-containing ether compound is improved, and a lubricating layer including the fluorine-containing ether compound is not likely to incorporate water which causes corrosion and has good corrosion resistance. In addition, since a total value of a51 and a52 is 6 or less, the linking group represented by Formula (2-5) has moderate flexibility, and a lubricating layer including the linking group is denser and has better spin-off resistance. It is preferable that a total value of a51 and a52 is 3 or less since the flexibility of the fluorine-containing ether compound is even better and a lubricating layer having better spin-off resistance can be formed.

In the linking group represented by Formula (2-5), at least 6 atoms are present between the hydroxy groups included in each of the two unit structures. Therefore, the distance between the two hydroxy groups included in the linking group represented by Formula (2-5) is appropriate, and the two hydroxy groups included in the linking group represented by Formula (2-5) can be suppressed from being aggregated in the molecule.

In a case where x in Formula (1) is 2, two $R^3$'s may be the same as or different from each other. In a case where the two $R^3$'s are the same as each other, a coating state of the fluorine-containing ether compound with respect to the protective layer is more even, and a lubricating layer having better adhesion can be formed. The "two $R^3$'s are the same as each other" means that the atoms included in the two $R^3$'s are symmetrically arranged with respect to $R^2$ arranged at the center of the chain-like structure of the molecule.

(Terminal Groups Represented by $R^1$ and $R^4$)

In the fluorine-containing ether compound represented by Formula (1), $R^1$ and $R^4$ are each a terminal group having 1 to 50 carbon atoms, which has 1 to 4 polar groups.

In the present embodiment, since $R^1$ and $R^4$ are each the terminal group, a lubricating layer including the fluorine-containing ether compound represented by Formula (1) has good corrosion resistance and a high spin-off suppressing effect. $R^1$ and $R^4$ can be appropriately selected according to the performance required for the lubricant including the fluorine-containing ether compound. $R^1$ and $R^4$ may be the same as or different from each other.

Since the number of the polar groups included in each of $R^1$ and $R^4$ is 1 or more, in a case where a lubricating layer is formed on the protective layer, using a lubricant including the fluorine-containing ether compound, a suitable interaction occurs between the lubricating layer and the protective layer. As a result, the lubricating layer has excellent adhesion to the protective layer and a high spin-off suppressing effect. In addition, since the number of the polar groups included in each of $R^1$ and $R^4$ is 4 or less, the polar groups included in $R^1$ and $R^4$ are less likely not to be involved in the interaction with active points on the protective layer or the polar groups included in other fluorine-containing ether compounds present in the lubricating layer, and a lubricating layer having high corrosion resistance and a high spin-off suppressing effect can be obtained. In addition, since the number of the polar groups included in each of $R^1$ and $R^4$ is 4 or less, it is possible to suppress the fluorine-containing ether compound from being aggregated into an agglomerate due to excessively high polarity of the fluorine-containing ether compound, leading to a loss of the smoothness of the lubricating layer in the lubricating layer including the fluorine-containing ether compound. The number of the polar groups included in $R^1$ and $R^4$ is preferably 3 or less, and most preferably 2 since the fluorine-containing ether compound can form a lubricating layer having higher corrosion resistance and a higher spin-off suppressing effect. In a case where the number of the polar groups included in $R^1$ and $R^4$ is 2, the polar groups contained in the terminal groups represented by $R^1$ and $R^4$ can be effectively suppressed from being aggregated with each other in a magnetic recording medium having a lubricating layer including the fluorine-containing ether compound. In addition, the polar groups included in $R^1$ and $R^4$ are even less likely not to be involved in the interaction with the active point on the protective layer or the polar groups included in other fluorine-containing ether compounds present in the lubricating layer. As a result, in a case where the polar group which is not involved in the interaction is present, the incorporation of water which causes corrosion of a magnetic recording medium can be prevented, and the fluorine-containing ether compound can form a lubricating layer having higher corrosion resistance and a higher spin-off suppressing effect.

The total number of the polar groups included in $R^1$ and the polar groups included in $R^4$ in Formula (1) is preferably 2 to 6, more preferably 3 to 6, and most preferably 4 to 6. In a case where the total number of the polar groups is 2 or more, the interaction between the polar groups contained in $R^1$ and $R^4$ and the protective layer is effectively obtained. As a result, the fluorine-containing ether compound can form a lubricating layer having high adhesion to the protective layer. Therefore, a lubricating layer having more excellent spin-off resistance is obtained. In addition, in a case where the total number of the polar groups is 6 or less, it is possible to prevent the incorporation of water which causes corrosion due to excessively high polarity of the fluorine-containing ether compound. Accordingly, a lubricating layer having more excellent corrosion resistance can be formed.

The polar group included in $R^1$ and $R^4$ is preferably at least one polar group selected from the group consisting of a hydroxy group (—OH), an amino group (—NH$_2$), a carboxy group (—COOH), a formyl group (—C(=O)H), a carbonyl group (—CO—), a sulfo group (—SO$_3$H), a cyano group (—CN), and a group having an amide bond (—NR$^7$COR$^8$ or —CONR$^9$R$^{10}$; $R^7$, $R^8$, $R^9$, and $R^{10}$ are each independently a hydrogen atom or an organic group). As the group having an amide bond, as shown in the formula, both a group (for example, a carboxamide group (—C(=O)NH$_2$)) bonded to a carbon atom constituting the amide bond and a group (for example, an acetamide group (—NHC(=O)CH$_3$)) bonded to a nitrogen atom constituting the amide bond are included. In the group having an amide bond, $R^7$ and $R^8$ may be bonded to each other to form a ring, and $R^9$ and $R^{10}$ may be bonded to each other to form a ring. $R^7$, $R^8$, $R^9$, and $R^{10}$ in the group having an amide bond are each independently preferably selected from the group consisting of a hydrogen atom, a methyl group, an ethyl group, a propyl group, and a butyl group.

It is preferable that $R^1$ and $R^4$ each independently include at least one polar group selected from the group consisting of a hydroxy group, a cyano group, and a group having an amide bond. A reason therefor is that the hydroxy group, the cyano group, and the group having an amide bond are chemically stable, and a lubricating layer including a fluorine-containing ether compound having the polar group is not deteriorated for a long period of time. In addition, a reason why the hydroxy group, the cyano group, and the group having an amide bond are preferable is that the acidity is not excessively high and the substrate is not likely to be corroded.

It is preferable that $R^1$ and $R^4$ in Formula (1) each have at least one hydroxy group, and it is more preferable that the polar group contained in $R^1$ and the polar group contained in $R^4$ are both hydroxy groups. In addition, it is still more preferable that all of the polar groups contained in $R^1$, the polar groups contained in $R^3$, and the polar groups contained in $R^4$ are hydroxy groups since the coating state of the fluorine-containing ether compound with respect to the protective layer is more even.

The one to four polar groups contained in each of $R^1$ and $R^4$ may be partially or entirely the same as or different from each other.

In addition, the number of the polar groups contained in $R^1$ and the number of the polar groups contained in $R^4$ may be the same as or different from each other. The number of the polar groups contained in $R^1$ and the number of the polar groups contained in $R^4$ are preferably the same as each other since the coating state of the fluorine-containing ether compound with respect to the protective layer is more even and a lubricating layer having better adhesion can be formed.

The number of carbon atoms in the terminal group represented by $R^1$ and $R^4$ is 1 to 50, preferably 3 to 20, and more preferably 4 to 15. In a case where the number of carbon atoms in the terminal group represented by $R^1$ and $R^4$ is 1 or more, the hydrophobicity of the terminal group can be ensured. Therefore, water which causes corrosion can be prevented from being attracted to the lubricating layer and a lubricating layer having good corrosion resistance is formed. In a case where the number of carbon atoms in the terminal group represented by $R^1$ and $R^4$ is 50 or less, the terminal group has a flexible structure. Thus, the adhesion between the lubricating layer including the fluorine-containing ether compound and the protective layer is good. As a result, a lubricating layer that can suppress spin-off can be obtained.

In the fluorine-containing ether compound represented by Formula (1), it is preferable that $R^1$ and $R^4$ are each independently a terminal group represented by Formula (3).

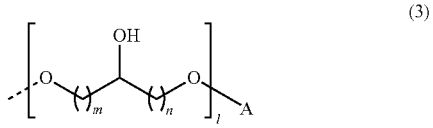

(3)

(in Formula (3), l represents an integer of 1 to 3; l pieces of m's each independently represent an integer of 1 to 6; l pieces of n's each independently represent an integer of 1 to 6; in one repeating unit, at least one of m and n is 1; and A represents an alkyl group which may have a polar group, an organic group including a carbon-carbon unsaturated bond, which may have a polar group, or a hydrogen atom))

In a case where $R^1$ and $R^4$ are each the terminal group represented by Formula (3), $R^1$ and $R^4$ have an oxygen atom bonded to the methylene group (—$CH_2$—) to which $R^2$ is bonded. That is, $R^1$ and $R^4$ have oxygen atoms at end parts on the sides bonded to $CH_2$, each adjacent to $R^1$ and $R^4$. Oxygen atoms arranged at the end parts of $R^1$ and $R^4$ form an ether bond (—O—) with atoms bonded to both sides thereof. This ether bond imparts moderate flexibility to the fluorine-containing ether compound represented by Formula (1), and increases the affinity between the polar group contained in the terminal group represented by $R^1$ and $R^4$ and the protective layer. Thus, the fluorine-containing ether compound represented by Formula (1) can form a lubricating layer having excellent adhesion to the protective layer.

l in Formula (3) is an integer of 1 to 3, preferably an integer of 1 or 2, and most preferably 1. In a case where l in Formula (3) is 3 or less, there are too many hydroxy groups in the terminal group represented by Formula (3). Thus, water which causes corrosion can be prevented from being attracted to the lubricating layer, and a lubricating layer having good corrosion resistance can be obtained.

In a case where l in Formula (3) is 2 or 3, combinations of m's and n's in the two or three repeating units (—$(CH_2)_m$—CH(OH)—$(CH_2)_n$—O—) may be different from each other, or may be partially or entirely the same as each other.

l pieces of m's in Formula (3) each independently represent an integer of 1 to 6 and l pieces of n's each independently represent an integer of 1 to 6.

In one repeating unit (—$(CH_2)_m$—CH(OH)—$(CH_2)_n$—O—) in Formula (3), at least one of m and n is 1. This is because the motion of the hydroxy group in the repeating unit is not decreased since the number of carbon atoms in the alkylene group between the carbon atom to which a hydroxy group is bonded and the ether oxygen atom is too large.

A in Formula (3) represents an alkyl group which may have a polar group, an organic group including a carbon-carbon unsaturated bond which may have a polar group, or a hydrogen atom.

In a case where A in Formula (3) is an alkyl group having no polar group, specific examples of A include a methyl group, an ethyl group, a propyl group, a butyl group, a pentyl group, and a hexyl group.

In a case where A in Formula (3) is an alkyl group having a polar group, the polar group is preferably the polar group mentioned as the preferred examples of the polar group included in $R^1$ and $R^4$. Among the polar groups, a polar group selected from the group consisting of the hydroxy group, the cyano group, and the group having an amide bond is more preferable. A reason therefor is that the hydroxy group, the cyano group, and the group having an amide bond are chemically stable, and a lubricating layer including a fluorine-containing ether compound having the polar group is not deteriorated for a long period of time. In addition, a reason why the hydroxy group, the cyano group, and the group having an amide bond are preferable is that the acidity is not excessively high and the substrate is not likely to be corroded.

In a case where A in Formula (3) is an alkyl group having a polar group, examples of A include a 2-hydroxyethyl group, a 3-hydroxypropyl group, a 4-hydroxybutyl group, a 5-hydroxypentyl group, a 6-hydroxyhexyl group, a 2-aminoethyl group, a 3-aminopropyl group, a 2-carboxyethyl group, a 3-carboxypropyl group, a 2-carbonyl ethyl group, a 3-carbonyl propyl group, a 2-acetylethyl group, a 3-acetylpropyl group, a 2-sulfoethyl group, a 3-sulfopropyl group, a 2-cyanoethyl group, a 3-cyanopropyl group, a 4-cyanobutyl group, a 2-acetamidoethyl group, a 3-acetamidopropyl group, a 4-acetamidobutyl group, a 2-carboxamidoethyl group, a 3-carboxamidopropyl group, and a 4-carboxamidobutyl group.

Among the alkyl groups having a polar group, any of the 2-hydroxyethyl group, the 3-hydroxypropyl group, the 4-hydroxybutyl group, the 5-hydroxypentyl group, the 6-hydroxyhexyl group, the 2-cyanoethyl group, the 3-cyanopropyl group, the 2-acetamidoethyl group, the 2-carboxamidoethyl group, and the 3-carboxamidopropyl group is preferable, and any of the 2-hydroxyethyl group, the 3-hydroxypropyl group, the 2-cyanoethyl group, the 3-cyanopropyl group, and the 2-acetamidoethyl group is more preferable.

In a case where A in Formula (3) is an organic group including a carbon-carbon unsaturated bond, examples of A include an organic group including at least one selected from an aromatic hydrocarbon, an unsaturated heterocyclic ring, an alkenyl group, and an alkynyl group.

In a case where A in Formula (3) is an organic group including a carbon-carbon unsaturated bond having no polar group, examples of A include a phenyl group, a methoxyphenyl group, a fluorinated phenyl group, a naphthyl group, a phenethyl group, a methoxyphenethyl group, a fluorinated phenethyl group, a benzyl group, a methoxybenzyl group, a naphthylmethyl group, a methoxynaphthyl group, a pyrrolyl group, a pyrazolyl group, a methylpyrazolylmethyl group, an imidazolyl group, a furyl group, a furfuryl group, an oxazolyl group, an isoxazolyl group, a thienyl group, a thienylethyl group, a thiazolyl group, a methylthiazolylethyl group, an isothiazolyl group, a pyridyl group, a pyrimidinyl group, a pyridazinyl group, a pyrazinyl group, an indolinyl group, a benzofuranyl group, a benzothienyl group, a benzimidazolyl group, a benzoxazolyl group, a benzothiazolyl group, a benzopyrazolyl group, a benzoisoxazolyl group, a benzoisothiazolyl group, a quinolyl group, an isoquinolyl group, a quinazolinyl group, a quinoxalinyl group, a phthalazinyl group, a cinnolinyl group, a vinyl group, an allyl group, a butenyl group, a propynyl group, a propargyl group, a butynyl group, a methylbutynyl group, a pentynyl group, a methylpentynyl group, and a hexynyl group.

Among the organic groups including a carbon-carbon unsaturated bond, any of the phenyl group, the methoxyphenyl group, the naphthyl group, the phenethyl group, the methoxyphenethyl group, the fluorinated phenethyl group, the thienylethyl group, the allyl group, the butenyl group, and the propargyl group is preferable, and in particular, any of the phenyl group, the methoxyphenyl group, the allyl group, and the butenyl group is more preferable.

In a case where A in Formula (3) is an organic group including a carbon-carbon unsaturated bond having a polar group, as the polar group, the polar group mentioned as preferred examples of the polar group included in $R^1$ and $R^4$ can be used. Among these polar groups, at least one selected from the group consisting of the cyano group and the group having an amide bond is more preferable. The cyano group or the group having an amide bond is preferable since the lubricating layer including the fluorine-containing ether compound having these polar groups is chemically stable and is not deteriorated for a long period of time. In addition, another reason is that the cyano group and the group having an amide bond have an acidity which is not excessively high and have almost no effect on the corrosion of a substrate.

In a case where A in Formula (3) is an organic group including a carbon-carbon unsaturated bond having a polar group, examples of A include a cyanophenyl group, a carboxamidophenyl group, an acetamidophenyl group, a cyanonaphthyl group, a carboxamidonaphthyl group, an acetamidonaphthyl group, a cyanophenethyl group, a carboxamidophenethyl group, an acetamidophenethyl group, a cyanobenzyl group, a carboxamidobenzyl group, and an acetamidobenzyl group.

Among those, any of the cyanophenyl group, the carboxamidophenyl group, the acetamidophenyl group, the cyanobenzyl group, the carboxamidobenzyl group, and the acetamidobenzyl group is preferable, and any of the cyanophenyl group, the carboxamidophenyl group, and the acetamidophenyl group is more preferable.

In a case where A in Formula (3) is a hydrogen atom, A forms a hydroxy group with the oxygen atom in Formula (3). In a case where A is a hydrogen atom, it is preferable that n in the repeating unit $(-(CH_2)_m-CH(OH)-(CH_2)_n-O-)$ in Formula (3), to which A is bonded, is 2 or more. This is because the distance between a terminal hydroxy group formed by the oxygen atom in Formula (3) and the hydrogen atom which is A and a hydroxy group adjacent to the terminal hydroxy group is more appropriate.

Here, a bond between the terminal group represented by Formula (3) and an active point on the protective layer will be described. In the functional groups (active points) present in a large number on the protective layer, a locally charged site and a site having charges distributed widely are each present. The hydroxy group included in Formula (3) and the hydroxy group included in $R^3$ represented by Formula (2) exhibit an adsorption ability by allowing the hydrogen atom to interact with a locally charged site on the protective layer through a hydrogen bond. On the other hand, the aromatic hydrocarbon, the unsaturated heterocyclic ring, the alkenyl group, and the alkynyl group have a delocalized charge. Therefore, in a case where A of the terminal group represented by Formula (3) includes at least one selected from an aromatic hydrocarbon, an unsaturated heterocyclic ring, an alkenyl group, or an alkynyl group, A exhibits an adsorption ability by interacting with a site having charges distributed widely on the protective layer.

Therefore, the hydroxy group included in Formula (3) and the hydroxy group included in $R^3$ represented by Formula (2), and an organic group including a carbon-carbon unsaturated bond in a case where A of the terminal group represented by Formula (3) is the organic group including a carbon-carbon unsaturated bond can be each adsorbed to different sites the protective layer. Therefore, the hydroxy group included in Formula (3) and the hydroxy group included in $R^3$ represented by Formula (2), and an organic group including a carbon-carbon unsaturated bond in a case where A of the terminal group represented by Formula (3) is the organic group including a carbon-carbon unsaturated bond can each independently interact with a functional group (active point) on the protective layer. As a result, in a case where at least one of $R^1$ and $R^4$ is the terminal group represented by Formula (3) and A in Formula (3) is the organic group including a carbon-carbon unsaturated bond, a lubricating layer including the fluorine-containing ether compound has excellent adhesion to the protective layer, can prevent the intrusion of water, and has a high corrosion suppressing effect on a magnetic recording medium.

It is more preferable that $R^1$ and $R^4$ are each independently a terminal group represented by Formula (3-1) or (3-2).

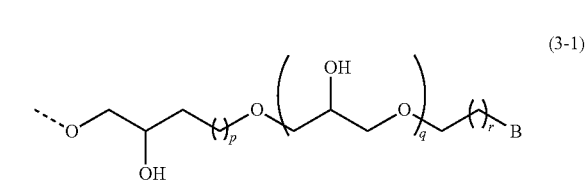

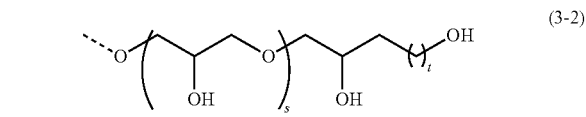

(in Formula (3-1), p represents an integer of 0 to 3, q represents an integer of 0 to 2, and r represents an integer of 1 to 5; a total value of p and r is 1 to 5; and B represents a polar group)

(in Formula (3-2), s represents an integer of 0 to 2, and t represents an integer of 1 to 5).

Each polar group included in the terminal groups represented by Formulae (3-1) and (3-2) is bonded to carbon atoms that are different from each other. In Formulae (3-1) and (3-2), carbon atoms to which the polar groups are bonded are bonded to each other through a linking group including a carbon atom to which the polar group is not bonded. Thus, in a case where $R^1$ and/or $R^4$ is the terminal group represented by Formula (3-1) or (3-2), in the fluorine-containing ether compound represented by Formula (1), the terminal polar group and a hydroxy group adjacent to the terminal polar group can be aligned such that both of the terminal polar group and a hydroxy group adjacent to the terminal polar group can adhere to the protective layer by a linking group including carbon atoms to which polar groups are not bonded in Formula (3-1) or (3-2). Therefore, it is presumed that a lubricating layer in which a strong interaction with the protective layer is obtained and spin-off can be suppressed can be formed.

In a case where $R^1$ and/or $R^4$ is Formula (3-1) or Formula (3-2), the polar groups in the terminal group are not likely to be aggregated and the interaction with the protective layer is likely to occur, for example, as compared with a case where a terminal group in which carbon atoms to which polar groups are bonded are directly bonded to each other is arranged as $R^1$ and/or $R^4$. Thus, in a case where $R^1$ and/or $R^4$ is Formula (3-1) or Formula (3-2), the terminal portion in the fluorine-containing ether compound is not likely to float up and the adhesion to the protective layer is not likely to be decreased, as compared with a case where a terminal group in which the carbon atoms to which the polar groups are bonded are directly bonded to each other is arranged.

In the terminal group represented by Formula (3-1), a linking group between a carbon atom to which a polar group B arranged at a terminal is bonded and a carbon atom to which a hydroxy group adjacent to the polar group B arranged at the terminal is bonded includes an oxygen atom that forms an ether bond. p in Formula (3-1) represents an integer of 0 to 3, q represents an integer of 0 to 2, r represents an integer of 1 to 5, and a total value of p and r is 1 to 5. Therefore, the linking group has a linear chain-like structure consisting of 3 to 7 atoms including carbon atoms to which the polar group B and a hydroxy group are not bonded.

In the terminal group represented by Formula (3-1), since the linking group has a linear chain-like structure including an oxygen atom that forms an ether bond, and consisting of 3 or more atoms including carbon atoms to which the polar group B and the hydroxy group are not bonded, the distance between the polar group B and a hydroxy group adjacent to the polar group B is appropriate. Therefore, it is possible to suppress the polar group B and a hydroxy group adjacent to the polar group B from interacting with each other in the molecule, and both the polar group B and a hydroxy group adjacent to the polar group B can adhere to the protective layer. In addition, since the linking group has a linear chain-like structure consisting of 3 or more atoms, the fluorine-containing ether compound has good hydrophobicity even in a case where the linking group includes an oxygen atom that forms an ether bond. In addition, since the linking group has a linear chain-like structure consisting of 3 or more atoms, the molecular motion is appropriate, the intramolecular aggregation is not likely to occur, and the linking group has excellent adhesion to the protective layer even in a case where the linking group includes an oxygen atom that forms an ether bond.

In the terminal group represented by Formula (3-1), since the linking group has a linear chain-like structure including an oxygen atom that forms an ether bond, and consisting of 7 or less atoms including carbon atoms to which the polar group B and the hydroxy group are not bonded, the hydrophobicity of the linking group is not excessively high to impair the adhesion between the lubricating layer including the fluorine-containing ether compound and the protective layer.

Thus, the fluorine-containing ether compound having the terminal group represented by Formula (3-1), in which the linking group has a linear chain-like structure consisting of 3 to 7 atoms including carbon atoms to which the polar group B and the hydroxy group are not bonded, can form a lubricating layer which has excellent adhesion to the protective layer, exhibits high corrosion resistance, and has a high spin-off suppressing effect.

In Formula (3-1), a total value of p and r is 1 to 5, and preferably 1 to 3. In Formula (3-1), the carbon atoms included in the linking group arranged between carbon atoms to which the polar groups are bonded prevent an intramolecular interaction between the polar groups in close proximity to each other from occurring preferentially to the interaction between the polar group and the protective layer, and improves the adhesion between the polar group and the protective layer in Formula (3-1). On the other hand, in a case where the number of carbon atoms included in the linking group is excessively large, the flexibility of the terminal group represented by Formula (3-1) is decreased and it may be difficult for the protective layer to be evenly coated. In the terminal group represented by Formula (3-1), a total value of p and r is 5 or less, and thus, the alkylene chain of the main chain portion of Formula (3-1) is not too long. Therefore, it is prevented that due to the long rigid alkylene chain, the flexibility of the terminal portion is decreased and the interaction with the protective layer is weakened, causing the terminal portion to float up. p is preferably 0 or 1, and more preferably 0. r is preferably 1 or 2, and more preferably 1.

B in Formula (3-1) represents a polar group. B is preferably the polar group mentioned as preferred examples of B included in $R^1$ and $R^4$. Among the polar groups, a polar group selected from the group consisting of the hydroxy group, the cyano group, and the group having an amide bond is more preferable. A reason therefor is that the hydroxy group, the cyano group, and the group having an amide bond are chemically stable, and a lubricating layer including a fluorine-containing ether compound having the polar group is not deteriorated for a long period of time. In addition, a reason why the hydroxy group, the cyano group, and the group having an amide bond are preferable is that the acidity is not excessively high and the substrate is not likely to be corroded.

In Formula (3-1), q represents an integer of 0 to 2. The number of polar groups in Formula (3-1) is q+2, and as described above, the number of the polar groups included in $R^1$ and $R^4$ is preferably 3 or less, and most preferably 2. Therefore, q in Formula (3-1) is preferably 0 or 1, and more preferably 0.

In the terminal group represented by Formula (3-2), the linking group between a carbon atom to which the terminal hydroxy group is bonded and a carbon atom to which a hydroxy group adjacent to the terminal hydroxy group is bonded does not include an oxygen atom. Therefore, the intramolecular interaction is small and the intramolecular aggregation is not likely to occur, resulting in excellent adhesion to the protective layer. t in Formula (3-2) represents an integer of 1 to 5. Therefore, the linking group has a linear chain-like structure consisting of 1 to 5 atoms including carbon atoms to which hydroxy groups are not bonded. Since the linking group included in Formula (3-2) has a linear chain-like structure consisting of one or more atoms including carbon atoms to which hydroxy groups are not bonded, the distance between the terminal hydroxy group and a hydroxy group adjacent to the terminal hydroxy group is appropriate, the intramolecular aggregation is not likely to occur, and the hydrophobicity is good.

In addition, since the linking group included in Formula (3-2) has a linear chain-like structure which does not include an oxygen atom that forms an ether bond, and consists of 5 or less atoms including carbon atoms to which hydroxy groups are not bonded, the hydrophobicity of the linking group is not excessively high to impair the adhesion to the protective layer, and the effect of the linking group becoming bulky to hinder the motion of the hydroxy group is small.

In addition, in the same manner as in Formula (3-1), in Formula (3-2), in a case where the number of carbon atoms included in the linking group arranged between carbon atoms to which the polar groups are bonded is too large, the flexibility of the terminal group represented by Formula (3-2) is decreased, and thus, it may be difficult for the entire surface of the protective layer to be evenly coated. In the terminal group represented by Formula (3-2), t is 5 or less, and thus, the alkylene chain in the main chain portion of Formula (3-2) is not too long. Therefore, it can be prevented that due to the long rigid alkylene chain, the flexibility of the terminal portion is decreased, and the interaction between the terminal hydroxy group and the protective layer is decreased.

Thus, a lubricating layer including the fluorine-containing ether compound, in which the linking group has a linear chain-like structure which does not include an oxygen atom that forms an ether bond, and consists of 1 to 5 atoms including carbon atoms to which hydroxy groups are not bonded, has excellent adhesion to the protective layer, high corrosion resistance, and a high spin-off suppressing effect. t is preferably 1 or 2, and more preferably 1.

In Formula (3-2), s represents an integer of 0 to 2. The number of polar groups in Formula (3-2) is s+2, and as described above, the number of the polar groups included in $R^1$ and $R^4$ is preferably 3 or less, and most preferably 2. Therefore, s in Formula (3-2) is preferably 0 or 1, and more preferably 0.

In a case where x in Formula (1) is 2, two $R^3$'s are present in the fluorine-containing ether compound. Since $R^3$'s represented by Formula (2) each have two or three hydroxy groups, in a case where x is 2, the proportion of the number of polar groups in $R^1$ and $R^4$ with respect to the total number of polar groups in the fluorine-containing ether compound is reduced. Since the number of active points in the protective layer is limited, in a case where the proportion of the polar groups in $R^1$ and $R^4$ is reduced, the interaction between $R^1$ and $R^4$ and the protective layer is weakened.

Since in the terminal groups represented by Formulae (3-1) and (3-2), the carbon atoms bonded to the polar groups are bonded to each other through a linking group including carbon atoms to which polar groups are not bonded, the interaction with the protective layer is relatively strong. Thus, in particular, in a case where x in Formula (1) is 2, it is preferable that $R^1$ and $R^4$ are each independently a terminal group represented by Formula (3-1) or (3-2).

(PFPE Chain Represented by $R^2$)

In the fluorine-containing ether compound represented by Formula (1), $R^2$ is a perfluoropolyether chain. In a case where the lubricant including the fluorine-containing ether compound of the present embodiment is applied onto the protective layer to form a lubricating layer, the PFPE chain represented by $R^2$ coats a surface of the protective layer and imparts lubricity to the lubricating layer, thereby reducing a frictional force between the magnetic head and the protective layer. The PFPE chain represented by $R^2$ is appropriately selected according to the performance required for the lubricant including the fluorine-containing ether compound.

(x+1) pieces of $R^2$'s may be partially or entirely the same as or different from each other. It is preferable that (x+1) pieces of $R^2$'s are entirely the same. This is because a coating state of the fluorine-containing ether compound with respect to the protective layer is more even, and the lubricating layer has better adhesion. The expression, two or more $R^2$'s among (x+1) pieces of $R^2$'s being the same, means that (x+1) pieces of $R^2$'s include two or more $R^2$'s having the same structure of the repeating units of the PFPE chain. The same $R^2$'s may also include repeating units having the same structure but different average degrees of polymerization.

Examples of the PFPE chain represented by $R^2$ include a polymer or copolymer of perfluoroalkylene oxide. Examples of the perfluoroalkylene oxide include perfluoromethylene oxide, perfluoroethylene oxide, perfluoro-n-propylene oxide, perfluoroisopropylene oxide, and perfluorobutylene oxide.

It is preferable that (x+1) pieces of $R^2$'s in Formula (1) are each independently, for example, a PFPE chain represented by Formula (4) derived from a polymer or copolymer of perfluoroalkylene oxide.

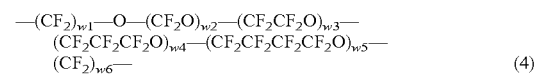

$$—(CF_2)_{w1}—O—(CF_2O)_{w2}—(CF_2CF_2O)_{w3}—(CF_2CF_2CF_2O)_{w4}—(CF_2CF_2CF_2CF_2O)_{w5}—(CF_2)_{w6}— \quad (4)$$

(in Formula (4), w2, w3, w4, and w5 each indicate an average degree of polymerization and each independently represent 0 to 20, provided that all of w2, w3, w4, and w5 are not 0 at the same time; w1 and w6 are each an average value indicating the number of $CF_2$'s and each independently represent 1 to 3; and $(CF_2O)$, $(CF_2CF_2O)$, $(CF_2CF_2CF_2O)$, and $(CF_2CF_2CF_2CF_2O)$, which are repeating units in Formula (4), is not particularly limited in the sequence order)

In Formula (4), w2, w3, w4, and w5 indicate an average degree of polymerization, and each independently represent 0 to 20, preferably 0 to 15, and more preferably 0 to 10.

In Formula (4), w1 and w6 are average values indicating the number of $CF_2$'s and each independently represent 1 to 3. w1 and w6 are determined depending on the structure of the repeating unit arranged at the end part of the chain-like structure in the PFPE chain represented by Formula (4) or the like.

$(CF_2O)$, $(CF_2CF_2O)$, $(CF_2CF_2CF_2O)$, and $(CF_2CF_2CF_2CF_2O)$ in Formula (4) are repeating units. The repeating units in Formula (4) is not particularly limited in the sequence order. In addition, the number of kinds of repeating units in Formula (4) is also not particularly limited.

(x+1) pieces of $R^2$'s in Formula (1) are each independently preferably any one selected from PFPE chains represented by Formulae (4-1) to (4-4).

In a case where (x+1) pieces of $R^2$'s are each any one selected from the PFPE chains represented by Formulae (4-1) to (4-4), the fluorine-containing ether compound makes it possible to obtain a lubricating layer having good lubricity. In addition, in a case where (x+1) pieces of $R^2$'s are each any one selected from the PFPE chains represented by Formulae (4-1) to (4-4), a proportion of the number of oxygen atoms (number of ether bonds (—O—)) to the number of carbon atoms in the PFPE chain is appropriate. Therefore, the fluorine-containing ether compound has moderate hardness. Therefore, the fluorine-containing ether compound applied onto the protective layer is not likely to be aggregated on the protective layer, and a lubricating layer of even thinner thickness can be formed on the protective layer with a sufficient coating rate. In addition, the lubricating layer including the fluorine-containing ether compound in which (x+1) pieces of $R^2$'s are any one selected from the PFPE chains represented by Formulae (4-1) to (4-4) is denser and more spin-off can be further suppressed, which is preferable.

$$—CF_2—(OCF_2CF_2)_h—(OCF_2)_i—OCF_2— \qquad (4\text{-}1)$$

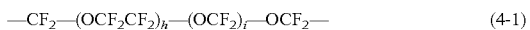

(in Formula (4-1), h and i each indicate an average degree of polymerization, h represents 1 to 20, and i represents 0 to 20)

$$—CF_2CF_2—(OCF_2CF_2CF_2)_j—OCF_2CF_2— \qquad (4\text{-}2)$$

(in Formula (4-2), j indicates an average degree of polymerization and represents 1 to 15)

$$—CF_2CF_2CF_2—(OCF_2CF_2CF_2CF_2)_k—OCF_2CF_2CF_2— \qquad (4\text{-}3)$$

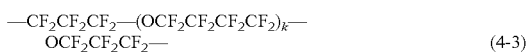

(in Formula (4-3), k indicates an average degree of polymerization and represents 1 to 10)

$$—(CF_2)_{w7}—O—(CF_2CF_2O)_{w8}—(CF_2O)_{w9}—(CF_2)_{w10}— \qquad (4\text{-}4)$$

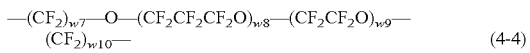

(in Formula (4-4), w8 and w9 each indicate an average degree of polymerization and each independently represent 1 to 20; and w7 and w10 are each an average value indicating the number of $CF_2$'s and each independently represent 1 or 2)

In Formula (4-1), $(OCF_2CF_2)$ and $(OCF_2)$ which are the repeating units is not particularly limited in the sequence order. In Formula (4-1), the number h of $(OCF_2CF_2)$'s and the number i of $(OCF_2)$'s may be the same as or different from each other. The PFPE chain represented by Formula (4-1) may be a polymer of $(OCF_2CF_2)$. In addition, the PFPE chain represented by Formula (4-1) may be any of a random copolymer, a block copolymer, or an alternating copolymer consisting of $(OCF_2CF_2)$ and $(OCF_2)$.

In Formulae (4-1) to (4-3), h indicating the average degree of polymerization is 1 to 20, i is 0 to 20, j is 1 to 15, and k is 1 to 10, and thus, the fluorine-containing ether compound makes it possible to obtain a lubricating layer having good lubricity. In addition, in Formulae (4-1) to (4-3), h and i each indicating an average degree of polymerization are 20 or less, j is 15 or less, and k is 10 or less, and thus, the viscosity of the fluorine-containing ether compound is not excessively high, and a lubricant including the fluorine-containing ether compound is easy to apply, which is thus preferable. h, i, j, and k, each indicating an average degree of polymerization, are each preferably 1 to 10, more preferably 1.5 to 8, and still more preferably 2 to 7 since the fluorine-containing ether compound is likely to wet-spread on the protective layer and makes it possible to obtain a lubricating layer having an even film thickness.

In Formula (4-4), $(CF_2CF_2CF_2O)$ and $(CF_2CF_2O)$, which are the repeating units, is not particularly limited in the sequence order. In Formula (4-4), the number w8 of $(CF_2CF_2CF_2O)$'s and the number w9 of $(CF_2CF_2O)$'s, each indicating an average degree of polymerization, may be the same as or different from each other. Formula (4-4) may include any of a random copolymer, a block copolymer, and an alternating copolymer, each consisting of monomer units $(CF_2CF_2CF_2O)$ and $(CF_2CF_2O)$.

In Formula (4-4), w8 and w9, each indicating an average degree of polymerization, are each independently 1 to 20, preferably 1 to 15, and more preferably 1 to 10.

w7 and w10 in Formula (4-4) are average values indicating the number of $CF_2$'s and each independently represent 1 or 2. w7 and w10 are determined depending on the structure of the repeating unit arranged at an end part of the chain-like structure in the PFPE chain represented by Formula (4-4) or the like.

In the fluorine-containing ether compound represented by Formula (1), in a case where x is 1, it is preferable that two $R^2$'s are the same as each other and $R^1$ and $R^4$ are the same as each other. This is because it is possible to produce the fluorine-containing ether compound easily and efficiently.

In the fluorine-containing ether compound represented by Formula (1), in a case where x is 2, it is preferable that two $R^3$'s are the same as each other, $R^2$ on the $R^1$ side and $R^2$ on the $R^4$ side are the same as each other, and $R^1$ and $R^4$ are the same as each other. This is because it is possible to produce the fluorine-containing ether compound easily and efficiently.

Specifically, the fluorine-containing ether compound represented by Formula (1) is preferably any of compounds represented by Formulae (AA) to (AT), (BA) to (BR), (CA) to (CJ), (DA) to (DG), and (EA) to (EC).

In a case where the compound represented by Formula (1) is any of the compounds represented by Formulae (AA) to (AT), (BA) to (BR), (CA) to (CJ), (DA) to (DG), or (EA) to (EC), it is possible to form a lubricating layer in which raw materials therefor are easily available and the lubricating layer has even better corrosion resistance and a high spin-off suppressing effect even in a case where the thickness is small.

In the compounds represented by Formulae (AA) to (AT), (BA) to (BR), (CA) to (CJ), (DA) to (DG), and (EA) to (EC), $Rf_1$, $Rf_2$, and $Rf_3$ representing PFPE chains each have the following structures. That is, in the compounds represented by Formulae (AA) to (AT), (BC) to (BR), (CA) to (CJ), (DB) to (DG), and (EA) to (EC), $Rf_1$ is a PFPE chain represented by Formula (4-1). In the compounds represented by Formulae (BA) and (DA), $Rf_2$ is the PFPE chain represented by Formula (4-2). In the compound represented by Formula (BB), $Rf_3$ is the PFPE chain represented by Formula (4-3). Furthermore, h and i in $Rf_1$, j in $Rf_2$, and k in $Rf_3$, representing the PFPE chain in Formulae (AA) to (AT), (BA) to (BR), (CA) to (CJ), (DA) to (DG), and (EA) to (EC), are each a value indicating the average degree of polymerization, and are thus not necessarily an integer.

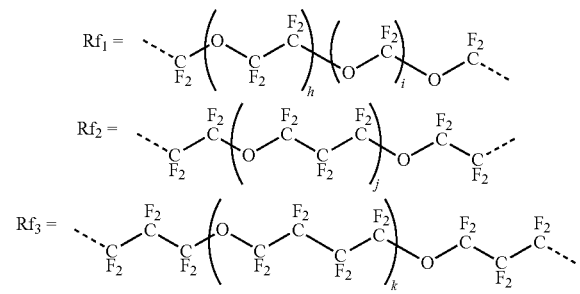

In the compounds represented by Formulae (AA) to (AT), x in Formula (1) is 1. $R^3$ is a linking group represented by any of Formulae (2-1) to (2-5). $R^1$ and $R^4$ are each the terminal group represented by Formula (3-1). $R^2$ is the PFPE chain represented by Formula (4-1).

In the compounds represented by Formulae (BA) and (BB), x in Formula (1) is 1. $R^3$ is the linking group represented by Formula (2-1). $R^1$ and $R^4$ are each the terminal group represented by Formula (3-1). In Formula (BA), $R^2$ is Formula (4-2), and in Formula (BB), $R^2$ is the PFPE chain represented by Formula (4-3).

In the compounds represented by Formulae (BC) to (BR), x in Formula (1) is 1. $R^3$ is the linking group represented by Formula (2-1). In Formulae (BC), (BE), (BF), (BH) to (BJ), (BL), (BQ), and (BR), $R^1$ and $R^4$ are each Formula (3-1). In Formulae (BD), (BG), and (BK), $R^1$ and $R^4$ are each Formula (3-2). In Formulae (BM) to (BP), $R^1$ and $R^4$ are each the terminal group represented by Formula (3), which does not correspond to Formulae (3-1) and (3-2). In the compounds represented by Formulae (BC) to (BR), $R^2$ is the PFPE chain represented by Formula (4-1).

In the compounds represented by Formulae (CA) to (CJ), x in Formula (1) is 2. $R^3$ is a linking group represented by any of Formulae (2-1) to (2-5). $R^1$ and $R^4$ are each the terminal group represented by Formula (3-1). $R^2$ is the PFPE chain represented by Formula (4-1).

In the compound represented by Formula (DA), x in Formula (1) is 2. $R^3$ is the linking group represented by Formula (2-1). $R^1$ and $R^4$ are each the terminal group represented by Formula (3-1). $R^2$ is the PFPE chain represented by Formula (4-2).

In the compounds represented by Formulae (DB) to (DG), x in Formula (1) is 2. $R^3$ is the linking group represented by Formula (2-1). In Formulae (DB) and (DD) to (DF), $R^1$ and $R^4$ are each Formula (3-1). In Formula (DC), $R^1$ and $R^4$ are each Formula (3-2). Formula (DG) is a terminal group represented by Formula (3), in which $R^1$ and $R^4$ do not correspond to Formulae (3-1) and (3-2). The compounds represented by Formulae (DB) to (DG) are each a compound in which $R^2$ is the PFPE chain represented by Formula (4-1).

In the compound represented by Formula (EA), x in Formula (1) is 1. $R^3$ is the linking group represented by Formula (2-5). $R^1$ and $R^4$ are each the terminal group represented by Formula (3-1). $R^2$ is the PFPE chain represented by Formula (4-1).

In the compound represented by Formula (EB), x in Formula (1) is 1. $R^3$ is the linking group represented by Formula (2-5). $R^1$ and $R^4$ are each the terminal group represented by Formula (3) which does not correspond to Formulae (3-1) and (3-2). $R^2$ is the PFPE chain represented by Formula (4-1).

In the compound represented by Formula (EC), x in Formula (1) is 1. $R^3$ is the linking group represented by Formula (2-4). $R^1$ and $R^4$ are each the terminal group represented by Formula (3) which does not correspond to Formulae (3-1) and (3-2). $R^2$ is the PFPE chain represented by Formula (4-1).

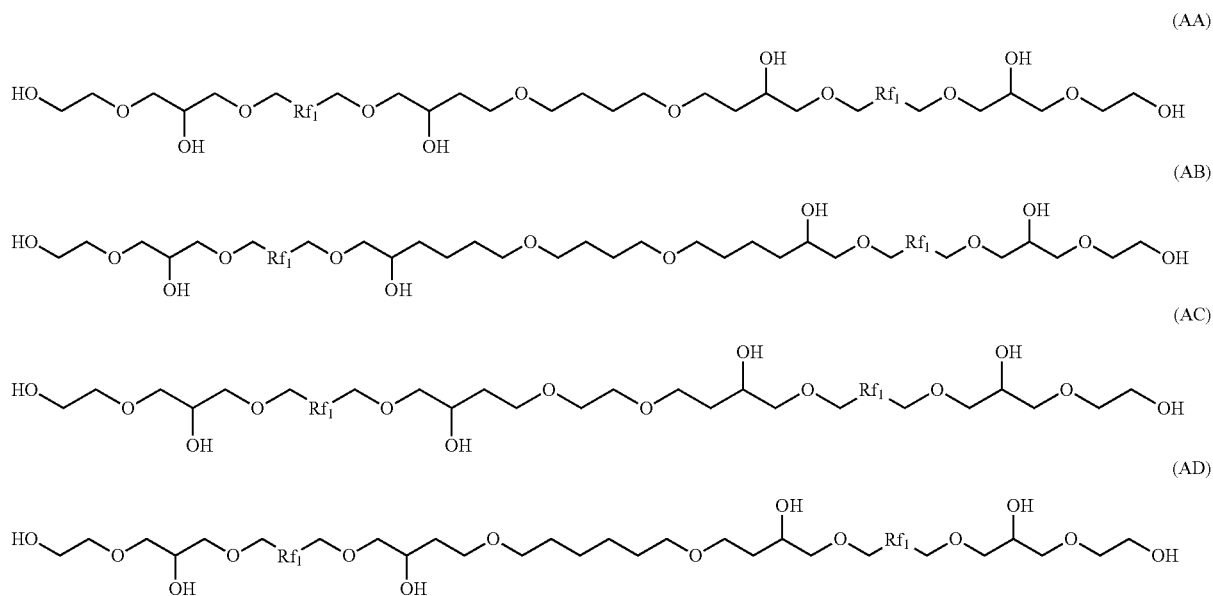

(in the two $Rf_1$'s in Formula (AA), h and i each indicate an average degree of polymerization, h represents 1 to 20, and i represents 0 to 20, and in the two $Rf_1$'s, the average degrees of polymerization may have the same as or different from each other)

(in the two $Rf_1$'s in Formula (AB), h and i each indicate an average degree of polymerization, h represents 1 to 20, and i represents 0 to 20, and in the two $Rf_1$'s, the average degrees of polymerization may have the same as or different from each other)

(in the two $Rf_1$'s in Formula (AC), h and i each indicate an average degree of polymerization, h represents 1 to 20, and i represents 0 to 20, and in the two $Rf_1$'s, the average degrees of polymerization may have the same as or different from each other)

(in the two $Rf_1$'s in Formula (AD), h and i each indicate an average degree of polymerization, h represents 1 to 20, and i represents 0 to 20, and in the two $Rf_1$'s, the average degrees of polymerization may have the same as or different from each other)

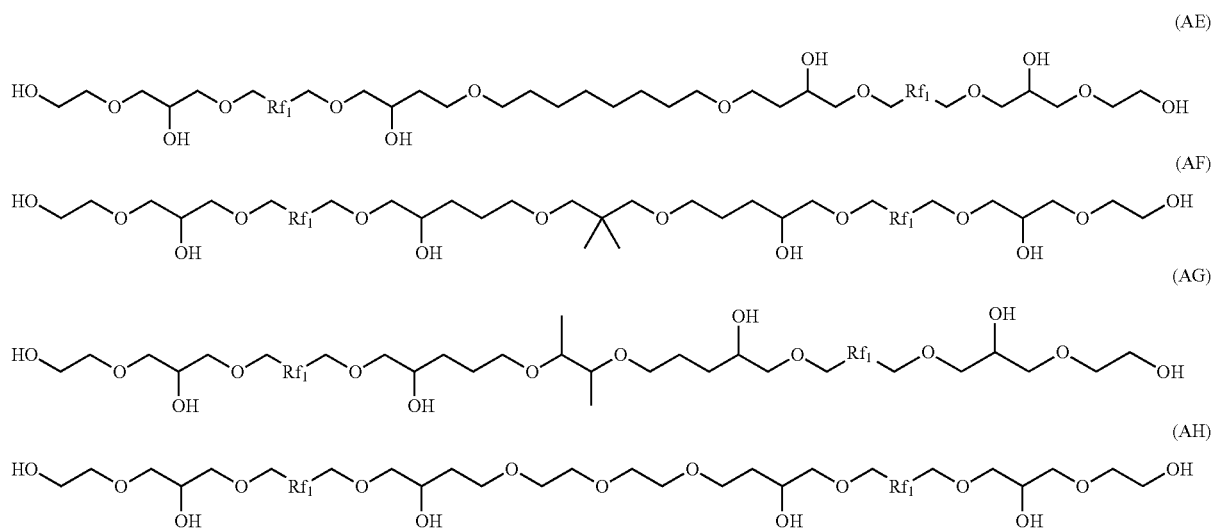

(in the two Rf$_1$'s in Formula (AE), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (AF), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (AG), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (AH), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (AI), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (AJ), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (AK), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (AL), h and i each indicate an average degree of polymerization, h represents 1 to 20, and i represents 0 to 20, and in the two Rf$_1$'s, the average degrees of polymerization may have the same as or different from each other)

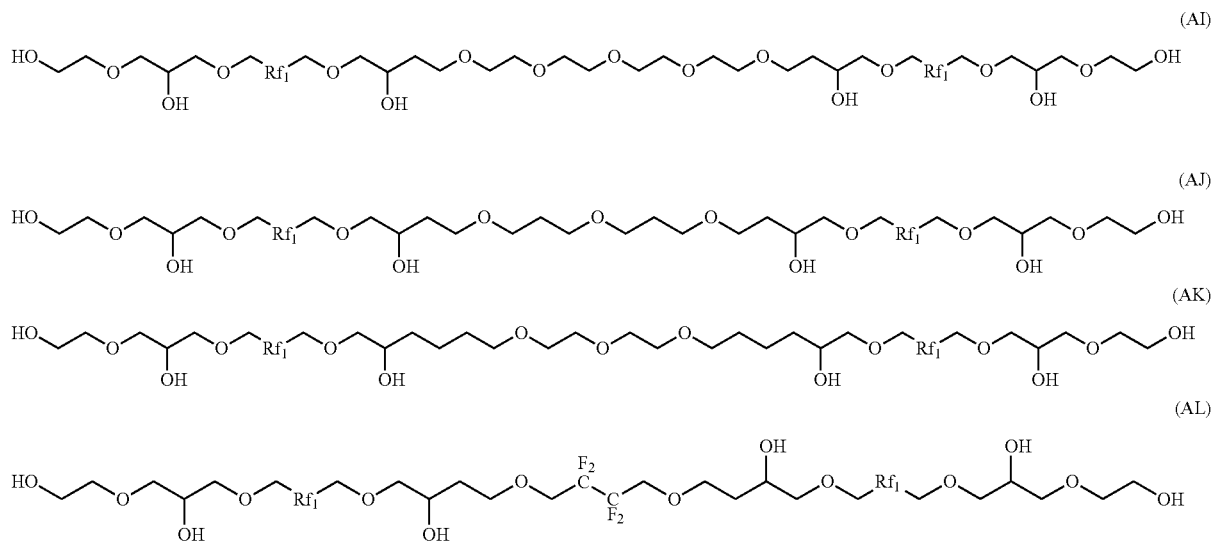

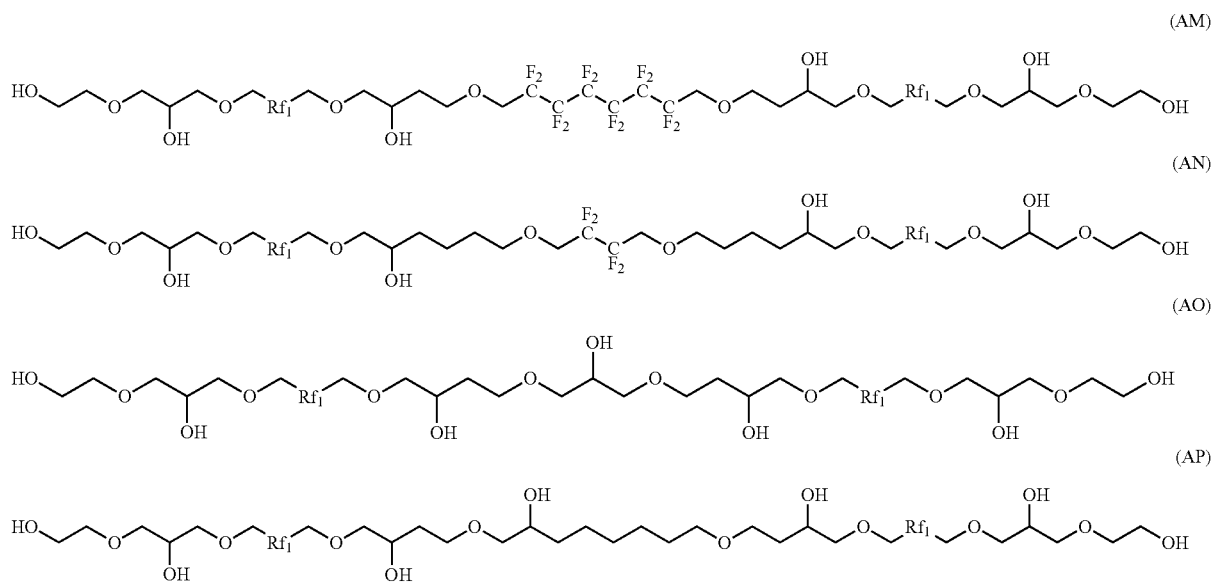

(AM)
(AN)
(AO)
(AP)

(in the two Rf$_1$'s in Formula (AM), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (AP), h and i each indicate an average degree of polymerization, h represents 1 to 20, and i represents 0 to 20, and in the two Rf$_1$'s, the average degrees of polymerization may have the same as or different from each other)

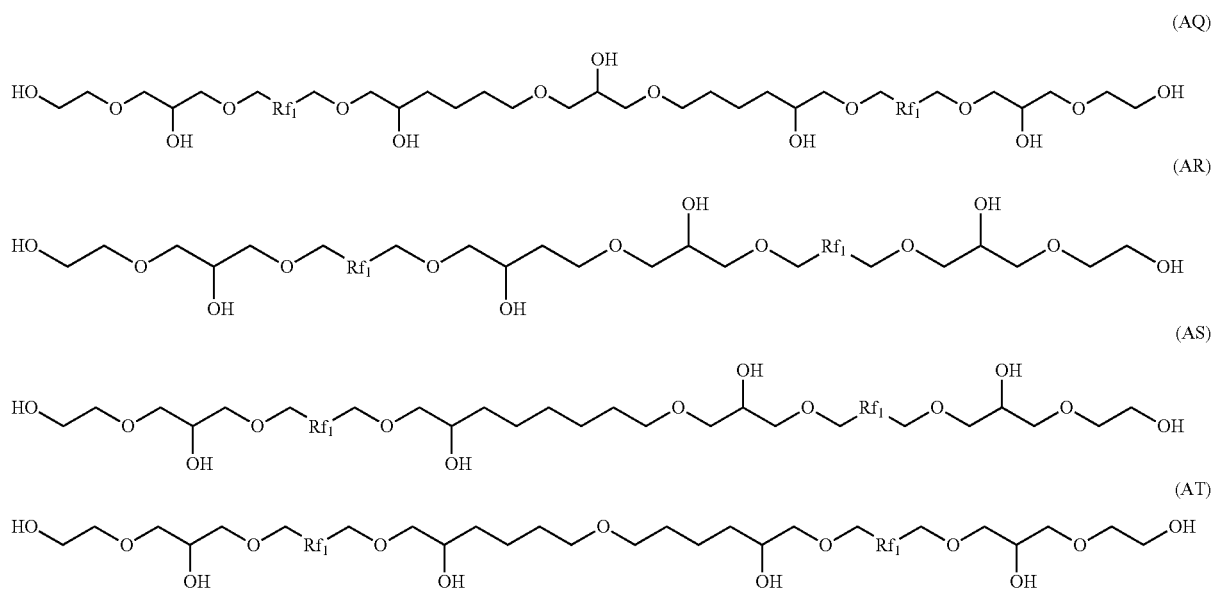

(AQ)
(AR)
(AS)
(AT)

(in the two Rf$_1$'s in Formula (AN), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (AO), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (AQ), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (AR), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (AS), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (AT), h and i each indicate an average degree of polymerization, h represents 1 to 20, and i represents 0 to 20, and in the two Rf$_1$'s, the average degrees of polymerization may have the same as or different from each other)

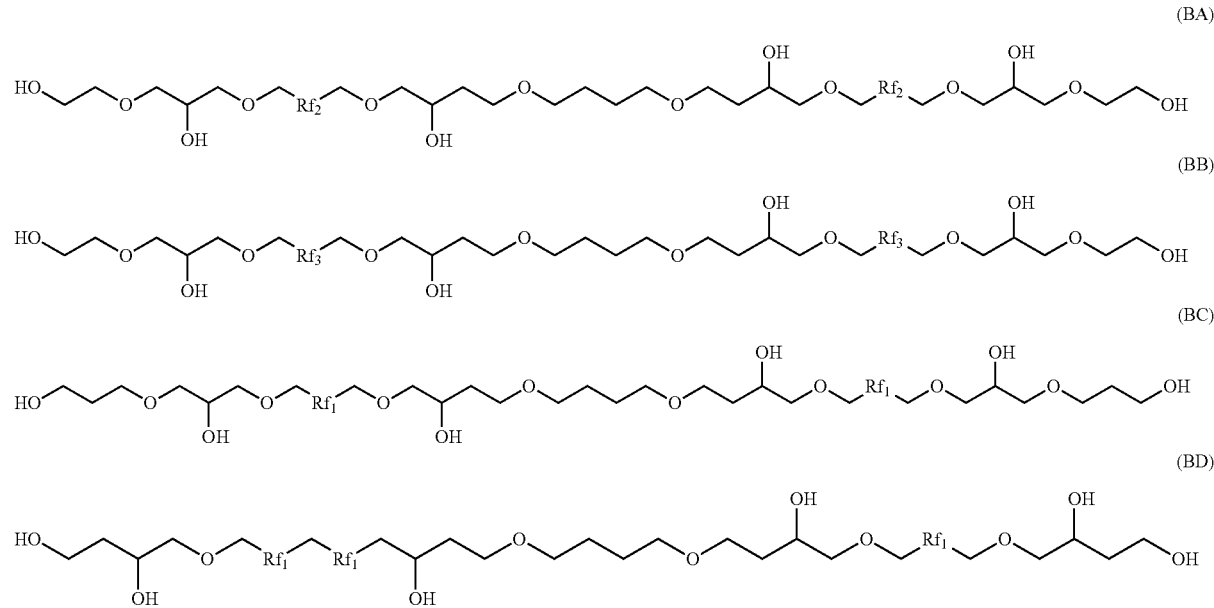

(in the two Rf$_2$'s in Formula (BA), j indicates an average degree of polymerization and represents 1 to 15. in the two Rf$_2$'s, the average degrees of polymerization may have the same as or different from each other)

(in the two Rf$_3$'s in Formula (BB), k indicates an average degree of polymerization and represents 1 to 10, in the two Rf$_3$'s, the average degrees of polymerization may have the same as or different from each other)

(in the two Rf$_1$'s in Formula (BC), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (BD), h and i each indicate an average degree of polymerization, h represents 1 to 20, and i represents 0 to 20, and in the two Rf$_1$'s, the average degrees of polymerization may have the same as or different from each other)

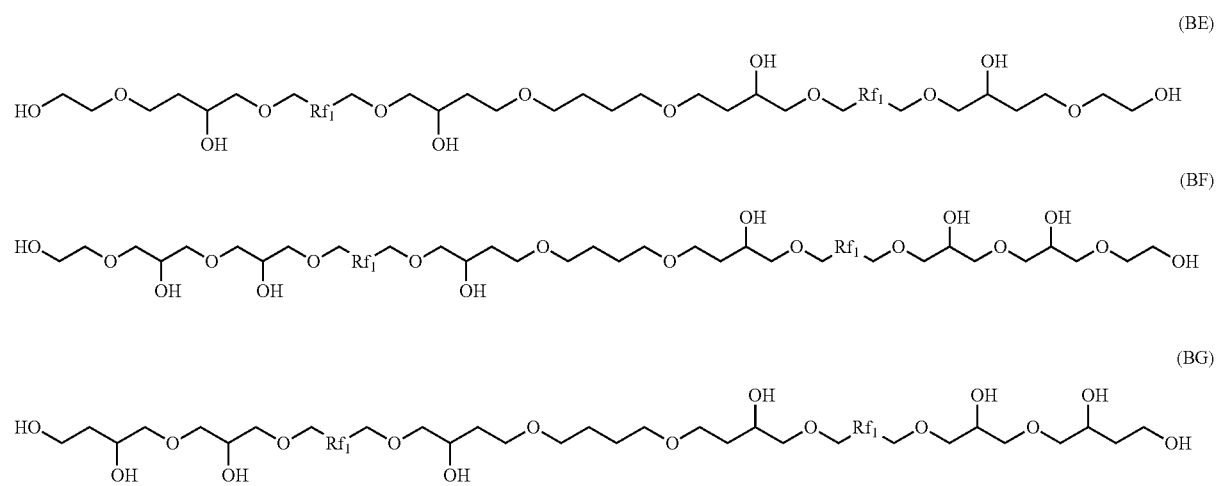

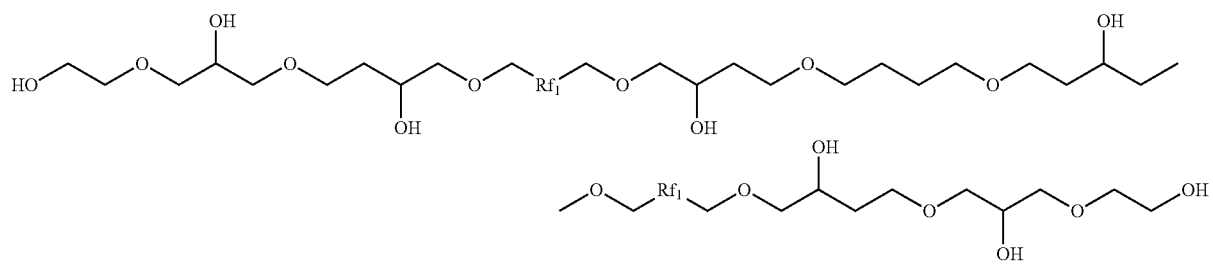

(in the two Rf₁'s in Formula (BE), h and i each indicate an average degree of polymerization, h represents 1 to 20, and i represents 0 to 20, and in the two Rf₁'s, the average degrees of polymerization may have the same as or different from each other)

(in the two Rf₁'s in Formula (BF), h and i each indicate an average degree of polymerization, h represents 1 to 20, and i represents 0 to 20, and in the two Rf₁'s, the average degrees of polymerization may have the same as or different from each other)

(in the two Rf₁'s in Formula (BG), h and i each indicate an average degree of polymerization, h represents 1 to 20, and i represents 0 to 20, and in the two Rf₁'s, the average degrees of polymerization may have the same as or different from each other)

(in the two Rf₁'s in Formula (BH), h and i each indicate an average degree of polymerization, h represents 1 to 20, and i represents 0 to 20, and in the two Rf₁'s, the average degrees of polymerization may have the same as or different from each other)

(in the two Rf₁'s in Formula (BI), h and i each indicate an average degree of polymerization, h represents 1 to 20, and i represents 0 to 20, and in the two Rf₁'s, the average degrees of polymerization may have the same as or different from each other)

(in the two Rf₁'s in Formula (BJ), h and i each indicate an average degree of polymerization, h represents 1 to 20, and i represents 0 to 20, and in the two Rf₁'s, the average degrees of polymerization may have the same as or different from each other)

(in the two Rf₁'s in Formula (BK), h and i each indicate an average degree of polymerization, h represents 1 to 20, and i represents 0 to 20, and in the two Rf₁'s, the average degrees of polymerization may have the same as or different from each other)

(in the two Rf₁'s in Formula (BL), h and i each indicate an average degree of polymerization, h represents 1 to 20, and i represents 0 to 20, and in the two Rf₁'s, the average degrees of polymerization may have the same as or different from each other)

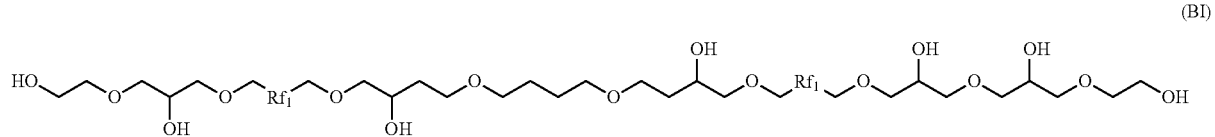

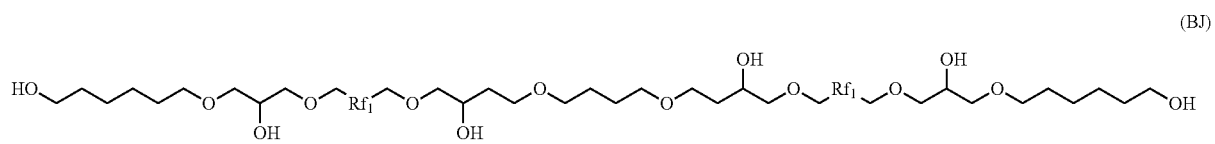

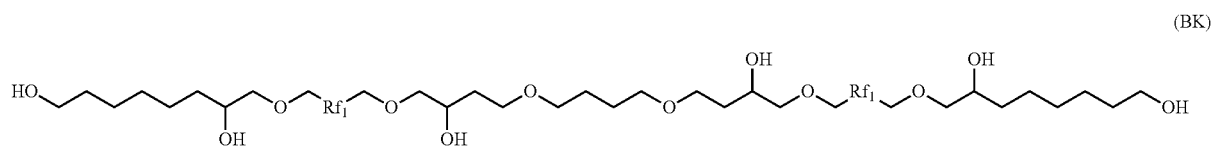

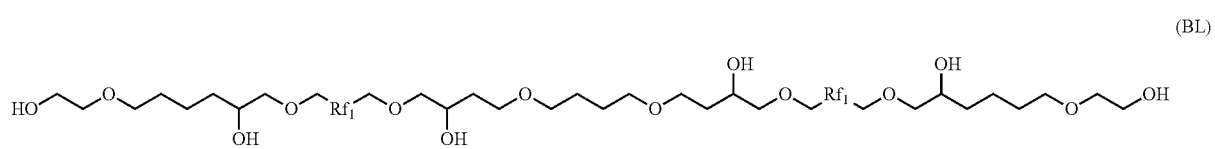

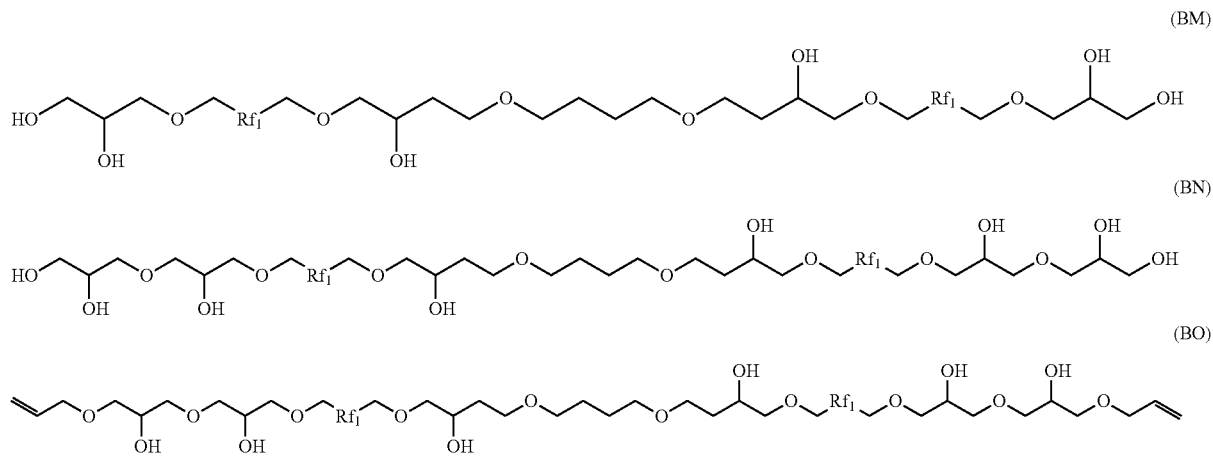

(in the two Rf$_1$'s in Formula (BM), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (BN), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (BO), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (BP), h and i each indicate an average degree of polymerization, h represents 1 to 20, and i represents 0 to 20, in the two Rf$_1$'s, the average degrees of polymerization may have the same as or different from each other, and Me represents a methyl group)

(in the two Rf$_1$'s in Formula (BQ), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (BR), h and i each indicate an average degree of polymerization, h represents 1 to 20, and i represents 0 to 20, and in the two Rf$_1$'s, the average degrees of polymerization may have the same as or different from each other)

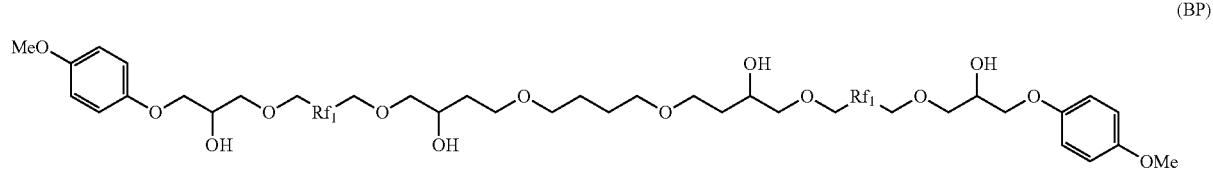

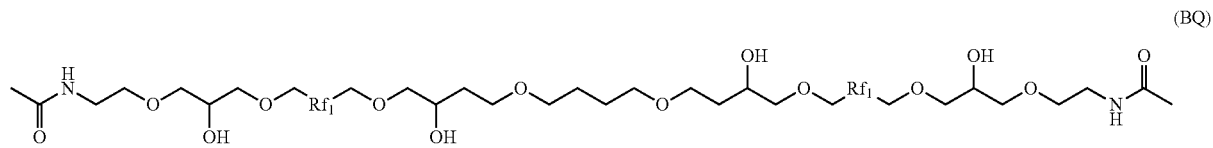

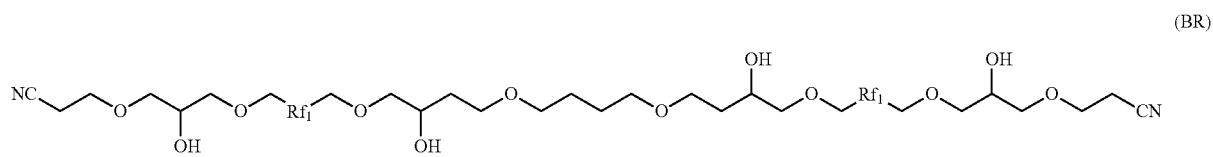

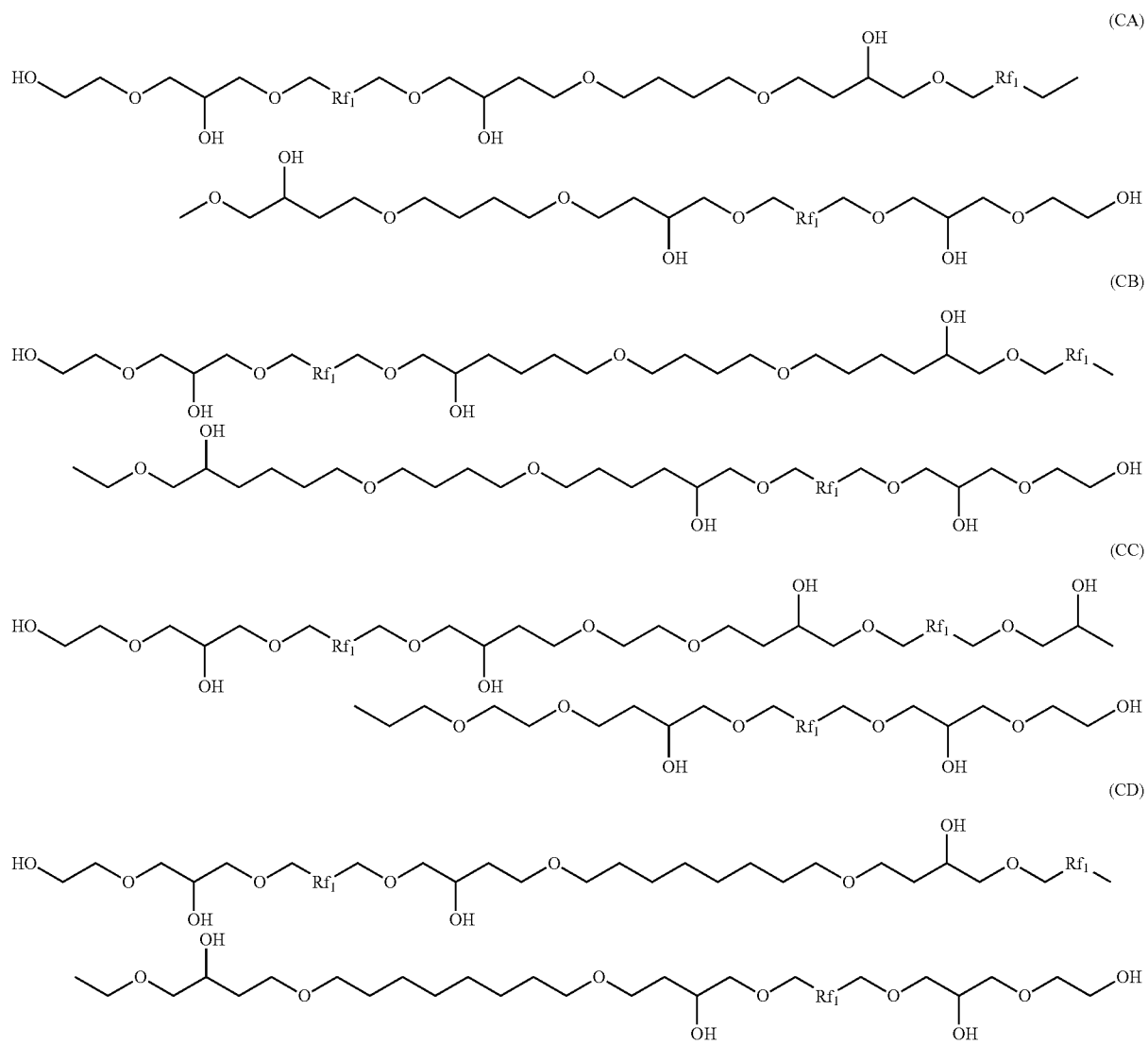

(in the three Rf$_1$'s in Formula (CA), h and i each indicate an average degree of polymerization, h represents 1 to 20, and i represents 0 to 20, and h and i in the three Rf$_1$'s may be partially or entirely the same as or different from each other)

(in the three Rf$_1$'s in Formula (CB), h and i each indicate an average degree of polymerization, h represents 1 to 20, and i represents 0 to 20, and h and i in the three Rf$_1$'s may be partially or entirely the same as or different from each other)

(in the three Rf$_1$'s in Formula (CC), h and i each indicate an average degree of polymerization, h represents 1 to 20, and i represents 0 to 20, and h and i in the three Rf$_1$'s may be partially or entirely the same as or different from each other)

(in the three Rf$_1$'s in Formula (CD), h and i each indicate an average degree of polymerization, h represents 1 to 20, and i represents 0 to 20, and h and i in the three Rf$_1$'s may be partially or entirely the same as or different from each other)

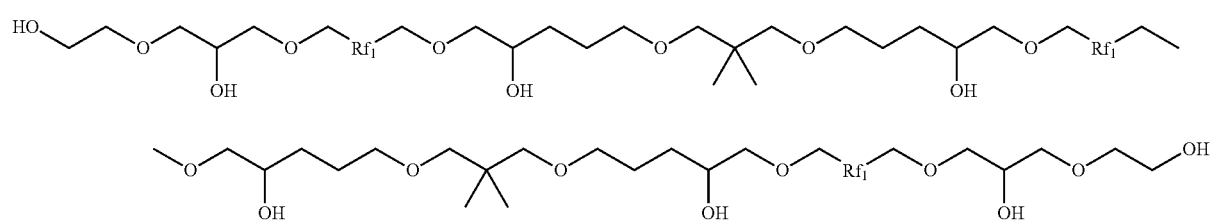

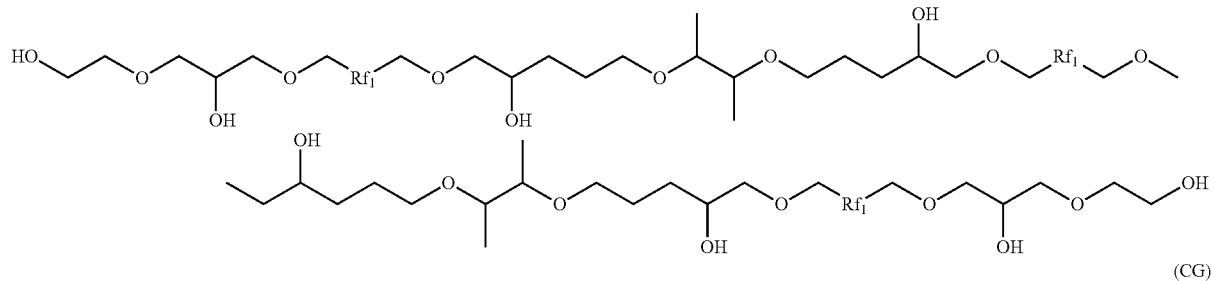

(CF)

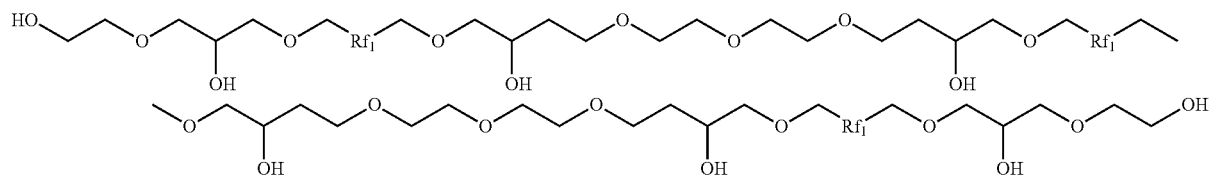

(CG)

- (in the three Rf$_1$'s in Formula (CE), h and i each indicate an average degree of polymerization, h represents 1 to 20, and i represents 0 to 20, and h and i in the three Rf$_1$'s may be partially or entirely the same as or different from each other)
- (in the three Rf$_1$'s in Formula (CF), h and i each indicate an average degree of polymerization, h represents 1 to 20, and i represents 0 to 20, and h and i in the three Rf$_1$'s may be partially or entirely the same as or different from each other)
- (in the three Rf$_1$'s in Formula (CG), h and i each indicate an average degree of polymerization, h represents 1 to 20, and i represents 0 to 20, and h and i in the three Rf$_1$'s may be partially or entirely the same as or different from each other)
- (in the three Rf$_1$'s in Formula (CH), h and i each indicate an average degree of polymerization, h represents 1 to 20, and i represents 0 to 20, and h and i in the three Rf$_1$'s may be partially or entirely the same as or different from each other)
- (in the three Rf$_1$'s in Formula (CI), h and i each indicate an average degree of polymerization, h represents 1 to 20, and i represents 0 to 20, and h and i in the three Rf$_1$'s may be partially or entirely the same as or different from each other)
- (in the three Rf$_1$'s in Formula (CJ), h and i each indicate an average degree of polymerization, h represents 1 to 20, and i represents 0 to 20, and h and i in the three Rf$_1$'s may be partially or entirely the same as or different from each other)

(CH)

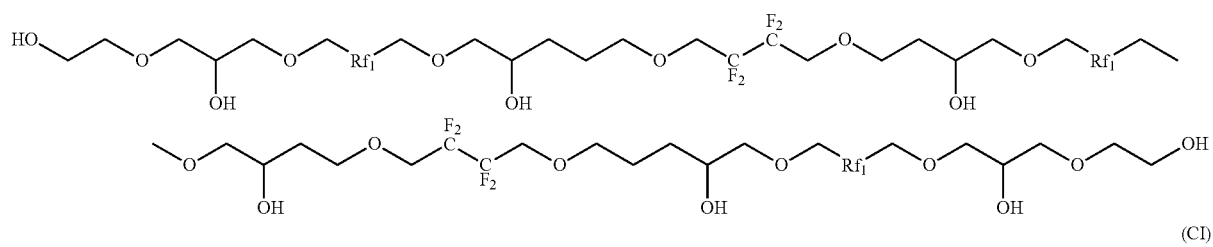

(CI)

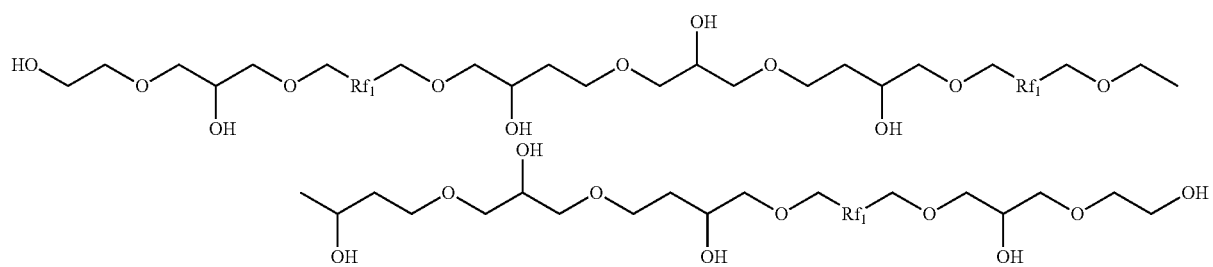

(CJ)

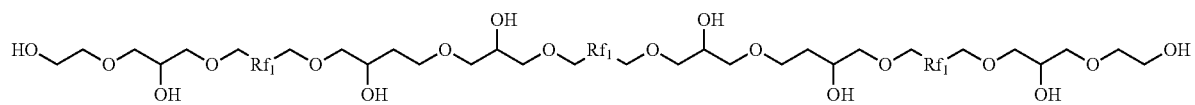

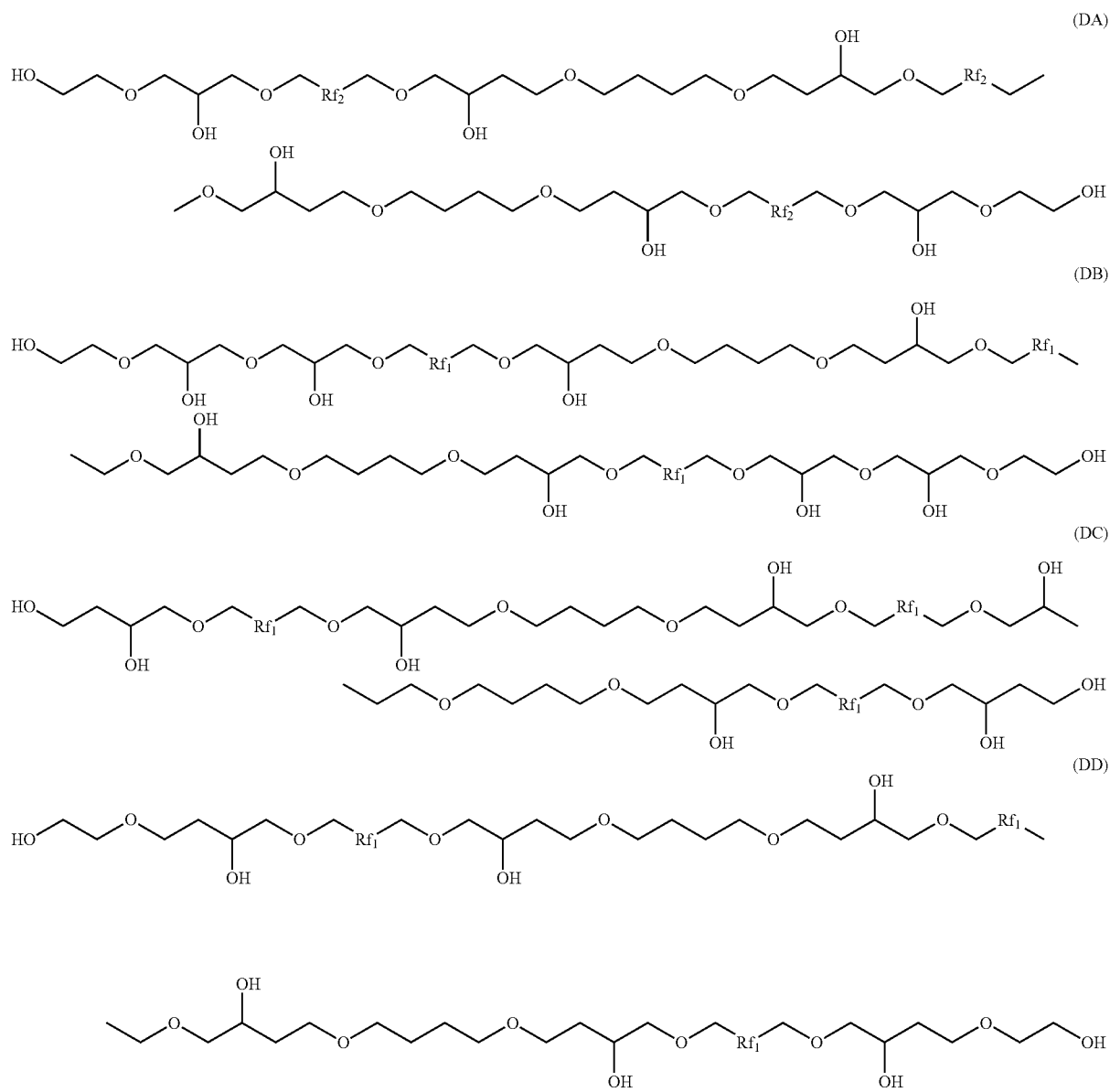

(in the three Rf$_2$'s in Formula (DA), j indicates an average degree of polymerization and represents 1 to 15. In the three Rf$_2$'s, the average degree of polymerization may be partially or entirely the same as or different from each other)

(in the three Rf$_1$'s in Formula (DB), h and i each indicate an average degree of polymerization, h represents 1 to 20, and i represents 0 to 20, and h and i in the three Rf$_1$'s may be partially or entirely the same as or different from each other)

(in the three Rf$_1$'s in Formula (DC), h and i each indicate an average degree of polymerization, h represents 1 to 20, and i represents 0 to 20, and h and i in the three Rf$_1$'s may be partially or entirely the same as or different from each other)

(in the three Rf$_1$'s in Formula (DD), h and i each indicate an average degree of polymerization, h represents 1 to 20, and i represents 0 to 20, and h and i in the three Rf$_1$'s may be partially or entirely the same as or different from each other)

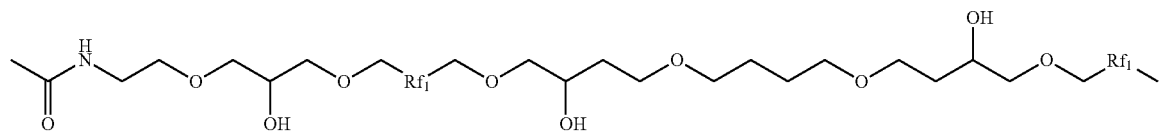

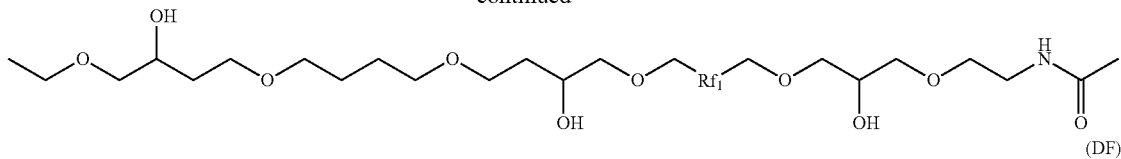

(DF)

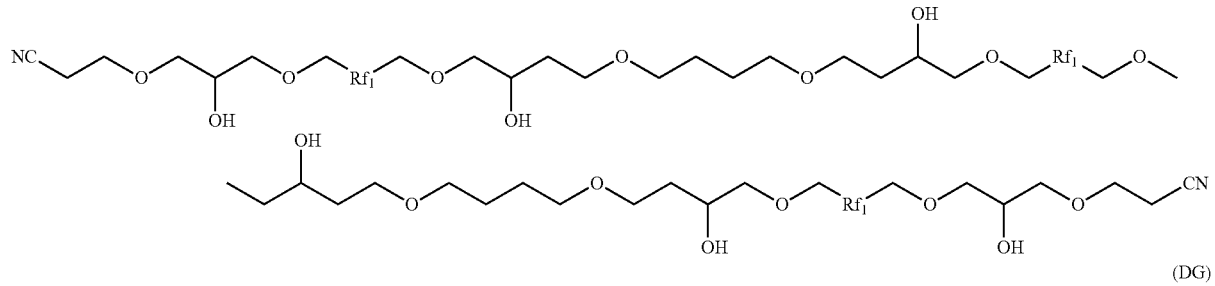

(DG)

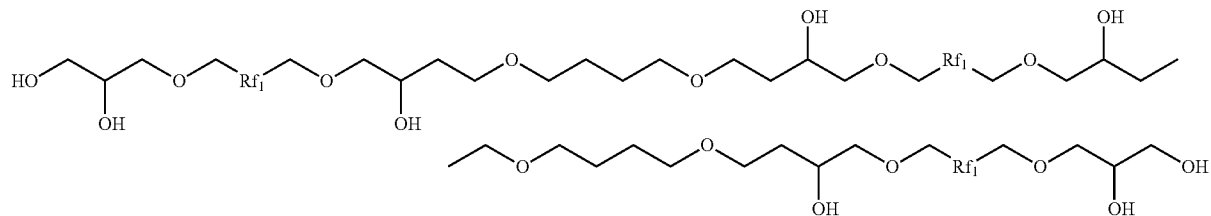

(in the three Rf$_1$'s in Formula (DE), h and i each indicate an average degree of polymerization, h represents 1 to 20, and i represents 0 to 20, and h and i in the three Rf$_1$'s may be partially or entirely the same as or different from each other)

(in the three Rf$_1$'s in Formula (DF), h and i each indicate an average degree of polymerization, h represents 1 to 20, and i represents 0 to 20, and h and i in the three Rf$_1$'s may be partially or entirely the same as or different from each other)

(in the three Rf$_1$'s in Formula (DG), h and i each indicate an average degree of polymerization, h represents 1 to 20, and i represents 0 to 20, and h and i in the three Rf$_1$'s may be partially or entirely the same as or different from each other)

(in the two Rf$_1$'s in Formula (EA), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (EB), h and i each indicate an average degree of polymerization, h represents 1 to 20, and i represents 0 to 20, and in the two Rf$_1$'s, the average degrees of polymerization may have the same as or different from each other)

(in the two Rf$_1$'s in Formula (EC), h and i each indicate an average degree of polymerization, h represents 1 to 20, and i represents 0 to 20, and in the two Rf$_1$'s, the average degrees of polymerization may have the same as or different from each other)

(EA)

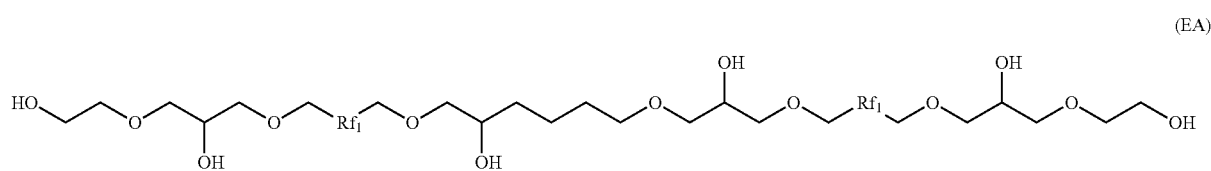

(EB)

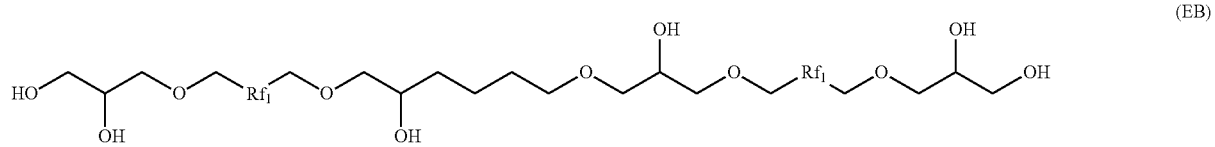

(EC)

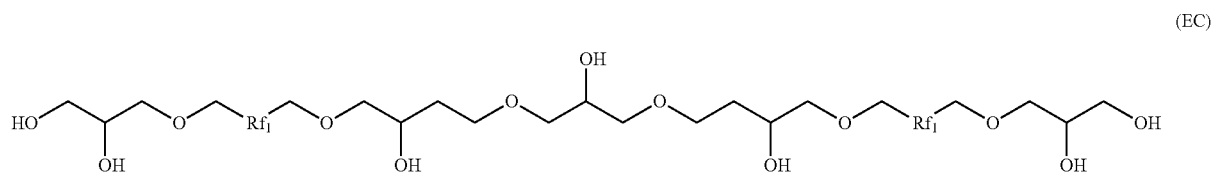

A number-average molecular weight (Mn) of the fluorine-containing ether compound of the present embodiment is preferably in a range of 500 to 10,000, and particularly preferably in a range of 1,000 to 5,000. In a case where the number-average molecular weight is 500 or more, the lubricating layer consisting of the lubricant including the fluorine-containing ether compound of the present embodiment has excellent heat resistance. The number-average molecular weight of the fluorine-containing ether compound is more preferably 1,000 or more. In addition, in a case where the number-average molecular weight is 10,000 or less, the viscosity of the fluorine-containing ether compound is appropriate, and a lubricating layer with a small film thickness can be easily formed by applying the lubricant including the fluorine-containing ether compound. The number-average molecular weight of the fluorine-containing ether compound is preferably 5,000 or less since a viscosity which is easy to handle is obtained in a case of being applied to the lubricant.

The number-average molecular weight (Mn) of the fluorine-containing ether compound is a value measured by $^1$H-NMR and $^{19}$F-NMR using AVANCE III 400 manufactured by Bruker BioSpin GmbH. Specifically, the number of repeating units of the PFPE chain is calculated from an integrated value measured by $^{19}$F-NMR to determine the number-average molecular weight. In the measurement of nuclear magnetic resonance (NMR), a sample is diluted with a solvent of hexafluorobenzene/d-acetone (4/1 v/v) and measured. A reference of the $^{19}$F-NMR chemical shift is a peak of hexafluorobenzene at −164.7 ppm and a reference of the $^1$H-NMR chemical shift is a peak of acetone at 2.2 ppm.

The fluorine-containing ether compound of the present embodiment is preferably subjected to molecular weight fractionation by an appropriate method to have a polydispersity (ratio of a weight average molecular weight (Mw)/a number-average molecular weight (Mn)) of 1.3 or less.

In the present embodiment, a method for fractionating the molecular weight is not particularly limited, and for example, a molecular weight fractionation by a silica gel column chromatography method, a gel permeation chromatography (GPC) method, or the like, a molecular weight fractionation by a supercritical extraction method, or the like can be used.

"Production Method"

A method for producing a fluorine-containing ether compound of the present embodiment is not particularly limited, and the fluorine-containing ether compound can be produced by a known production method in the related art. The fluorine-containing ether compound of the present embodiment can be produced, for example, by a production method shown below.

[First Production Method (Case where x is 1)]
(Case where $R^1$ and $R^4$ Are Same as Each Other and Two $R^2$'s are Same as Each Other)

A fluorine-based compound in which a hydroxymethyl group (—$CH_2OH$) is arranged at each of both terminals of a perfluoropolyether chain corresponding to $R^2$ in Formula (1) is prepared.

Next, the hydroxy group of the hydroxymethyl group arranged at one of terminals of the fluorine-based compound and an epoxy compound having a group corresponding to $R^1$ (=a group corresponding to $R^4$) in Formula (1) are reacted with each other (first reaction). Thus, an intermediate compound 1 having a group corresponding to $R^1$ (=a group corresponding to $R^4$) at one of terminals of the perfluoropolyether chain corresponding to $R^2$ is obtained.

As the epoxy compound having a group corresponding to $R^1$ (=a group corresponding to $R^4$) in Formula (1), for example, compounds represented by Formulae (5-1) to (5-16) can be used. THP in Formulae (5-1) to (5-13) represents a tetrahydropyranyl group. Me in Formula (5-14) represents a methyl group.

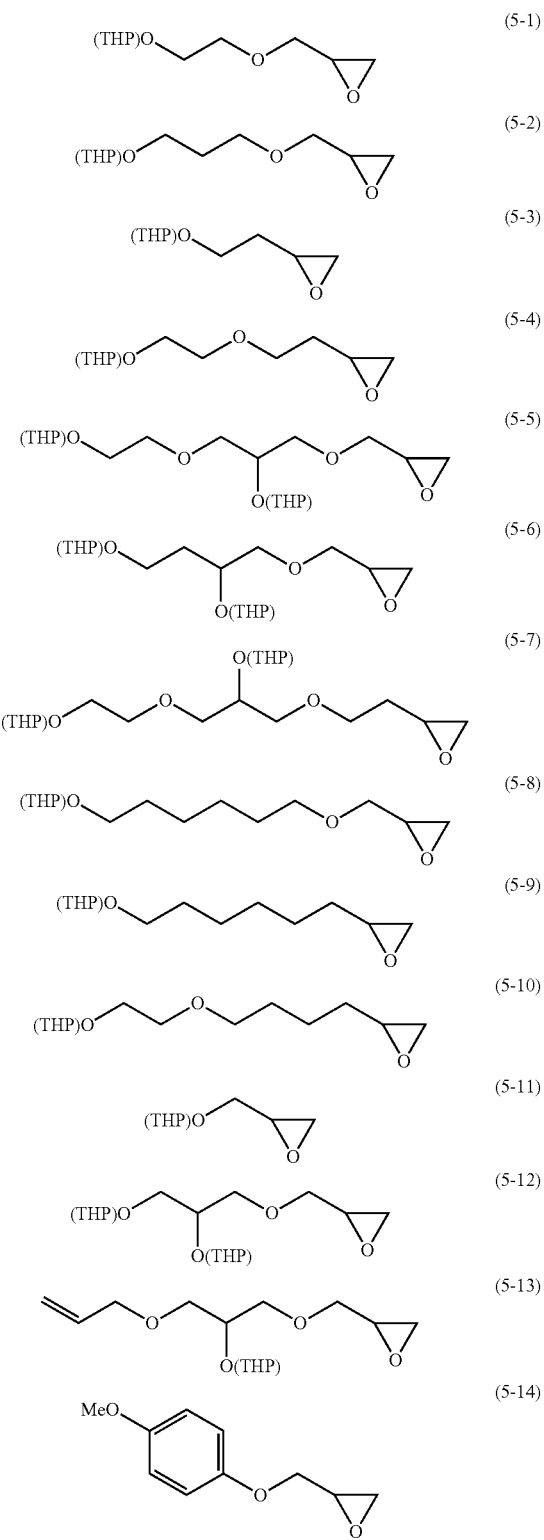

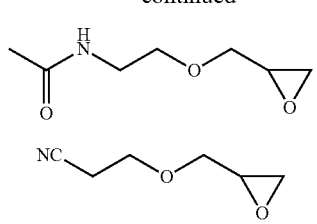

The epoxy compound having a group corresponding to $R^1$ (=a group corresponding to $R^4$) in Formula (1) can be produced by a method shown below. That is, the compound can be produced by preparing a diol having a structure corresponding to a part of the terminal group represented by $R^1$ or $R^4$ in Formula (1), protecting one of hydroxy groups thereof by a known method, and then reacting the diol with a halogen compound such as a bromine compound having an epoxy group and a chlorine compound having an epoxy group.

For example, in a case of producing a compound represented by Formula (5-2), the compound can be produced using a method in which one of hydroxy groups of 1,3-propanediol is protected using dihydropyran (DHP) and epibromohydrin is reacted therewith, as shown in Formula (6-1). THP in Formula (6-1) represents a tetrahydropyranyl group.

The epoxy compound may be produced by a method shown below. That is, the hydroxy group of 2-(2-bromoethoxy)tetrahydro-2H-pyran and an alcohol having an alkenyl group corresponding to a part of the terminal group represented by $R^1$ or $R^4$ in Formula (1) are reacted with each other. Thereafter, a method in which the obtained compound is oxidized by reacting m-chloroperbenzoic acid (mCPBA) therewith can be used to produce the epoxy compound.

For example, a compound represented by Formula (5-4) can be produced by a method in which 2-(2-bromoethoxy)tetrahydro-2H-pyran and 3-buten-1-ol are reacted with each other, and then the product is oxidized by reacting m-chloroperbenzoic acid therewith, as shown in Formula (6-2). THP in Formula (6-2) represents a tetrahydropyranyl group.

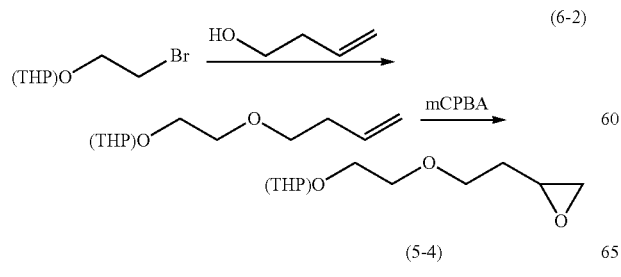

The epoxy compound may be produced by a method shown below. That is, an epoxy compound having a structure corresponding to a part of the terminal group represented by $R^1$ or $R^4$ in Formula (1) and having a hydroxy group protected with a protective group at one end is produced by a known method. The obtained compound is subjected to an addition reaction with an alcohol having an alkenyl group corresponding to a part of the terminal group represented by $R^1$ or $R^4$ in Formula (1). Thereafter, a method in which the obtained compound is oxidized by reacting m-chloroperbenzoic acid (mCPBA) therewith can be used to produce the epoxy compound. Before oxidizing the compound obtained by the addition reaction by reacting m-chloroperbenzoic acid (mCPBA) therewith, a hydroxy group generated by the addition reaction may be protected with a known method.

For example, a compound represented by Formula (5-5) can be produced by a method in which the epoxy compound represented by Formula (5-1) and an allyl alcohol are subjected to an addition reaction, a hydroxy group generated by the addition reaction is then protected using dihydropyran (DHP), and the product is oxidized by reacting m-chloroperbenzoic acid (mCPBA) therewith, as shown in Formula (6-3). THP in Formula (6-3) represents a tetrahydropyranyl group.

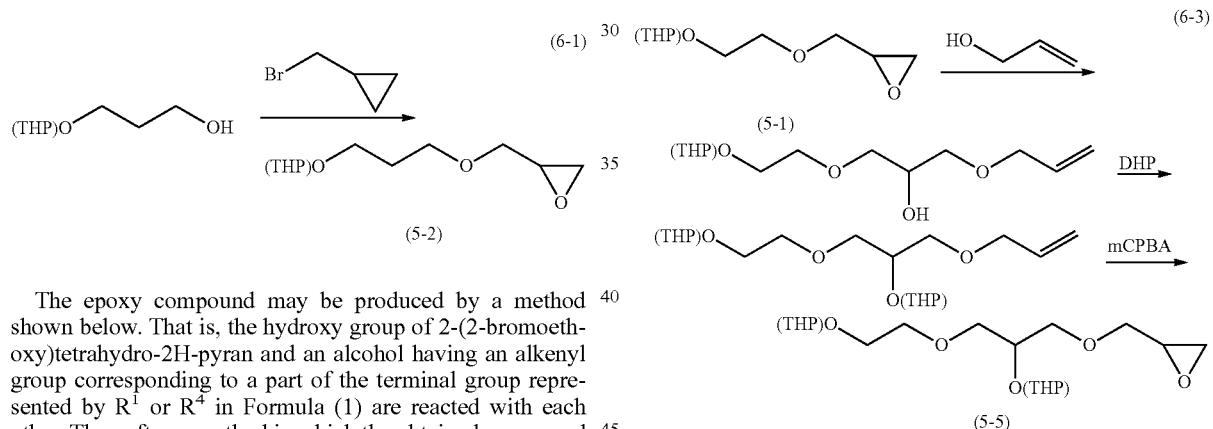

Thereafter, the hydroxy group of the hydroxymethyl group arranged at one of terminals of the intermediate compound 1 generated in the above-described first reaction and a compound having two epoxy groups corresponding to $R^3$ in Formula (1) are reacted with each other (second reaction).

As the compound having two epoxy groups corresponding to $R^3$ in Formula (1), for example, compounds represented by Formulae (7-1) to (7-20) can be used. THP in Formulae (7-15) to (7-17) represents a tetrahydropyranyl group.

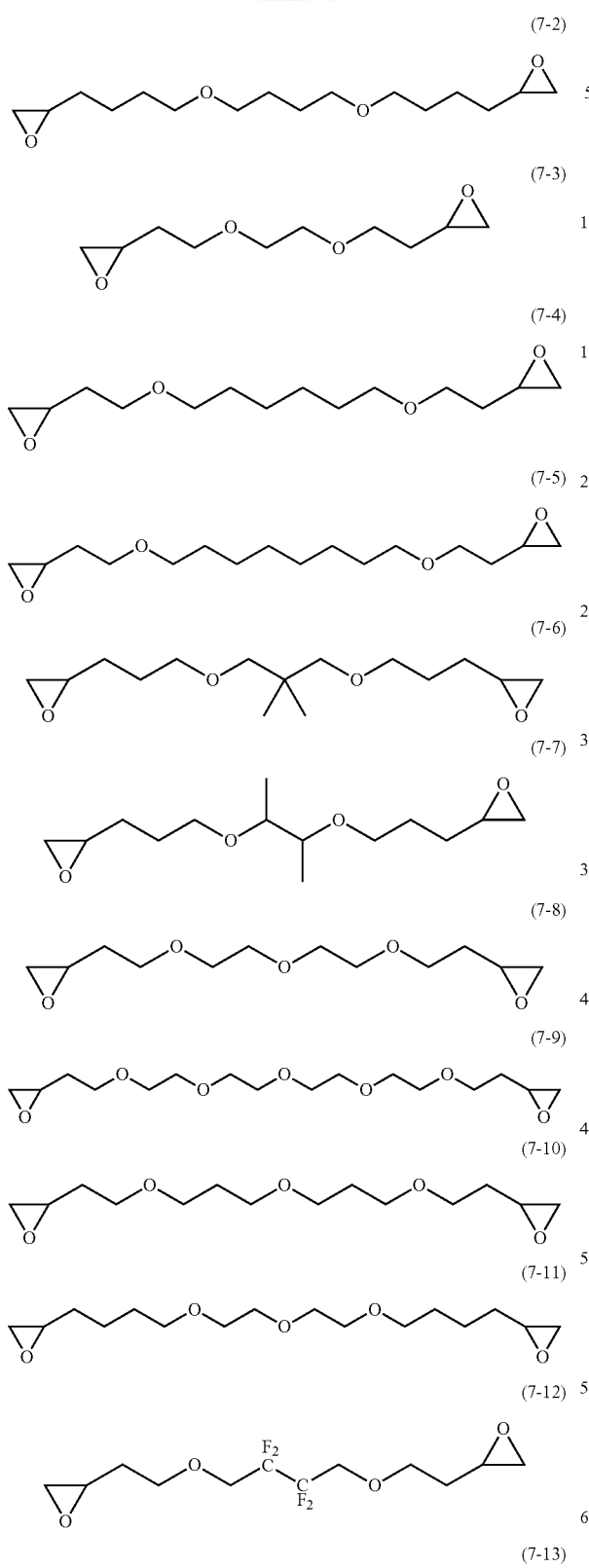

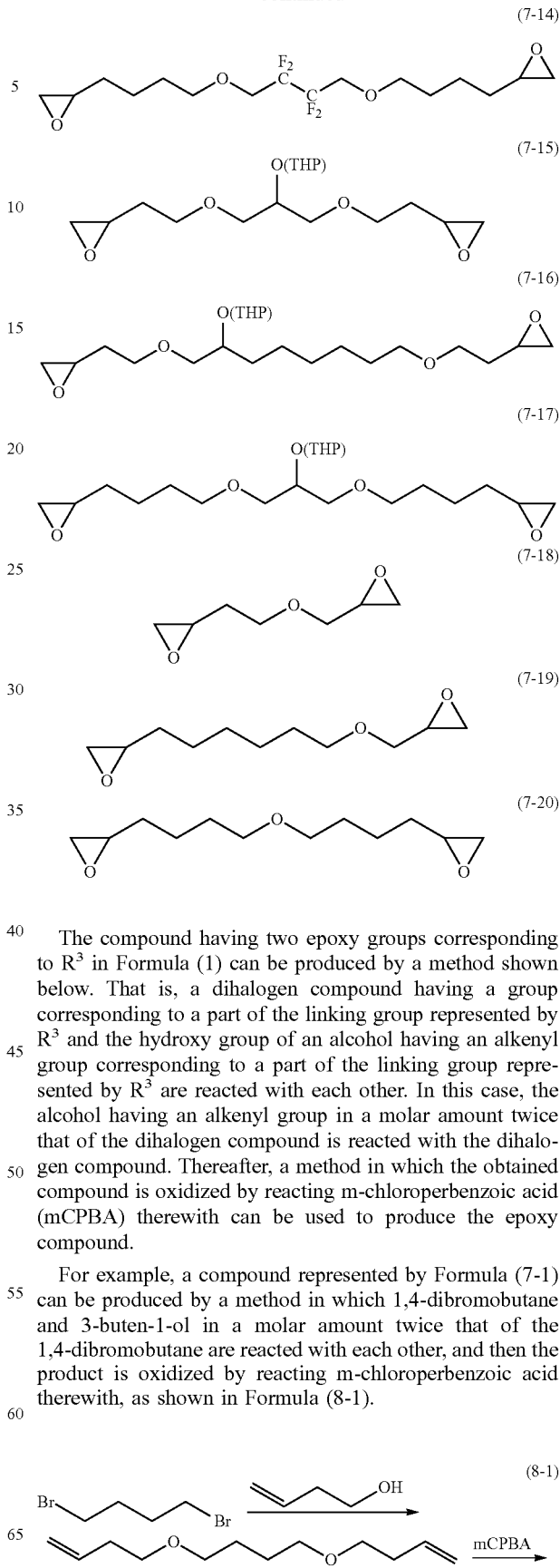

The compound having two epoxy groups corresponding to $R^3$ in Formula (1) can be produced by a method shown below. That is, a dihalogen compound having a group corresponding to a part of the linking group represented by $R^3$ and the hydroxy group of an alcohol having an alkenyl group corresponding to a part of the linking group represented by $R^3$ are reacted with each other. In this case, the alcohol having an alkenyl group in a molar amount twice that of the dihalogen compound is reacted with the dihalogen compound. Thereafter, a method in which the obtained compound is oxidized by reacting m-chloroperbenzoic acid (mCPBA) therewith can be used to produce the epoxy compound.

For example, a compound represented by Formula (7-1) can be produced by a method in which 1,4-dibromobutane and 3-buten-1-ol in a molar amount twice that of the 1,4-dibromobutane are reacted with each other, and then the product is oxidized by reacting m-chloroperbenzoic acid therewith, as shown in Formula (8-1).

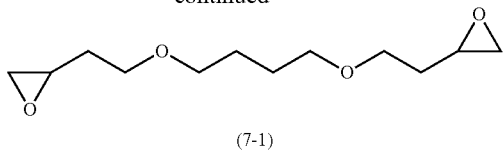

(7-1)

The compound having two epoxy groups corresponding to $R^3$ in Formula (1) may be produced by a method shown below. That is, the hydroxy group of a diol having a group corresponding to a part of the linking group represented by $R^3$ and a halogen compound having an alkenyl group corresponding to a part of the linking group represented by $R^3$ are reacted with each other. In this case, the halogen compound in a molar amount twice that of the diol is reacted with the diol. Thereafter, a method in which the obtained compound is oxidized by reacting m-chloroperbenzoic acid (mCPBA) therewith can be used to produce the epoxy compound.

For example, a compound represented by Formula (7-6) can be produced by a method in which 2,2-dimethyl-1,3-propanediol and 5-bromo-1-pentene in a molar amount twice that of 2,2-dimethyl-1,3-propanediol are reacted with each other, and then the product is oxidized by reacting m-chloroperbenzoic acid therewith, as shown in Formula (8-2).

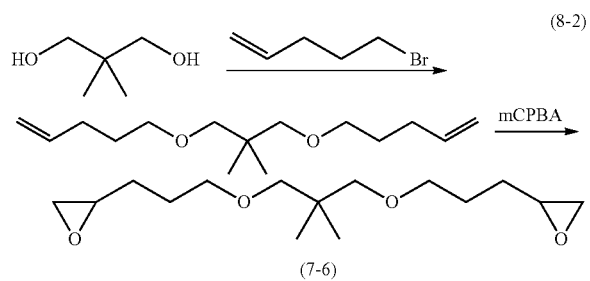

(8-2)

(7-6)

The compound having two epoxy groups corresponding to $R^3$ in Formula (1) may be produced by a method shown below. That is, a halogen compound having an epoxy group corresponding to a part of the linking group represented by $R^3$ and an alcohol having an alkenyl group corresponding to a part of the linking group represented by $R^3$ are subjected to an addition reaction. In this case, the alcohol having an alkenyl group in a molar amount twice that of a halogen compound is reacted with the halogen compound. Thereafter, a method in which the obtained compound is oxidized by reacting m-chloroperbenzoic acid (mCPBA) therewith can be used to produce the epoxy compound. Before oxidizing the compound obtained by the addition reaction by reacting m-chloroperbenzoic acid (mCPBA) therewith, a hydroxy group generated by the addition reaction may be protected with a known method.

For example, a compound represented by Formula (7-15) can be produced using a method in which epibromohydrin and 3-buten-1-ol in a molar amount twice that of epibromohydrin are subjected to an addition reaction, a hydroxy group generated by the addition reaction is then protected using dihydropyran (DHP), and the product is oxidized by reacting m-chloroperbenzoic acid (mCPBA) therewith, as shown in Formula (8-3). THP in Formula (8-3) represents a tetrahydropyranyl group.

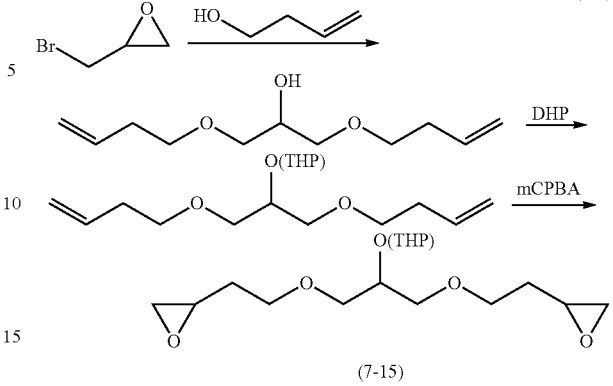

(8-3)

(7-15)

After the second reaction, a deprotection reaction can be performed by a known method to produce a compound in which x in Formula (1) is 1, $R^1$ and $R^4$ are the same as each other, and two $R^2$'s are the same as each other.

[Second Production Method (Case where x is 1)]
(Case where $R^1$ and $R^4$ Are Different from Each Other and/or Two $R^2$'s are Different from Each Other)

First, the hydroxy group at one of terminals of a fluorine-based compound in which hydroxymethyl groups are each arranged at both terminals of a perfluoropolyether chain corresponding to $R^2$ on the $R^1$ side is reacted with an epoxy compound having a group corresponding to $R^1$ to obtain an intermediate compound 1a (first reaction).

Next, the hydroxy group at one of terminals of a fluorine-based compound in which hydroxymethyl groups are each arranged at both terminals of a perfluoropolyether chain corresponding to $R^2$ on the $R^4$ side is reacted with an epoxy compound having a group corresponding to $R^4$ to obtain an intermediate compound 1b (second reaction).

Next, the hydroxy group at one of terminals of the intermediate compound 1a and a compound having an epoxy group and an alkenyl group corresponding to $R^3$ in Formula (1) are reacted with each other, and then a double bond contained in the generated compound is oxidized to obtain an intermediate compound 1-2 (third reaction).

As the compound having an epoxy group and an alkenyl group corresponding to $R^3$ in Formula (1), for example, compounds represented by Formulae (9-1) to (9-20) which will be described later can be used.

Next, the hydroxy group at one of terminals of the intermediate compound 1b and the epoxy group of the intermediate compound 1-2 obtained in the third reaction are reacted with each other (fourth reaction).

After the step above, a deprotection reaction can be performed using a known method to produce a compound in which x in Formula (1) is 1, $R^1$ and $R^4$ are different from each other, and/or two $R^2$'s are different.

[Third Production Method (Case where x is 2)]
(Case where $R^1$ and $R^4$ Are Same as Each Other, Two $R^3$'s Are Same as Each Other, and $R^2$ on $R^1$ Side and $R^2$ on $R^4$ Side are Same as Each Other)

First, an intermediate compound 1 having a group corresponding to $R^1$ (=a group corresponding to $R^4$) at one of terminals of the perfluoropolyether chain corresponding to $R^2$ on the $R^1$ side and the $R^4$ side is obtained in the same manner as in the first production method (first reaction).

Next, a fluorine-based compound in which a hydroxymethyl group (—CH$_2$OH) is arranged at each of both terminals of a perfluoropolyether chain corresponding to $R^2$ at the center of the molecule in Formula (1) is prepared. Next, the hydroxy group of the hydroxymethyl group arranged at both terminals of the fluorine-based compound and a compound having an epoxy group and an alkenyl group corresponding to R³ in Formula (1) are reacted with each other to obtain an intermediate compound 2-1 (second reaction).

As the compound having an epoxy group and an alkenyl group corresponding to R³ in Formula (1), for example, the compounds represented by Formulae (9-1) to (9-20) can be used. THP in Formulae (9-15) to (9-17) represents a tetrahydropyranyl group.

The compound having an epoxy group and an alkenyl group corresponding to R³ in Formula (1) can be produced by a method shown below. That is, a dihalogen compound having a group corresponding to a part of the linking group represented by R³ and the hydroxy group of an alcohol having an alkenyl group corresponding to a part of the linking group represented by R³ are reacted with each other. In this case, the alcohol having an alkenyl group in a molar amount twice that of the dihalogen compound is reacted with the dihalogen compound. Thereafter, a method in which one of alkenyl groups is oxidized by reacting m-chloroperbenzoic acid (mCPBA) with the obtained compound can be used to produce the compound having an epoxy group and an alkenyl group.

For example, a compound represented by Formula (9-1) can be produced by a method in which 1,4-dibromobutane and 3-buten-1-ol in a molar amount twice that of the 1,4-dibromobutane are reacted with each other, and then the product is oxidized by reacting m-chloroperbenzoic acid therewith, as shown in Formula (10-1).

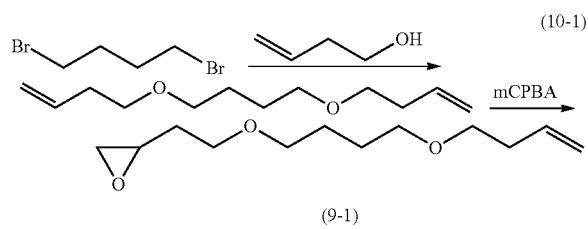

(9-1)

The compound having an epoxy group and an alkenyl group corresponding to $R^3$ in Formula (1) may be produced by a method shown below. That is, the hydroxy group of a diol having a group corresponding to a part of the linking group represented by $R^3$ and a halogen compound having an alkenyl group corresponding to a part of the linking group represented by $R^3$ are reacted with each other. In this case, the halogen compound in a molar amount twice that of the diol is reacted with the diol. Thereafter, a method in which one of alkenyl groups is oxidized by reacting m-chloroperbenzoic acid (mCPBA) with the obtained compound can be used to produce the compound having an epoxy group and an alkenyl group.

For example, a compound represented by Formula (9-6) can be produced by a method in which 2,2-dimethyl-1,3-propanediol and 5-bromo-1-pentene in a molar amount twice that of 2,2-dimethyl-1,3-propanediol are reacted with each other, and then the product is oxidized by reacting m-chloroperbenzoic acid therewith, as shown in Formula (10-2).

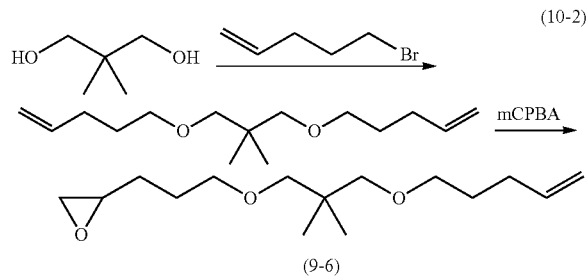

(9-6)

The compound having an epoxy group and an alkenyl group corresponding to $R^3$ in Formula (1) may be produced by a method shown below. That is, a halogen compound having an epoxy group corresponding to a part of the linking group represented by $R^3$ and an alcohol having an alkenyl group corresponding to a part of the linking group represented by $R^3$ are subjected to an addition reaction. In this case, the alcohol having an alkenyl group in a molar amount twice that of a halogen compound is reacted with the halogen compound. Thereafter, a method in which one of alkenyl groups is oxidized by reacting m-chloroperbenzoic acid (mCPBA) with the obtained compound can be used to produce the compound having an epoxy group and an alkenyl group. Before oxidizing the compound obtained by the addition reaction by reacting m-chloroperbenzoic acid (mCPBA) therewith, a hydroxy group generated by the addition reaction may be protected with a known method.

For example, a compound represented by Formula (9-15) can be produced using a method in which epibromohydrin and 3-buten-1-ol in a molar amount twice that of epibromohydrin are subjected to an addition reaction, a hydroxy group generated by the addition reaction is then protected using dihydropyran (DHP), and the product is oxidized by reacting m-chloroperbenzoic acid (mCPBA) therewith, as shown in Formula (10-3). THP in Formula (10-3) represents a tetrahydropyranyl group.

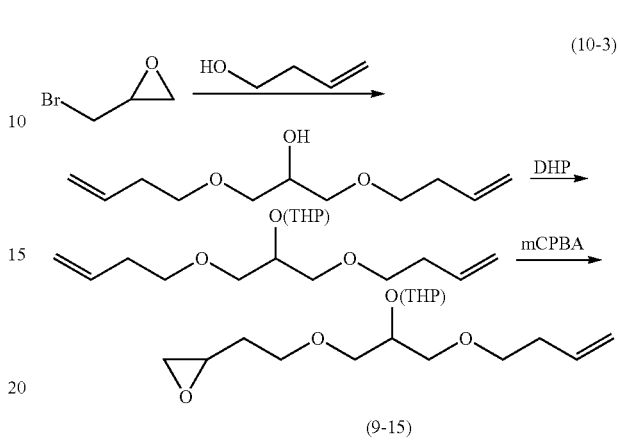

(9-15)

Next, the intermediate compound 2-1 generated in the second reaction is oxidized by reacting m-chloroperbenzoic acid (mCPBA) therewith (third reaction). Thus, an intermediate compound 3-1 having epoxy groups corresponding to two $R^3$'s in Formula (1) at both terminals of the perfluoropolyether chain corresponding to $R^2$ at the center of the molecule in Formula (1) is obtained. The third reaction may be carried out after appropriately protecting the hydroxy group contained in the intermediate compound 2-1 by a known method.

Thereafter, the hydroxy group of the hydroxymethyl group arranged at one of terminals of the intermediate compound 1 and epoxy groups arranged at both terminals of the intermediate compound 3-1 are reacted with each other (fourth reaction).

By performing a deprotection reaction after the step above, a compound in which x in Formula (1) is 2, $R^1$ and $R^4$ are the same as each other, two $R^3$'s are the same as each other, and $R^2$ on the $R^1$ side and $R^2$ on the $R^4$ side are the same as each other can be produced.

[Fourth Production Method (Case where x is 2)]

(Case where $R^3$ on $R^1$ Side and $R^3$ on $R^4$ Side Are Same as Each Other, $R^1$ and $R^4$ Are Different From Each Other, and/or $R^2$ on $R^1$ Side and $R^2$ on $R^4$ Side are Different from Each Other)

In the first reaction of the third production method, the intermediate compound 1a and the intermediate compound 1b in the second production method are obtained instead of the intermediate compound 1. Next, an intermediate compound 3-1 is obtained in the same manner as in the second reaction and the third reaction of the third production method. Then, the intermediate compound 1a and the intermediate compound 1b are each sequentially reacted with the epoxy groups arranged at both terminals of the intermediate compound 3-1.

By performing a deprotection reaction after the step above, a compound in which x in Formula (1) is 2, $R^3$ on the $R^1$ side and $R^3$ on the $R^4$ side are the same as each other, $R^1$ and $R^4$ are different from each other, and/or $R^2$ on the $R^1$ side and $R^2$ on the $R^4$ side are different from each other can be produced.

[Fifth Production Method (Case where x is 2)]
(Case where $R^3$ on $R^1$ Side and $R^3$ on $R^4$ Side Are Different From Each Other, $R^1$ and $R^4$ Are Same as Each Other, and $R^2$ on $R^1$ Side and $R^2$ on $R^4$ Side are Same)

An intermediate compound 2-2 is obtained by reacting a compound having an epoxy group and an alkenyl group, corresponding to $R^3$ on the $R^1$ side in Formula (1), and a compound having an epoxy group and an alkenyl group, corresponding to $R^3$ on the $R^4$ side in Formula (1), instead of the compound having an epoxy group and an alkenyl group corresponding to $R^3$ in Formula (1), sequentially with the fluorine-based compound in the second reaction of the third production method. Then, the third reaction and the fourth reaction are carried out in the same manner as in the third production method, except that the intermediate compound 2-2 is used instead of the intermediate compound 2-1.

By performing a deprotection reaction after the step above, a compound in which x in Formula (1) is 2, $R^3$ on the $R^1$ side and $R^3$ on the $R^4$ side are different from each other, $R^1$ and $R^4$ are the same as each other, and $R^2$ on the $R^1$ side and $R^2$ on the $R^4$ side are the same as each other can be produced.

In the third to fifth production methods for producing the compound in which x is 2, the perfluoropolyether chain corresponding to $R^2$ at the center of the molecule may be the same as or different from the other $R^2$.

[Lubricant for Magnetic Recording Medium]

The lubricant for a magnetic recording medium of the present embodiment includes the fluorine-containing ether compound represented by Formula (1).

In the lubricant of the present embodiment, known materials used as a material for the lubricant can be used in mixture as necessary as long as the characteristics are not impaired by incorporating the fluorine-containing ether compound represented by Formula (1).

Specific examples of the known materials include FOMBLIN (registered trademark) ZDIAC, FOMBLIN ZDEAL, and FOMBLIN AM-2001 (all of which are manufactured by Solvay Solexis), and Moresco A20H (manufactured by Moresco). The known material used in mixture with the lubricant of the present embodiment preferably has a number-average molecular weight of 1,000 to 10,000.

In a case where the lubricant of the present embodiment includes a material other than the fluorine-containing ether compound represented by Formula (1), a content of the fluorine-containing ether compound represented by Formula (1) in the lubricant of the present embodiment is preferably 70% by mass or more, more preferably 90% by mass or more, and still more preferably 95% by mass or more.

Since the lubricant of the present embodiment includes the fluorine-containing ether compound represented by Formula (1), it is possible to form a lubricating layer having excellent corrosion resistance and a high spin-off suppressing effect.

[Magnetic Recording Medium]

The magnetic recording medium of the present embodiment is formed by sequentially providing at least a magnetic layer, a protective layer, and a lubricating layer on a substrate.

In the magnetic recording medium of the present embodiment, one or two or more underlayers can be provided between the substrate and the magnetic layer, as necessary. In addition, at least one of an adhesion layer and a soft magnetic layer can be provided between the underlayer and the substrate.

The FIGURE is a schematic cross-sectional view showing an embodiment of the magnetic recording medium of the present invention.

The magnetic recording medium 10 of the present embodiment has a structure in which an adhesion layer 12, a soft magnetic layer 13, a first underlayer 14, a second underlayer 15, a magnetic layer 16, a protective layer 17, and a lubricating layer 18 are sequentially provided on a substrate 11.

"Substrate"

As the substrate 11, for example, a non-magnetic substrate on which a film made of NiP or an NiP alloy is formed on a base made of a metal or an alloy material such as Al or an Al alloy can be used.

In addition, as the substrate 11, a non-magnetic substrate made of a non-metal material such as glass, ceramics, silicon, silicon carbide, carbon, or a resin may be used, or a non-magnetic substrate in which a film of NiP or an NiP alloy is formed on a base made of this non-metal material may be used.

"Adhesion Layer"

The adhesion layer 12 prevents the progress of corrosion of the substrate 11, which occurs in a case where the substrate 11 and the soft magnetic layer 13 provided on the adhesion layer 12 are arranged in contact with each other.

A material for the adhesion layer 12 can be appropriately selected from, for example, Cr, a Cr alloy, Ti, a Ti alloy, CrTi, NiAl, and an AlRu alloy. The adhesion layer 12 can be formed by, for example, a sputtering method.

"Soft Magnetic Layer"

The soft magnetic layer 13 preferably has a structure in which a first soft magnetic film, an intermediate layer consisting of an Ru film, and a second soft magnetic film are sequentially laminated. That is, the soft magnetic layer 13 preferably has a structure in which the intermediate layer made of an Ru film is interposed between two soft magnetic film layers to make the soft magnetic films above and below the intermediate layer be antiferromagnetically coupled (AFC).

Examples of materials for the first soft magnetic film and the second soft magnetic film include a CoZrTa alloy and a CoFe alloy.

Any of Zr, Ta, and Nb is preferably added to the CoFe alloy which is used in the first soft magnetic film and the second soft magnetic film. This accelerates the amorphization of the first soft magnetic film and the second soft magnetic film. As a result, it is possible to improve the alignment of the first underlayer (seed layer) and to decrease the floating amount of a magnetic head.

The soft magnetic layer 13 can be formed by, for example, a sputtering method.

"First Underlayer"

The first underlayer 14 is a layer that controls the alignment and the crystal size of the second underlayer 15 and the magnetic layer 16 provided thereon.

Examples of the first underlayer 14 include a Cr layer, a Ta layer, an Ru layer, a CrMo alloy layer, a CoW alloy layer, a CrW alloy layer, a CrV alloy layer, and a CrTi alloy layer.

The first underlayer 14 can be formed by, for example, a sputtering method.

"Second Underlayer"

The second underlayer 15 is a layer that controls the alignment of the magnetic layer 16 to be good. The second underlayer 15 is preferably a layer consisting of Ru or an Ru alloy.

The second underlayer 15 may be a single layer or may be composed of a plurality of layers. In a case where the second underlayer 15 consists of a plurality of layers, all the layers may be composed of the same material, or at least one layer may be composed of a different material.

The second underlayer 15 can be formed by, for example, a sputtering method.

"Magnetic Layer"

The magnetic layer 16 consists of a magnetic film in which a magnetization axis is oriented in a direction perpendicular or horizontal to the substrate surface. The magnetic layer 16 is a layer including Co and Pt. The magnetic layer 16 may be a layer including an oxide, Cr, B, Cu, Ta, Zr, or the like in order to improve the SNR characteristics.

Examples of the oxide contained in the magnetic layer 16 include $SiO_2$, SiO, $Cr_2O_3$, CoO, $Ta_2O_3$, and $TiO_2$.

The magnetic layer 16 may be composed of one layer, or may be composed of a plurality of magnetic layers made of materials with different compositions.

For example, in a case where the magnetic layer 16 consists of three layers of a first magnetic layer, a second magnetic layer, and a third magnetic layer which are laminated in this order from the bottom, the first magnetic layer preferably has a granular structure made of a material containing Co, Cr, and Pt and further containing an oxide. As the oxide contained in the first magnetic layer, for example, an oxide of Cr, Si, Ta, Al, Ti, Mg, Co, or the like is preferably used. Among these, $TiO_2$, $Cr_2O_3$, $SiO_2$, or the like can be particularly suitably used. In addition, it is preferable that the first magnetic layer consists of a composite oxide obtained by adding two or more kinds of oxides. Among these, $Cr_2O_3$—$SiO_2$, $Cr_2O_3$—$TiO_2$, $SiO_2$—$TiO_2$, or the like can be particularly suitably used. The first magnetic layer can include one or more kinds of elements selected from B, Ta, Mo, Cu, Nd, W, Nb, Sm, Tb, Ru, and Re, in addition to Co, Cr, Pt, and oxides.

The same material as that for the first magnetic layer can be used for the second magnetic layer. The second magnetic layer preferably has a granular structure.

The third magnetic layer preferably has a non-granular structure consisting of a material including Co, Cr, and Pt and not including an oxide. The third magnetic layer can include one or more elements selected from B, Ta, Mo, Cu, Nd, W, Nb, Sm, Tb, Ru, Re, and Mn, in addition to Co, Cr, and Pt.

In a case where the magnetic layer 16 is formed of a plurality of magnetic layers, it is preferable to provide a non-magnetic layer between the adjacent magnetic layers. In a case where the magnetic layer 16 consists of three layers of a first magnetic layer, a second magnetic layer, and a third magnetic layer, it is preferable to provide a non-magnetic layer between the first magnetic layer and the second magnetic layer and between the second magnetic layer and the third magnetic layer.

As the non-magnetic layer provided between the adjacent magnetic layers of the magnetic layer 16, for example, Ru, an Ru alloy, a CoCr alloy, or a CoCrX1 alloy (X1 represents one or two or more kinds of elements selected from Pt, Ta, Zr, Re, Ru, Cu, Nb, Ni, Mn, Ge, Si, O, N, W, Mo, Ti, V, and B) can be suitably used.

It is preferable that an alloy material including an oxide, a metal nitride, or a metal carbide is used in the non-magnetic layer provided between the adjacent magnetic layers of the magnetic layer 16. Specifically, as the oxide, for example, $SiO_2$, $Al_2O_3$, $Ta_2O_5$, $Cr_2O_3$, MgO, $Y_2O_3$, or $TiO_2$, can be used. As the metal nitride, for example, AlN, $Si_3N_4$, TaN, or CrN can be used. As the metal carbide, for example, TaC, BC, or SiCe can be used.

The non-magnetic layer can be formed by, for example, a sputtering method.

The magnetic layer 16 is preferably a magnetic layer for perpendicular magnetic recording in which easy magnetization axis is directed to a direction perpendicular to the substrate surface in order to realize a higher recording density. The magnetic layer 16 may be a magnetic layer for in-plane magnetic recording.

The magnetic layer 16 may be formed by any of known methods in the related art, such as a deposition method, an ion beam sputtering method, and a magnetron sputtering method. The magnetic layer 16 is usually formed by a sputtering method.

"Protective Layer"

The protective layer 17 protects the magnetic layer 16. The protective layer 17 may be composed of one layer or may be composed of a plurality of layers. As the protective layer 17, a carbon-based protective layer can be preferably used, and in particular, an amorphous carbon protective layer is preferable. In a case where the protective layer 17 is a carbon-based protective layer, the interaction with the polar group (in particular, the hydroxy group) included in the fluorine-containing ether compound in the lubricating layer 18 is further enhanced, which is thus preferable.

An adhesive force between the carbon-based protective layer and the lubricating layer 18 can be controlled by forming the carbon-based protective layer with hydrogenated carbon and/or nitrogenated carbon and adjusting the hydrogen content and/or the nitrogen content in the carbon-based protective layer. The hydrogen content in the carbon-based protective layer, as measured by hydrogen forward scattering (HFS), is preferably 3 atomic % to 20 atomic %. In addition, the nitrogen content in the carbon-based protective layer, measured by an X-ray photoelectron spectroscopy (XPS), is preferably 4 atomic % to 15 atomic %.

Hydrogen and/or nitrogen included in the carbon-based protective layer does not need to be evenly contained in the entire carbon-based protective layer. For example, the carbon-based protective layer is suitably formed as a composition gradient layer in which nitrogen is contained in the protective layer 17 on the lubricating layer 18 side and hydrogen is contained in the protective layer 17 on the magnetic layer 16 side. In this case, the adhesive force between the magnetic layer 16 and the carbon-based protective layer and between the lubricating layer 18 and the carbon-based protective layer is further improved.

A film thickness of the protective layer 17 is preferably 1 nm to 7 nm. In a case where the film thickness of the protective layer 17 is 1 nm or more, sufficient performance of the protective layer 17 can be obtained. The film thickness of the protective layer 17, which is 7 nm or less, is preferable from the viewpoint that the thickness of the protective layer 17 is reduced.

As a method for forming the protective layer 17, a sputtering method using a carbon-containing target material, a chemical vapor deposition (CVD) method using a hydrocarbon raw material such as ethylene and toluene, an ion beam deposition (IBD) method, or the like can be used.

In a case where the carbon-based protective layer is formed as the protective layer 17, the carbon-based protective layer can be formed, for example, by a DC magnetron sputtering method. In particular, in a case where the carbon-based protective layer is formed as the protective layer 17, it is preferable to form an amorphous carbon protective layer by a plasma CVD method. The amorphous carbon protective layer formed by the plasma CVD method has an even surface and a small roughness.

"Lubricating Layer"

The lubricating layer 18 prevents contamination of the magnetic recording medium 10. In addition, the lubricating layer 18 reduces a frictional force of a magnetic head of a magnetic recording and reproducing device which slides on the magnetic recording medium 10, thereby improving the durability of the magnetic recording medium 10.

As shown in the FIGURE, the lubricating layer 18 is formed on and in contact with the protective layer 17. The lubricating layer 18 is formed by applying the lubricant for a magnetic recording medium according to the above-described embodiment onto the protective layer 17. Therefore, the lubricating layer 18 includes the above-described fluorine-containing ether compound.

In a case where the protective layer 17 arranged below the lubricating layer 18 is a carbon-based protective layer, the lubricating layer 18 is particularly bonded to the protective layer 17 with a high bonding force. As a result, it is easy to obtain the magnetic recording medium 10 in which the surface of the protective layer 17 is coated at a high coating rate even in a case where the thickness of the lubricating layer 18 is small, and it is possible to effectively prevent the contamination of the surface of the magnetic recording medium 10.

An average film thickness of the lubricating layer 18 is preferably 0.5 nm (5 Å) to 2.0 nm (20 Å), and more preferably 0.5 nm (5 Å) to 1.2 nm (12 Å). In a case where the average film thickness of the lubricating layer 18 is 0.5 nm or more, the lubricating layer 18 is formed with an even film thickness without forming an island shape or a mesh shape. Therefore, the surface of the protective layer 17 can be coated with the lubricating layer 18 at a high coating rate. In addition, in a case where the average film thickness of the lubricating layer 18 is 2.0 nm or less, it is possible to sufficiently reduce the thickness of the lubricating layer 18, and to sufficiently decrease the floating amount of a magnetic head.

"Method for Forming Lubricating Layer"

Examples of a method for forming the lubricating layer 18 include a method in which a magnetic recording medium during production in which respective layers up to the protective layer 17 are formed on the substrate 11 is prepared, and a lubricating layer forming solution is applied onto the protective layer 17 and dried.

The lubricating layer forming solution can be obtained by dispersing and dissolving the lubricant for a magnetic recording medium of the above-described embodiment in a solvent as necessary, and setting the viscosity and concentration to be suitable for application methods.

Examples of the solvent used for the lubricating layer forming solution include a fluorine-based solvent such as VERTREL (registered trademark) XF (product name, manufactured by Mitsui DuPont Fluorochemicals Co., Ltd.).

A method for applying the lubricating layer forming solution is not particularly limited, and examples thereof include a spin coating method, a spraying method, a paper coating method, and a dipping method.

In a case where the dipping method is used, for example, the following method can be used. First, the substrate 11 on which each of layers up to the protective layer 17 is formed is immersed in the lubricating layer forming solution which has been put into an immersion vessel of a dip coater. Next, the substrate 11 is lifted from the immersion vessel at a predetermined speed. Thus, the lubricating layer forming solution is applied onto the surface of the protective layer 17 of the substrate 11.

By using the dipping method, the lubricating layer forming solution can be evenly applied onto the surface of the protective layer 17 and the lubricating layer 18 with an even film thickness can be formed on the protective layer 17.

In the present embodiment, it is preferable to perform a thermal treatment on the substrate 11 on which the lubricating layer 18 has been formed. By performing the thermal treatment, the adhesion between the lubricating layer 18 and the protective layer 17 is improved, and the adhesive force between the lubricating layer 18 and the protective layer 17 is improved.

The thermal treatment temperature is preferably 100° C. to 180° C., and more preferably 100° C. to 160° C. In a case where the thermal treatment temperature is 100° C. or higher, an effect of improving the adhesion between the lubricating layer 18 and the protective layer 17 can be sufficiently obtained. In addition, by setting the thermal treatment temperature to 180° C. or lower, it is possible to prevent thermal decomposition of the lubricating layer 18 due to the thermal treatment. The thermal treatment time can be appropriately adjusted depending on the thermal treatment temperature, and is preferably 10 minutes to 120 minutes.

In the present embodiment, in order to further improve the adhesion of the lubricating layer 18 to the protective layer 17, a treatment of irradiating the lubricating layer 18 with ultraviolet rays (UV) before or after the thermal treatment may be performed.

The magnetic recording medium 10 of the present embodiment is formed by sequentially providing at least the magnetic layer 16, the protective layer 17, and the lubricating layer 18 on the substrate 11. In the magnetic recording medium 10 of the present embodiment, the lubricating layer 18 including the above-described fluorine-containing ether compound is formed on and in contact with the protective layer 17. The lubricating layer 18 has good corrosion resistance and a high spin-off suppressing effect even in a case where the film thickness is small. Therefore, the magnetic recording medium 10 of the present embodiment has excellent reliability, in particular, corrosion resistance, spin-off suppression, and durability. Thus, the magnetic recording medium 10 of the present embodiment can contribute to a reduction in magnetic spacing, can decrease the floating amount of a magnetic head (for example, 10 nm or less), and can be stably operated for a long period of time even in a severe environment due to the diversification of applications. Therefore, the magnetic recording medium 10 of the present embodiment is particularly suitable as a magnetic disk mounted in a magnetic disk device of a load unload (LUL) system.

EXAMPLES

Hereinafter, the present invention will be described in more detail with reference to Examples and Comparative Examples. The present invention is not limited to only Examples described below.

Example 1

The compound represented by Formula (AA) was obtained by a method shown below.
(First Reaction)

20 g of a compound (number-average molecular weight: 1,000, molecular weight distribution: 1.1) represented by $HOCH_2CF_2O(CF_2CF_2O)_h(CF_2O)_iCF_2CH_2OH$ (in the formula, h indicating an average degree of polymerization is 4.5 and i indicating an average degree of polymerization is 4.5), 4.14 g of the compound represented by Formula (5-1), and 20 mL of t-butanol were charged into a 100 mL eggplant flask in a nitrogen gas atmosphere, and stirred at room temperature until a homogenous mixture was obtained. 1.10 g of potassium tert-butoxide was added to the mixture and stirred at 70° C. for 16 hours to undergo a reaction.

The compound represented by Formula (5-1) was synthesized by protecting a hydroxy group of ethylene glycol monoallyl ether using dihydropyran, and then oxidizing the product with m-chloroperbenzoic acid.

The reaction product obtained after the reaction was cooled to 25° C., transferred to a separatory funnel into which 100 mL of water had been put, and extracted three times with 100 mL of ethyl acetate. The organic layer was washed with water and dehydrated over anhydrous sodium sulfate. After filtering the drying agent off, the filtrate was concentrated and the residue was purified by silica gel column chromatography to obtain 9.85 g of a compound represented by Formula (11) as the intermediate compound 1.

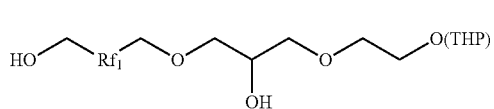

(11)

(in Formula (11), $Rf_1$ is the PFPE chain represented by Formula (4-1), in $Rf_1$, h indicating an average degree of polymerization represents 4.5 and i indicating an average degree of polymerization represents 4.5, and THP represents a tetrahydropyranyl group)

(Second Reaction)

Subsequently, 9.61 g of the compound represented by Formula (11), which is the intermediate compound 1 obtained above, 0.79 g of the compound represented by Formula (7-1), and 20 mL of t-butanol were charged into a 100 mL eggplant flask in a nitrogen gas atmosphere, and stirred at room temperature until a homogenous mixture was obtained. 0.45 g of potassium tert-butoxide was added to the mixture and stirred at 70° C. for 16 hours to undergo a reaction.

The compound represented by Formula (7-1) was synthesized by reacting 1,4-dibromobutane with 3-buten-1-ol in a molar amount twice that of 1,4-dibromobutane, and then oxidizing the product with m-chloroperbenzoic acid (mCPBA).

The reaction solution obtained after the reaction was cooled to room temperature, 50 g of a 10% hydrochloric acid/methanol solution (hydrochloric acid-methanol reagent (5% to 10%) manufactured by Tokyo Chemical Industry Co., Ltd.) was added thereto, and the mixture was stirred at room temperature for 4 hours. Thereafter, the reaction solution was gradually transferred to a separatory funnel into which 100 mL of a saturated aqueous sodium bicarbonate solution had been put, and then extracted twice with 200 mL of ethyl acetate. The organic layer was washed with 100 mL of saline, 100 mL of a saturated aqueous sodium bicarbonate solution, and 100 mL of saline in this order, and then dehydrated over anhydrous sodium sulfate. After filtering the drying agent off, the filtrate was concentrated and the residue was purified by silica gel column chromatography to obtain 3.44 g of a compound (AA) (in Formula (AA), $Rf_1$ is the PFPE chain represented by Formula (4-1), and in the two $Rf_1$'s, h indicating an average degree of polymerization represents 4.5 and i indicating an average degree of polymerization represents 4.5).

The obtained compound (AA) was subjected to $^1$H-NMR and $^{19}$F-NMR measurements, and a structure thereof was identified based on the following results.

$^1$H-NMR (acetone-$D_6$): δ [ppm]=1.65 to 1.85 (8H), 3.40 to 3.85 (38H), 3.85 to 4.10 (8H)

$^{19}$F-NMR (acetone-$D_6$): δ [ppm]=−55.5 to −51.5 (18F), −78.5 (4F), −80.5 (4F), −91.0 to −88.5 (36F)

Example 2

The compound represented by Formula (AB) was obtained by a method shown below.

The same operation as in Example 1, except that a compound represented by Formula (7-2) was used instead of the compound represented by Formula (7-1), was performed to obtain 3.35 g of the compound (AB) (in Formula (AB), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (7-2) was synthesized by reacting 1,4-dibromobutane with 5-hexen-1-ol in a molar amount twice that of 1,4-dibromobutane, and then oxidizing the product with m-chloroperbenzoic acid (mCPBA).

The obtained compound (AB) was subjected to $^1$H-NMR and $^{19}$F-NMR measurements, and a structure thereof was identified based on the following results.

$^1$H-NMR (acetone-$D_6$): δ [ppm]=1.65 to 1.85 (16H), 3.40 to 3.85 (38H), 3.85 to 4.10 (8H)

$^{19}$F-NMR (acetone-$D_6$): δ [ppm]=−55.5 to −51.5 (18F), −78.5 (4F), −80.5 (4F), −91.0 to −88.5 (36F)

Example 3

The compound represented by Formula (AC) was obtained by a method shown below.

The same operation as in Example 1, except that a compound represented by Formula (7-3) was used instead of the compound represented by Formula (7-1), was performed to obtain 3.26 g of the compound (AC) (in Formula (AC), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (7-3) was synthesized by reacting 1,2-dibromoethane with 3-buten-1-ol in a molar amount twice that of 1,2-dibromoethane, and then oxidizing the product with m-chloroperbenzoic acid (mCPBA).

The obtained compound (AC) was subjected to $^1$H-NMR and $^{19}$F-NMR measurements, and a structure thereof was identified based on the following results.

$^1$H-NMR (acetone-$D_6$): δ [ppm]=1.65 to 1.85 (4H), 3.40 to 3.85 (38H), 3.85 to 4.10 (8H)

$^{19}$F-NMR (acetone-$D_6$): δ [ppm]=−55.5 to −51.5 (18F), −78.5 (4F), −80.5 (4F), −91.0 to −88.5 (36F)

Example 4

The compound represented by Formula (AD) was obtained by a method shown below.

The same operation as in Example 1, except that a compound represented by Formula (7-4) was used instead of the compound represented by Formula (7-1), was performed to obtain 3.48 g of the compound (AD) (in Formula (AD), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (7-4) was synthesized by reacting 1,6-dibromohexane with 3-buten-1-ol in a molar amount twice that of 1,6-dibromohexane, and then oxidizing the product with m-chloroperbenzoic acid (mCPBA).

The obtained compound (AD) was subjected to $^1$H-NMR and $^{19}$F-NMR measurements, and a structure thereof was identified based on the following results.

$^1$H-NMR (acetone-$D_6$): δ [ppm]=1.65 to 1.85 (12H), 3.40 to 3.85 (38H), 3.85 to 4.10 (8H)

$^{19}$F-NMR (acetone-$D_6$): δ [ppm]=−55.5 to −51.5 (18F), −78.5 (4F), −80.5 (4F), −91.0 to −88.5 (36F)

Example 5

The compound represented by Formula (AE) was obtained by a method shown below.

The same operation as in Example 1, except that a compound represented by Formula (7-5) was used instead of the compound represented by Formula (7-1), was performed to obtain 3.52 g of the compound (AE) (in Formula (AE), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (7-5) was synthesized by reacting 1,8-dibromooctane with 3-buten-1-ol in a molar amount twice that of 1,8-dibromooctane, and then oxidizing the product with m-chloroperbenzoic acid (mCPBA).

The obtained compound (AE) was subjected to $^1$H-NMR and $^{19}$F-NMR measurements, and a structure thereof was identified based on the following results.

$^1$H-NMR (acetone-$D_6$): δ [ppm]=1.65 to 1.85 (16H), 3.40 to 3.85 (38H), 3.85 to 4.10 (8H)

$^{19}$F-NMR (acetone-$D_6$): δ [ppm]=−55.5 to −51.5 (18F), −78.5 (4F), −80.5 (4F), −91.0 to −88.5 (36F)

Example 6

The compound represented by Formula (AF) was obtained by a method shown below.

The same operation as in Example 1, except that a compound represented by Formula (7-6) was used instead of the compound represented by Formula (7-1), was performed to obtain 3.36 g of the compound (AF) (in Formula (AF), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (7-6) was synthesized by reacting 2,2-dimethyl-1,3-propanediol with 5-bromo-1-pentene in a molar amount twice that of 2,2-dimethyl-1,3-propanediol, and then oxidizing the product with m-chloroperbenzoic acid (mCPBA).

The obtained compound (AF) was subjected to $^1$H-NMR and $^{19}$F-NMR measurements, and a structure thereof was identified based on the following results.

$^1$H-NMR (acetone-$D_6$): δ [ppm]=0.90 (6H), 1.65 to 1.85 (4H), 3.40 to 3.85 (38H), 3.85 to 4.10 (8H)

$^{19}$F-NMR (acetone-$D_6$): δ [ppm]=−55.5 to −51.5 (18F), −78.5 (4F), −80.5 (4F), −91.0 to −88.5 (36F)

Example 7

The compound represented by Formula (AG) was obtained by a method shown below.

The same operation as in Example 1, except that a compound represented by Formula (7-7) was used instead of the compound represented by Formula (7-1), was performed to obtain 3.14 g of the compound (AG) (in Formula (AG), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (7-7) was synthesized by reacting 2,3-butanediol with 5-bromo-1-pentene in a molar amount twice that of 2,3-butanediol, and then oxidizing the product with m-chloroperbenzoic acid (mCPBA).

The obtained compound (AG) was subjected to $^1$H-NMR and $^{19}$F-NMR measurements, and a structure thereof was identified based on the following results.

$^1$H-NMR (acetone-$D_6$): δ [ppm]=1.15 to 1.20 (6H), 1.65 to 1.85 (4H), 3.40 to 3.85 (36H), 3.85 to 4.10 (8H)

$^{19}$F-NMR (acetone-$D_6$): δ [ppm]=−55.5 to −51.5 (18F), −78.5 (4F), −80.5 (4F), −91.0 to −88.5 (36F)

Example 8

The compound represented by Formula (AH) was obtained by a method shown below.

The same operation as in Example 1, except that a compound represented by Formula (7-8) was used instead of the compound represented by Formula (7-1), was performed to obtain 3.41 g of the compound (AH) (in Formula (AH), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (7-8) was synthesized by reacting a compound obtained by brominating diethylene glycol with phosphorus tribromide ($PBr_3$) with 3-buten-1-ol in a molar amount twice that of the compound, and then oxidizing the product with m-chloroperbenzoic acid (mCPBA).

The obtained compound (AH) was subjected to $^1$H-NMR and $^{19}$F-NMR measurements, and a structure thereof was identified based on the following results.

$^1$H-NMR (acetone-$D_6$): δ [ppm]=1.65 to 1.85 (4H), 3.40 to 3.85 (42H), 3.85 to 4.10 (8H)

$^{19}$F-NMR (acetone-$D_6$): δ [ppm]=−55.5 to −51.5 (18F), −78.5 (4F), −80.5 (4F), −91.0 to −88.5 (36F)

Example 9

The compound represented by Formula (AI) was obtained by a method shown below.

The same operation as in Example 1, except that a compound represented by Formula (7-9) was used instead of the compound represented by Formula (7-1), was performed to obtain 3.53 g of the compound (AI) (in Formula (AI), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (7-9) was synthesized by reacting a compound obtained by brominating tetraethylene glycol with phosphorus tribromide (PBr$_3$) with 3-buten-1-ol in a molar amount twice that of the compound, and then oxidizing the product with m-chloroperbenzoic acid (mCPBA).

The obtained compound (AI) was subjected to $^1$H-NMR and $^{19}$F-NMR measurements, and a structure thereof was identified based on the following results.

$^1$H-NMR (acetone-D$_6$): δ [ppm]=1.65 to 1.85 (4H), 3.40 to 3.85 (50H), 3.85 to 4.10 (8H)

$^{19}$F-NMR (acetone-D$_6$): δ [ppm]=−55.5 to −51.5 (18F), −78.5 (4F), −80.5 (4F), −91.0 to −88.5 (36F)

Example 10

The compound represented by Formula (AJ) was obtained by a method shown below.

The same operation as in Example 1, except that a compound represented by Formula (7-10) was used instead of the compound represented by Formula (7-1), was performed to obtain 3.32 g of the compound (AJ) (in Formula (AJ), Rf$_1$ is the PFPE chain represented by Formula (4-1), and in the two Rf$_1$'s, h indicating an average degree of polymerization represents 4.5 and i indicating an average degree of polymerization represents 4.5).

The compound represented by Formula (7-10) was synthesized by reacting a compound obtained by brominating dipropylene glycol with phosphorus tribromide (PBr$_3$) with 3-buten-1-ol in a molar amount twice that of the compound, and then oxidizing the product with m-chloroperbenzoic acid (mCPBA).

The obtained compound (AJ) was subjected to $^1$H-NMR and $^{19}$F-NMR measurements, and a structure thereof was identified based on the following results.

$^1$H-NMR (acetone-D$_6$): δ [ppm]=1.65 to 1.85 (8H), 3.40 to 3.85 (42H), 3.85 to 4.10 (8H)

$^{19}$F-NMR (acetone-D$_6$): δ [ppm]=−55.5 to −51.5 (18F), −78.5 (4F), −80.5 (4F), −91.0 to −88.5 (36F)

Example 11

The compound represented by Formula (AK) was obtained by a method shown below.

The same operation as in Example 1, except that a compound represented by Formula (7-11) was used instead of the compound represented by Formula (7-1), was performed to obtain 3.22 g of the compound (AK) (in Formula (AK), Rf$_1$ is the PFPE chain represented by Formula (4-1), and in the two Rf$_1$'s, h indicating an average degree of polymerization represents 4.5 and i indicating an average degree of polymerization represents 4.5).

The compound represented by Formula (7-11) was synthesized by reacting a compound obtained by brominating diethylene glycol with phosphorus tribromide (PBr$_3$) with 5-hexen-1-ol in a molar amount twice that of the compound, and then oxidizing the product with m-chloroperbenzoic acid (mCPBA).

The obtained compound (AK) was subjected to $^1$H-NMR and $^{19}$F-NMR measurements, and a structure thereof was identified based on the following results.

$^1$H-NMR (acetone-D$_6$): δ [ppm]=1.65 to 1.85 (12H), 3.40 to 3.85 (42H), 3.85 to 4.10 (8H)

$^{19}$F-NMR (acetone-D$_6$): δ [ppm]=−55.5 to −51.5 (18F), −78.5 (4F), −80.5 (4F), −91.0 to −88.5 (36F)

Example 12

The compound represented by Formula (AL) was obtained by a method shown below.

The same operation as in Example 1, except that a compound represented by Formula (7-12) was used instead of the compound represented by Formula (7-1), was performed to obtain 3.53 g of the compound (AL) (in Formula (AL), Rf$_1$ is the PFPE chain represented by Formula (4-1), and in the two Rf$_1$'s, h indicating an average degree of polymerization represents 4.5 and i indicating an average degree of polymerization represents 4.5).

The compound represented by Formula (7-12) was synthesized by reacting 2,2,3,3-tetrafluoro-1,4-butanediol with 2-bromoethyl oxirane in a molar amount twice that of 2,2,3,3-tetrafluoro-1,4-butanediol.

The obtained compound (AL) was subjected to $^1$H-NMR and $^{19}$F-NMR measurements, and a structure thereof was identified based on the following results.

$^1$H-NMR (acetone-D$_6$): δ [ppm]=1.65 to 1.85 (4H), 3.40 to 3.85 (34H), 3.85 to 4.10 (12H)

$^{19}$F-NMR (acetone-D$_6$): δ [ppm]=−55.5 to −51.5 (18F), −78.5 (4F), −80.5 (4F), −91.0 to −88.5 (36F), −130.0 (4F)

Example 13

The compound represented by Formula (AM) was obtained by a method shown below.

The same operation as in Example 1, except that a compound represented by Formula (7-13) was used instead of the compound represented by Formula (7-1), was performed to obtain 3.62 g of the compound (AM) (in Formula (AM), Rf$_1$ is the PFPE chain represented by Formula (4-1), and in the two Rf$_1$'s, h indicating an average degree of polymerization represents 4.5 and i indicating an average degree of polymerization represents 4.5).

The compound represented by Formula (7-13) was synthesized by reacting 2,2,3,3,4,4,5,5,6,6,7,7-dodecafluoro-1,8-octanediol with 2-bromoethyl oxirane in a molar amount twice that of 2,2,3,3,4,4,5,5,6,6,7,7-dodecafluoro-1,8-octanediol.

The obtained compound (AM) was subjected to $^1$H-NMR and $^{19}$F-NMR measurements, and a structure thereof was identified based on the following results.

$^1$H-NMR (acetone-D$_6$): δ [ppm]=1.65 to 1.85 (4H), 3.40 to 3.85 (34H), 3.85 to 4.10 (12H)

$^{19}$F-NMR (acetone-D$_6$): δ [ppm]=−55.5 to −51.5 (18F), −78.5 (4F), −80.5 (4F), −91.0 to −88.5 (36F), −122.5 to −124.5 (8F), −128.5 to 130.0 (4F)

Example 14

The compound represented by Formula (AN) was obtained by a method shown below.

The same operation as in Example 1, except that a compound represented by Formula (7-14) was used instead of the compound represented by Formula (7-1), was performed to obtain 3.42 g of the compound (AN) (in Formula (AN), Rf$_1$ is the PFPE chain represented by Formula (4-1), and in the two Rf$_1$'s, h indicating an average degree of polymerization represents 4.5 and i indicating an average degree of polymerization represents 4.5).

The compound represented by Formula (7-14) was synthesized by reacting 2,2,3,3-tetrafluoro-1,4-butanediol with 6-bromo-1-hexene in a molar amount twice that of 2,2,3,3-tetrafluoro-1,4-butanediol, and then oxidizing the product with m-chloroperbenzoic acid (mCPBA).

The obtained compound (AN) was subjected to $^1$H-NMR and $^{19}$F-NMR measurements, and a structure thereof was identified based on the following results.

$^1$H-NMR (acetone-D$_6$): δ [ppm]=1.65 to 1.85 (12H), 3.40 to 3.85 (34H), 3.85 to 4.10 (12H)

$^{19}$F-NMR (acetone-D$_6$): δ [ppm]=−55.5 to −51.5 (18F), −78.5 (4F), −80.5 (4F), −91.0 to −88.5 (36F), −130.0 (4F)

Example 15

The compound represented by Formula (AO) was obtained by a method shown below.

The same operation as in Example 1, except that a compound represented by Formula (7-15) was used instead of the compound represented by Formula (7-1), was performed to obtain 2.89 g of the compound (AO) (in Formula (AO), Rf$_1$ is the PFPE chain represented by Formula (4-1), and in the two Rf$_1$'s, h indicating an average degree of polymerization represents 4.5 and i indicating an average degree of polymerization represents 4.5).

The compound represented by Formula (7-15) was synthesized by subjecting epibromohydrin and 3-buten-1-ol in a molar amount twice that of epibromohydrin to an addition reaction, then protecting a hydroxy group generated by the addition reaction using dihydropyran, and further oxidizing the product with m-chloroperbenzoic acid (mCPBA).

The obtained compound (AO) was subjected to $^1$H-NMR and $^{19}$F-NMR measurements, and a structure thereof was identified based on the following results.

$^1$H-NMR (acetone-D$_6$): δ [ppm]=1.65 to 1.85 (4H), 3.65 to 3.85 (40H), 3.85 to 4.10 (8H)

$^{19}$F-NMR (acetone-D$_6$): δ [ppm]=−55.5 to −51.5 (18F), −78.5 (4F), −80.5 (4F), −91.0 to −88.5 (36F)

Example 16

The compound represented by Formula (AP) was obtained by a method shown below.

The same operation as in Example 1, except that a compound represented by Formula (7-16) was used instead of the compound represented by Formula (7-1), was performed to obtain 3.11 g of the compound (AP) (in Formula (AP), Rf$_1$ is the PFPE chain represented by Formula (4-1), and in the two Rf$_1$'s, h indicating an average degree of polymerization represents 4.5 and i indicating an average degree of polymerization represents 4.5).

The compound represented by Formula (7-16) was synthesized by reacting a compound, which had been obtained by oxidizing 8-bromo-1-octene with m-chloroperbenzoic acid (mCPBA), with 3-buten-1-ol in a molar amount twice that of the compound, protecting a hydroxy group generated by the reaction using dihydropyran, and further oxidizing the product with m-chloroperbenzoic acid.

The obtained compound (AP) was subjected to $^1$H-NMR and $^{19}$F-NMR measurements, and a structure thereof was identified based on the following results.

$^1$H-NMR (acetone-D$_6$): δ [ppm]=1.65 to 1.85 (14H), 3.65 to 3.85 (40H), 3.85 to 4.10 (8H)

$^{19}$F-NMR (acetone-D$_6$): δ [ppm]=−55.5 to −51.5 (18F), −78.5 (4F), −80.5 (4F), −91.0 to −88.5 (36F)

Example 17

The compound represented by Formula (AQ) was obtained by a method shown below.

The same operation as in Example 1, except that a compound represented by Formula (7-17) was used instead of the compound represented by Formula (7-1), was performed to obtain 3.18 g of the compound (AQ) (in Formula (AQ), Rf$_1$ is the PFPE chain represented by Formula (4-1), and in the two Rf$_1$'s, h indicating an average degree of polymerization represents 4.5 and i indicating an average degree of polymerization represents 4.5).

The compound represented by Formula (7-17) was synthesized by subjecting epibromohydrin and 5-hexen-1-ol in a molar amount twice that of epibromohydrin to an addition reaction, then protecting a hydroxy group generated by the addition reaction using dihydropyran, and further oxidizing the product with m-chloroperbenzoic acid (mCPBA).

The obtained compound (AQ) was subjected to $^1$H-NMR and $^{19}$F-NMR measurements, and a structure thereof was identified based on the following results.

$^1$H-NMR (acetone-D$_6$): δ [ppm]=1.65 to 1.85 (12H), 3.65 to 3.85 (40H), 3.85 to 4.10 (8H)

$^{19}$F-NMR (acetone-D$_6$): δ [ppm]=−55.5 to −51.5 (18F), −78.5 (4F), −80.5 (4F), −91.0 to −88.5 (36F)

Example 18

The compound represented by Formula (AR) was obtained by a method shown below.

The same operation as in Example 1, except that a compound represented by Formula (7-18) was used instead of the compound represented by Formula (7-1), was performed to obtain 2.95 g of the compound (AR) (in Formula (AR), Rf$_1$ is the PFPE chain represented by Formula (4-1), and in the two Rf$_1$'s, h indicating an average degree of polymerization represents 4.5 and i indicating an average degree of polymerization represents 4.5).

The compound represented by Formula (7-18) was synthesized by reacting epibromohydrin with an equimolar amount of 3-buten-1-ol, and then oxidizing the product with m-chloroperbenzoic acid (mCPBA).

The obtained compound (AR) was subjected to $^1$H-NMR and $^{19}$F-NMR measurements, and a structure thereof was identified based on the following results.

$^1$H-NMR (acetone-D$_6$): δ [ppm]=1.65 to 1.85 (2H), 3.65 to 3.85 (34H), 3.85 to 4.10 (8H)

$^{19}$F-NMR (acetone-D$_6$): δ [ppm]=−55.5 to −51.5 (18F), −78.5 (4F), −80.5 (4F), −91.0 to −88.5 (36F)

Example 19

The compound represented by Formula (AS) was obtained by a method shown below.

The same operation as in Example 1, except that a compound represented by Formula (7-19) was used instead of the compound represented by Formula (7-1), was performed to obtain 3.08 g of the compound (AS) (in Formula (AS), Rf$_1$ is the PFPE chain represented by Formula (4-1), and in the two Rf$_1$'s, h indicating an average degree of polymerization represents 4.5 and i indicating an average degree of polymerization represents 4.5).

The compound represented by Formula (7-19) was synthesized by reacting epibromohydrin with an equimolar amount of 7-octen-1-ol, and then oxidizing the product with m-chloroperbenzoic acid (mCPBA).

The obtained compound (AS) was subjected to $^1$H-NMR and $^{19}$F-NMR measurements, and a structure thereof was identified based on the following results.

$^1$H-NMR (acetone-D$_6$): δ [ppm]=1.65 to 1.85 (10H), 3.65 to 3.85 (34H), 3.85 to 4.10 (8H)

$^{19}$F-NMR (acetone-D$_6$): δ [ppm]=−55.5 to −51.5 (18F), −78.5 (4F), −80.5 (4F), −91.0 to −88.5 (36F)

Example 20

The compound represented by Formula (AT) was obtained by a method shown below.

The same operation as in Example 1, except that a compound represented by Formula (7-20) was used instead of the compound represented by Formula (7-1), was performed to obtain 3.02 g of the compound (AT) (in Formula (AT), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (7-20) was synthesized by reacting 6-bromo-1-hexene with an equimolar amount of 5-hexen-1-ol, and then oxidizing the product with m-chloroperbenzoic acid (mCPBA).

The obtained compound (AT) was subjected to $^1$H-NMR and $^{19}$F-NMR measurements, and a structure thereof was identified based on the following results.

$^1$H-NMR (acetone-$D_6$): δ [ppm]=1.65 to 1.85 (12H), 3.65 to 3.85 (34H), 3.85 to 4.10 (8H)

$^{19}$F-NMR (acetone-$D_6$): δ [ppm]=−55.5 to −51.5 (18F), −78.5 (4F), −80.5 (4F), −91.0 to −88.5 (36F)

Example 21

The compound represented by Formula (BA) was obtained by a method shown below.

The same operation as in Example 1, except that a compound (number-average molecular weight: 1,000, molecular weight distribution: 1.1) represented by $HOCH_2CF_2CF_2O(CF_2CF_2CF_2O)_jCF_2CF_2CH_2OH$ (in the formula, j indicating an average degree of polymerization is 4.5) was used instead of the compound represented by $HOCH_2CF_2O(CF_2CF_2O)_h(CF_2O)_iCF_2CH_2OH$, was performed to obtain 3.35 g of the compound (BA) (in Formula (BA), $Rf_2$ is the PFPE chain represented by Formula (4-2), and in the two $Rf_2$'s, j indicating an average degree of polymerization represents 4.5).

The obtained compound (BA) was subjected to $^1$H-NMR and $^{19}$F-NMR measurements, and a structure thereof was identified based on the following results.

$^1$H-NMR (acetone-$D_6$): δ [ppm]=1.65 to 1.85 (8H), 3.40 to 3.85 (38H), 3.85 to 4.10 (8H)

$^{19}$F-NMR (acetone-$D_6$): δ [ppm]=−84.0 to −83.0 (36F), −86.4 (8F), −124.3 (8F), −130.0 to −129.0 (18F)

Example 22

The compound represented by Formula (BB) was obtained by a method shown below.

The same operation as in Example 1, except that a compound (number-average molecular weight: 1,000, molecular weight distribution: 1.1) represented by $HOCH_2CF_2CF_2CF_2O(CF_2CF_2CF_2CF_2O)_kCF_2CF_2CF_2CH_2OH$ (in the formula, k indicating an average degree of polymerization is 3.0) was used instead of the compound represented by $HOCH_2CF_2O(CF_2CF_2O)_h(CF_2O)_iCF_2CH_2OH$, was performed to obtain 3.21 g of the compound (BB) (in Formula (BB), $Rf_3$ is the PFPE chain represented by Formula (4-3), and in the two $Rf_3$'s, k indicating an average degree of polymerization represents 3.0).

The obtained compound (BB) was subjected to $^1$H-NMR and $^{19}$F-NMR measurements, and a structure thereof was identified based on the following results.

$^1$H-NMR (acetone-$D_6$): δ [ppm]=1.65 to 1.85 (8H), 3.40 to 3.85 (38H), 3.85 to 4.10 (8H)

$^{19}$F-NMR (acetone-$D_6$): δ [ppm]=−84.0 to −83.0 (32F), −122.5 (8F), −126.0 (24F), −129.0 to −128.0 (8F)

Example 23

The compound represented by Formula (BC) was obtained by a method shown below.

The same operation as in Example 1, except that a compound represented by Formula (5-2) was used instead of the compound represented by Formula (5-1), was performed to obtain 3.39 g of the compound (BC) (in Formula (BC), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (5-2) was synthesized by protecting one of hydroxy groups of 1,3-propanediol using dihydropyran, and then reacting the product with epibromohydrin.

The obtained compound (BC) was subjected to $^1$H-NMR and $^{19}$F-NMR measurements, and a structure thereof was identified based on the following results.

$^1$H-NMR (acetone-$D_6$): δ [ppm]=1.65 to 1.85 (12H), 3.40 to 3.85 (38H), 3.85 to 4.10 (8H)

$^{19}$F-NMR (acetone-$D_6$): δ [ppm]=−55.5 to −51.5 (18F), −78.5 (4F), −80.5 (4F), −91.0 to −88.5 (36F)

Example 24

The compound represented by Formula (BD) was obtained by a method shown below.

The same operation as in Example 1, except that a compound represented by Formula (5-3) was used instead of the compound represented by Formula (5-1), was performed to obtain 3.12 g of the compound (BD) (in Formula (BD), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (5-3) was synthesized by protecting a hydroxy group of 3-buten-1-ol using dihydropyran, and then oxidizing the product with m-chloroperbenzoic acid.

The obtained compound (BD) was subjected to $^1$H-NMR and $^{19}$F-NMR measurements, and a structure thereof was identified based on the following results.

$^1$H-NMR (acetone-$D_6$): δ [ppm]=1.65 to 1.85 (12H), 3.40 to 3.85 (30H), 3.85 to 4.10 (8H)

$^{19}$F-NMR (acetone-$D_6$): δ [ppm]=−55.5 to −51.5 (18F), −78.5 (4F), −80.5 (4F), −91.0 to −88.5 (36F)

Example 25

The compound represented by Formula (BE) was obtained by a method shown below.

The same operation as in Example 1, except that a compound represented by Formula (5-4) was used instead of the compound represented by Formula (5-1), was performed to obtain 3.29 g of the compound (BE) (in Formula (BE), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (5-4) was synthesized by reacting 3-buten-1-ol with 2-(2-bromoethoxy)tetrahydro-2H-pyran, and then oxidizing the product with m-chloroperbenzoic acid.

The obtained compound (BE) was subjected to $^1$H-NMR and $^{19}$F-NMR measurements, and a structure thereof was identified based on the following results.

$^1$H-NMR (acetone-D$_6$): δ [ppm]=1.65 to 1.85 (12H), 3.40 to 3.85 (38H), 3.85 to 4.10 (8H)

$^{19}$F-NMR (acetone-D$_6$): δ [ppm]=−55.5 to −51.5 (18F), −78.5 (4F), −80.5 (4F), −91.0 to −88.5 (36F)

Example 26

The compound represented by Formula (BF) was obtained by a method shown below.

The same operation as in Example 1, except that a compound represented by Formula (5-5) was used instead of the compound represented by Formula (5-1), was performed to obtain 3.54 g of the compound (BF) (in Formula (BF), Rf$_1$ is the PFPE chain represented by Formula (4-1), and in the two Rf$_1$'s, h indicating an average degree of polymerization represents 4.5 and i indicating an average degree of polymerization represents 4.5).

The compound represented by Formula (5-5) was synthesized by subjecting the compound represented by Formula (5-1) and an allyl alcohol to an addition reaction, then protecting a hydroxy group generated by the addition reaction using dihydropyran, and further oxidizing the product by reacting m-chloroperbenzoic acid therewith.

The obtained compound (BF) was subjected to $^1$H-NMR and $^{19}$F-NMR measurements, and a structure thereof was identified based on the following results.

$^1$H-NMR (acetone-D$_6$): δ [ppm]=1.65 to 1.85 (8H), 3.40 to 3.85 (50H), 3.85 to 4.10 (8H)

$^{19}$F-NMR (acetone-D$_6$): δ [ppm]=−55.5 to −51.5 (18F), −78.5 (4F), −80.5 (4F), −91.0 to −88.5 (36F)

Example 27

The compound represented by Formula (BG) was obtained by a method shown below.

The same operation as in Example 1, except that a compound represented by Formula (5-6) was used instead of the compound represented by Formula (5-1), was performed to obtain 3.39 g of the compound (BG) (in Formula (BG), Rf is the PFPE chain represented by Formula (4-1), and in the two Rf$_1$'s, h indicating an average degree of polymerization represents 4.5 and i indicating an average degree of polymerization represents 4.5).

The compound represented by Formula (5-6) was synthesized by subjecting the compound represented by Formula (5-3) and an allyl alcohol to an addition reaction, then protecting a hydroxy group generated by the addition reaction using dihydropyran, and further oxidizing the product by reacting m-chloroperbenzoic acid therewith.

The obtained compound (BG) was subjected to $^1$H-NMR and $^{19}$F-NMR measurements, and a structure thereof was identified based on the following results.

$^1$H-NMR (acetone-D$_6$): δ [ppm]=1.65 to 1.85 (12H), 3.40 to 3.85 (42H), 3.85 to 4.10 (8H)

$^{19}$F-NMR (acetone-D$_6$): δ [ppm]=−55.5 to −51.5 (18F), −78.5 (4F), −80.5 (4F), −91.0 to −88.5 (36F)

Example 28

The compound represented by Formula (BH) was obtained by a method shown below.

The same operation as in Example 1, except that a compound represented by Formula (5-7) was used instead of the compound represented by Formula (5-1), was performed to obtain 3.52 g of the compound (BH) (in Formula (BH), Rf$_1$ is the PFPE chain represented by Formula (4-1), and in the two Rf$_1$'s, h indicating an average degree of polymerization represents 4.5 and i indicating an average degree of polymerization represents 4.5).

The compound represented by Formula (5-7) was synthesized by subjecting the compound represented by Formula (5-1) and 3-buten-1-ol to an addition reaction, then protecting a hydroxy group generated by the addition reaction using dihydropyran, and further oxidizing the product by reacting m-chloroperbenzoic acid therewith.

The obtained compound (BH) was subjected to $^1$H-NMR and $^{19}$F-NMR measurements, and a structure thereof was identified based on the following results.

$^1$H-NMR (acetone-D$_6$): δ [ppm]=1.65 to 1.85 (12H), 3.40 to 3.85 (50H), 3.85 to 4.10 (8H)

$^{19}$F-NMR (acetone-D$_6$): δ [ppm]=−55.5 to −51.5 (18F), −78.5 (4F), −80.5 (4F), −91.0 to −88.5 (36F)

Example 29

The compound represented by Formula (BI) was obtained by a method shown below.
(First Reaction)

The compound represented by Formula (11) was obtained as the intermediate compound 1a in the same manner as in the first reaction of Example 1.
(Second Reaction)

The same operation as the first reaction of Example 1, except that a compound represented by Formula (5-5) was used instead of the compound represented by Formula (5-1), was performed to obtain a compound represented by Formula (12) as the intermediate compound 1b.

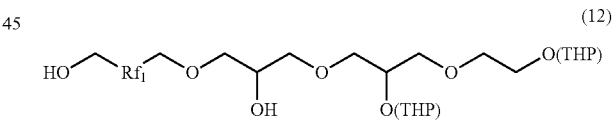

(12)

(in Formula (12), Rf$_1$ is the PFPE chain represented by Formula (4-1), in Rf$_1$, h indicating an average degree of polymerization represents 4.5 and i indicating an average degree of polymerization represents 4.5, and THP represents a tetrahydropyranyl group)
(Third Reaction)

Subsequently, 9.66 g of the compound represented by Formula (11), which is the intermediate compound 1a obtained above, 0.69 g of the compound represented by Formula (9-1), and 20 mL of t-butanol were charged into a 100 mL eggplant flask in a nitrogen gas atmosphere, and stirred at room temperature until a homogenous mixture was obtained. 0.45 g of potassium tert-butoxide was added to the mixture and stirred at 70° C. for 16 hours to undergo a reaction.

The compound represented by Formula (9-1) was synthesized by reacting 1,4-dibromobutane with 3-buten-1-ol in a molar amount twice that of 1,4-dibromobutane, and then oxidizing one of carbon-carbon double bonds with m-chloroperbenzoic acid (mCPBA).

The reaction solution obtained above was cooled to 25° C., transferred to a separatory funnel into which 100 mL of water had been put, and extracted three times with 100 mL of ethyl acetate. The organic layer was washed with water and dehydrated over anhydrous sodium sulfate. After filtering the drying agent off, the filtrate was concentrated and the residue was oxidized with m-chloroperbenzoic acid and then purified by silica gel column chromatography to obtain 7.32 g of a compound represented by Formula (13) as the intermediate compound 1-2.

Example 30

The compound represented by Formula (BJ) was obtained by a method shown below.

The same operation as in Example 1, except that a compound represented by Formula (5-8) was used instead of the compound represented by Formula (5-1), was performed to obtain 3.53 g of the compound (BJ) (in Formula (BJ), $Rf_1$ is the PFPE chain represented by Formula (4-1), and in the two $Rf_1$'s, h indicating an average degree of polymerization represents 4.5 and i indicating an average degree of polymerization represents 4.5).

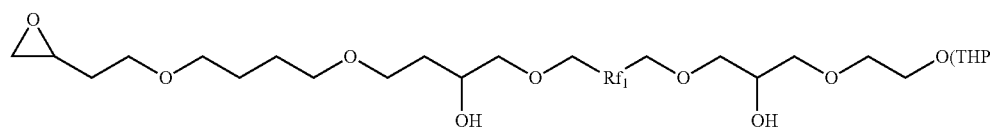

(13)

(in Formula (13), $Rf_1$ is the PFPE chain represented by Formula (4-1), in $Rf_1$, h indicating an average degree of polymerization represents 4.5 and i indicating an average degree of polymerization represents 4.5, and THP represents a tetrahydropyranyl group)

(Fourth Reaction)

Subsequently, 6.81 g of the compound represented by Formula (12), which is the intermediate compound 1b obtained above, 7.32 g of the compound represented by Formula (13), which is the intermediate compound 1-2 obtained above, and 20 mL of t-butanol were charged into a 100 mL eggplant flask in a nitrogen gas atmosphere, and stirred at room temperature until a homogenous mixture was obtained. 0.45 g of potassium tert-butoxide was added to the mixture and stirred at 70° C. for 16 hours to undergo a reaction.

The reaction solution obtained after the reaction was cooled to room temperature, 50 g of a 10% hydrochloric acid/methanol solution (hydrochloric acid-methanol reagent (5% to 10%) manufactured by Tokyo Chemical Industry Co., Ltd.) was added thereto, and the mixture was stirred at room temperature for 4 hours. Thereafter, the reaction solution was gradually transferred to a separatory funnel into which 100 mL of a saturated aqueous sodium bicarbonate solution had been put, and then extracted twice with 200 mL of ethyl acetate. The organic layer was washed with 100 mL of saline, 100 mL of a saturated aqueous sodium bicarbonate solution, and 100 mL of saline in this order, and then dehydrated over anhydrous sodium sulfate. After filtering the drying agent off, the filtrate was concentrated and the residue was purified by silica gel column chromatography to obtain 3.92 g of a compound (BI) (in Formula (BI), $Rf_1$ is the PFPE chain represented by Formula (4-1), and in the two $Rf_1$'s, h indicating an average degree of polymerization represents 4.5 and i indicating an average degree of polymerization represents 4.5).

The obtained compound (BI) was subjected to $^1$H-NMR and $^{19}$F-NMR measurements, and a structure thereof was identified based on the following results.

$^1$H-NMR (acetone-$D_6$): δ [ppm]=1.65 to 1.85 (8H), 3.40 to 3.85 (44H), 3.85 to 4.10 (8H)

$^{19}$F-NMR (acetone-$D_6$): δ [ppm]=−55.5 to −51.5 (18F), −78.5 (4F), −80.5 (4F), −91.0 to −88.5 (36F)

The compound represented by Formula (5-8) was synthesized by protecting one of hydroxy groups of 1,6-hexanediol using dihydropyran, and then reacting the product with epibromohydrin.

The obtained compound (BJ) was subjected to $^1$H-NMR and $^{19}$F-NMR measurements, and a structure thereof was identified based on the following results.

$^1$H-NMR (acetone-$D_6$): δ [ppm]=1.20 to 1.85 (24H), 3.40 to 3.85 (38H), 3.85 to 4.10 (8H)

$^{19}$F-NMR (acetone-$D_6$): δ [ppm]=−55.5 to −51.5 (18F), −78.5 (4F), −80.5 (4F), −91.0 to −88.5 (36F)

Example 31

The compound represented by Formula (BK) was obtained by a method shown below.

The same operation as in Example 1, except that a compound represented by Formula (5-9) was used instead of the compound represented by Formula (5-1), was performed to obtain 3.30 g of the compound (BK) (in Formula (BK), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (5-9) was synthesized by protecting 7-octen-1-ol using dihydropyran, and then oxidizing the product with m-chloroperbenzoic acid.

The obtained compound (BK) was subjected to $^1$H-NMR and $^{19}$F-NMR measurements, and a structure thereof was identified based on the following results.

$^1$H-NMR (acetone-$D_6$): δ [ppm]=1.20 to 1.85 (24H), 3.40 to 3.85 (30H), 3.85 to 4.10 (8H)

$^{19}$F-NMR (acetone-$D_6$): δ [ppm]=−55.5 to −51.5 (18F), −78.5 (4F), −80.5 (4F), −91.0 to −88.5 (36F)

Example 32

The compound represented by Formula (BL) was obtained by a method shown below.

The same operation as in Example 1, except that a compound represented by Formula (5-10) was used instead of the compound represented by Formula (5-1), was performed to obtain 2.95 g of the compound (BL) (in Formula (BL), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (5-10) was synthesized by reacting 2-(2-bromoethoxy)tetrahydro-2H-pyran with 5-hexen-1-ol, and then oxidizing the product with m-chloroperbenzoic acid.

The obtained compound (BL) was subjected to $^1$H-NMR and $^{19}$F-NMR measurements, and a structure thereof was identified based on the following results.

$^1$H-NMR (acetone-$D_6$): δ [ppm]=1.20 to 1.85 (20H), 3.40 to 3.85 (38H), 3.85 to 4.10 (8H)

$^{19}$F-NMR (acetone-$D_6$): δ [ppm]=−55.5 to −51.5 (18F), −78.5 (4F), −80.5 (4F), −91.0 to −88.5 (36F)

Example 33

The compound represented by Formula (BM) was obtained by a method shown below.

The same operation as in Example 1, except that a compound represented by Formula (5-11) was used instead of the compound represented by Formula (5-1), was performed to obtain 3.01 g of the compound (BM) (in Formula (BM), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (5-11) was synthesized by protecting a hydroxy group of an allyl alcohol using dihydropyran, and then oxidizing the product with m-chloroperbenzoic acid.

The obtained compound (BM) was subjected to $^1$H-NMR and $^{19}$F-NMR measurements, and a structure thereof was identified based on the following results.

$^1$H-NMR (acetone-$D_6$): δ [ppm]=1.65 to 1.85 (8H), 3.40 to 3.85 (30H), 3.85 to 4.10 (8H)

$^{19}$F-NMR (acetone-$D_6$): δ [ppm]=−55.5 to −51.5 (18F), −78.5 (4F), −80.5 (4F), −91.0 to −88.5 (36F)

Example 34

The compound represented by Formula (BN) was obtained by a method shown below.

The same operation as in Example 1, except that a compound represented by Formula (5-12) was used instead of the compound represented by Formula (5-1), was performed to obtain 3.08 g of the compound (BN) (in Formula (BN), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (5-12) was synthesized by protecting two hydroxy groups of 1-allyloxy-2,3-propanediol using dihydropyran, and then oxidizing the product with m-chloroperbenzoic acid.

The obtained compound (BN) was subjected to $^1$H-NMR and $^{19}$F-NMR measurements, and a structure thereof was identified based on the following results.

$^1$H-NMR (acetone-$D_6$): δ [ppm]=1.65 to 1.85 (8H), 3.40 to 3.85 (42H), 3.85 to 4.10 (8H)

$^{19}$F-NMR (acetone-$D_6$): δ [ppm]=−55.5 to −51.5 (18F), −78.5 (4F), −80.5 (4F), −91.0 to −88.5 (36F)

Example 35

The compound represented by Formula (BO) was obtained by a method shown below.

The same operation as in Example 1, except that a compound represented by Formula (5-13) was used instead of the compound represented by Formula (5-1), was performed to obtain 3.06 g of the compound (BO) (in Formula (BO), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (5-13) was synthesized by subjecting an allyl alcohol and an allyl glycidyl ether to an addition reaction, then protecting a hydroxy group generated by the addition reaction using dihydropyran, and oxidizing one of allyl groups with m-chloroperbenzoic acid.

The obtained compound (BO) was subjected to $^1$H-NMR and $^{19}$F-NMR measurements, and a structure thereof was identified based on the following results.

$^1$H-NMR (acetone-$D_6$): δ [ppm]=1.65 to 1.85 (8H), 3.40 to 3.85 (44H), 3.85 to 4.10 (8H), 5.40 to 6.10 (6H)

$^{19}$F-NMR (acetone-$D_6$): δ [ppm]=−55.5 to −51.5 (18F), −78.5 (4F), −80.5 (4F), −91.0 to −88.5 (36F)

Example 36

The compound represented by Formula (BP) was obtained by a method shown below.

The same operation as in Example 1, except that a compound represented by Formula (5-14) was used instead of the compound represented by Formula (5-1), was performed to obtain 3.28 g of the compound (BP) (in Formula (BP), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (5-14) was synthesized by reacting p-methoxyphenol with epibromohydrin.

The obtained compound (BP) was subjected to $^1$H-NMR and $^{19}$F-NMR measurements, and a structure thereof was identified based on the following results.

$^1$H-NMR (acetone-$D_6$): δ [ppm]=1.65 to 1.85 (8H), 3.40 to 3.85 (34H), 3.85 to 4.10 (8H), 6.30 to 7.10 (8H)

$^{19}$F-NMR (acetone-$D_6$): δ [ppm]=−55.5 to −51.5 (18F), −78.5 (4F), −80.5 (4F), −91.0 to −88.5 (36F)

Example 37

The compound represented by Formula (BQ) was obtained by a method shown below.

The same operation as in Example 1, except that a compound represented by Formula (5-15) was used instead of the compound represented by Formula (5-1), was performed to obtain 3.15 g of the compound (BQ) (in Formula (BQ), $Rf_1$ is the PFPE chain represented by Formula (4-1), and in the two $Rf_1$'s, h indicating an average degree of polymerization represents 4.5 and i indicating an average degree of polymerization represents 4.5).

The compound represented by Formula (5-15) was synthesized by reacting N-(2-hydroxyethyl) acetamide with epibromohydrin.

The obtained compound (BQ) was subjected to $^1$H-NMR and $^{19}$F-NMR measurements, and a structure thereof was identified based on the following results.

$^1$H-NMR (acetone-D$_6$): δ [ppm]=1.65 to 1.85 (8H), 1.90 (6H), 3.40 to 3.85 (36H), 3.85 to 4.10 (8H), 6.30 to 6.50 (2H)

$^{19}$F-NMR (acetone-D$_6$): δ [ppm]=−55.5 to −51.5 (18F), −78.5 (4F), −80.5 (4F), −91.0 to −88.5 (36F)

Example 38

The compound represented by Formula (BR) was obtained by a method shown below.

The same operation as in Example 1, except that a compound represented by Formula (5-16) was used instead of the compound represented by Formula (5-1), was performed to obtain 3.21 g of the compound (BR) (in Formula (BR), Rf$_1$ is the PFPE chain represented by Formula (4-1), and in the two Rf$_1$'s, h indicating an average degree of polymerization represents 4.5 and i indicating an average degree of polymerization represents 4.5).

The compound represented by Formula (5-16) was synthesized by reacting 2-cyanoethanol with epibromohydrin.

The obtained compound (BR) was subjected to $^1$H-NMR and $^{19}$F-NMR measurements, and a structure thereof was identified based on the following results.

$^1$H-NMR (acetone-D$_6$): δ [ppm]=1.65 to 1.85 (8H), 2.00 to 2.10 (4H), 3.40 to 3.85 (32H), 3.85 to 4.10 (8H)

$^{19}$F-NMR (acetone-D$_6$): δ [ppm]=−55.5 to −51.5 (18F), −78.5 (4F), −80.5 (4F), −91.0 to −88.5 (36F)

Example 39

The compound represented by Formula (CA) was obtained by a method shown below.

The same operation as in Example 1, except that a compound represented by Formula (14) was used instead of the compound represented by Formula (7-1), was performed to obtain 3.81 g of the compound (CA) (in Formula (CA), Rf$_1$ is the PFPE chain represented by Formula (4-1), and in the three Rf$_1$'s, h indicating an average degree of polymerization represents 4.5 and i indicating an average degree of polymerization represents 4.5).

$^{19}$F-NMR (acetone-D$_6$): δ [ppm]=−55.5 to −51.5 (27F), −78.5 (6F), −80.5 (6F), −91.0 to −88.5 (54F)

Example 40

The compound represented by Formula (CB) was obtained by a method shown below.

The same operation as in Example 39, except that a compound represented by Formula (9-2) was used instead of the compound represented by Formula (9-1), was performed to obtain 3.96 g of the compound (CB) (in Formula (CB), Rf$_1$ is the PFPE chain represented by Formula (4-1), and in the three Rf$_1$'s, h indicating an average degree of polymerization represents 4.5 and i indicating an average degree of polymerization represents 4.5).

The compound represented by Formula (9-2) was synthesized by reacting 1,4-dibromobutane with 5-hexen-1-ol in a molar amount twice that of 1,4-dibromobutane, and then oxidizing one of carbon-carbon double bonds with m-chloroperbenzoic acid (mCPBA).

The obtained compound (CB) was subjected to $^1$H-NMR and $^{19}$F-NMR measurements, and a structure thereof was identified based on the following results.

$^1$H-NMR (acetone-D$_6$): δ [ppm]=1.65 to 1.85 (24H), 3.40 to 3.85 (54H), 3.85 to 4.10 (12H)

$^{19}$F-NMR (acetone-D$_6$): δ [ppm]=−55.5 to −51.5 (27F), −78.5 (6F), −80.5 (6F), −91.0 to −88.5 (54F)

Example 41

The compound represented by Formula (CC) was obtained by a method shown below.

The same operation as in Example 39, except that a compound represented by Formula (9-3) was used instead of the compound represented by Formula (9-1), was performed to obtain 3.64 g of the compound (CC) (in Formula (CC), Rf$_1$ is the PFPE chain represented by Formula (4-1), and in the three Rf$_1$'s, h indicating an average degree of polymerization represents 4.5 and i indicating an average degree of polymerization represents 4.5).

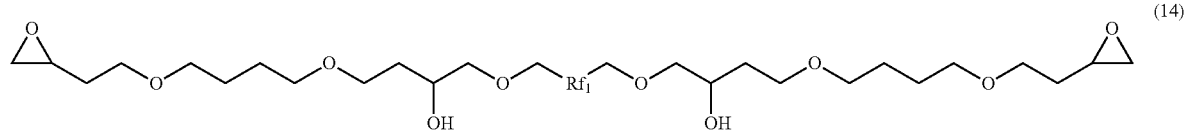

(14)

(in Formula (14), Rf$_1$ is the PFPE chain represented by Formula (4-1), and in Rf$_1$, h indicating an average degree of polymerization represents 4.5 and i indicating an average degree of polymerization represents 4.5).

The compound represented by Formula (14) was synthesized by reacting a compound (number-average molecular weight: 1,000, molecular weight distribution: 1.1) represented by HOCH$_2$CF$_2$O(CF$_2$CF$_2$O)$_h$(CF$_2$O)$_i$CF$_2$CH$_2$OH (in the formula, h indicating an average degree of polymerization is 4.5 and i indicating an average degree of polymerization is 4.5) with the compound represented by Formula (9-1), and then oxidizing the product with m-chloroperbenzoic acid.

The obtained compound (CA) was subjected to $^1$H-NMR and $^{19}$F-NMR measurements, and a structure thereof was identified based on the following results.

$^1$H-NMR (acetone-D$_6$): δ [ppm]=1.65 to 1.85 (16H), 3.40 to 3.85 (54H), 3.85 to 4.10 (12H)

The compound represented by Formula (9-3) was synthesized by reacting 1,2-dibromoethane with 3-buten-1-ol in a molar amount twice that of 1,2-dibromoethane, and then oxidizing one of carbon-carbon double bonds with m-chloroperbenzoic acid (mCPBA).

The obtained compound (CC) was subjected to $^1$H-NMR and $^{19}$F-NMR measurements, and a structure thereof was identified based on the following results.

$^1$H-NMR (acetone-D$_6$): δ [ppm]=1.65 to 1.85 (8H), 3.40 to 3.85 (54H), 3.85 to 4.10 (12H)

$^{19}$F-NMR (acetone-D$_6$): δ [ppm]=−55.5 to −51.5 (27F), −78.5 (6F), −80.5 (6F), −91.0 to −88.5 (54F)

Example 42

The compound represented by Formula (CD) was obtained by a method shown below.

The same operation as in Example 39, except that a compound represented by Formula (9-5) was used instead of the compound represented by Formula (9-1), was performed to obtain 3.53 g of the compound (CD) (in Formula (CD), $Rf_1$ is the PFPE chain represented by Formula (4-1), and in the three $Rf_1$'s, h indicating an average degree of polymerization represents 4.5 and i indicating an average degree of polymerization represents 4.5).

The compound represented by Formula (9-5) was synthesized by reacting 1,8-dibromooctane with 3-buten-1-ol in a molar amount twice that of 1,8-dibromooctane, and then oxidizing one of carbon-carbon double bonds with m-chloroperbenzoic acid (mCPBA).

The obtained compound (CD) was subjected to $^1$H-NMR and $^{19}$F-NMR measurements, and a structure thereof was identified based on the following results.

$^1$H-NMR (acetone-$D_6$): δ [ppm]=1.65 to 1.85 (32H), 3.40 to 3.85 (54H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 43

The compound represented by Formula (CE) was obtained by a method shown below.

The same operation as in Example 39, except that a compound represented by Formula (9-6) was used instead of the compound represented by Formula (9-1), was performed to obtain 3.67 g of the compound (CE) (in Formula (CE), $Rf_1$ is the PFPE chain represented by Formula (4-1), and in the three $Rf_1$'s, h indicating an average degree of polymerization represents 4.5 and i indicating an average degree of polymerization represents 4.5).

The compound represented by Formula (9-6) was synthesized by reacting 2,2-dimethyl-1,3-propanediol with 5-bromo-1-pentene in a molar amount twice that of 2,2-dimethyl-1,3-propanediol, and then oxidizing one of carbon-carbon double bonds with m-chloroperbenzoic acid (mCPBA).

The obtained compound (CE) was subjected to $^1$H-NMR and $^{19}$F-NMR measurements, and a structure thereof was identified based on the following results.

$^1$H-NMR (acetone-$D_6$): δ [ppm]=0.90 (12H), 1.65 to 1.85 (16H), 3.40 to 3.85 (54H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 44

The compound represented by Formula (CF) was obtained by a method shown below.

The same operation as in Example 39, except that a compound represented by Formula (9-7) was used instead of the compound represented by Formula (9-1), was performed to obtain 3.85 g of the compound (CF) (in Formula (CF), $Rf_1$ is the PFPE chain represented by Formula (4-1), and in the three $Rf_1$'s, h indicating an average degree of polymerization represents 4.5 and i indicating an average degree of polymerization represents 4.5).

The compound represented by Formula (9-7) was synthesized by reacting 2,3-butanediol with 5-bromo-1-pentene in a molar amount twice that of 2,3-butanediol, and then oxidizing one of carbon-carbon double bonds with m-chloroperbenzoic acid (mCPBA).

The obtained compound (CF) was subjected to $^1$H-NMR and $^{19}$F-NMR measurements, and a structure thereof was identified based on the following results.

$^1$H-NMR (acetone-$D_6$): δ [ppm]=1.15 to 1.20 (12H), 1.65 to 1.85 (16H), 3.40 to 3.85 (50H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 45

The compound represented by Formula (CG) was obtained by a method shown below.

The same operation as in Example 39, except that a compound represented by Formula (9-8) was used instead of the compound represented by Formula (9-1), was performed to obtain 4.03 g of the compound (CG) (in Formula (CG), $Rf_1$ is the PFPE chain represented by Formula (4-1), and in the three $Rf_1$'s, h indicating an average degree of polymerization represents 4.5 and i indicating an average degree of polymerization represents 4.5).

The compound represented by Formula (9-8) was synthesized by reacting a compound obtained by brominating diethylene glycol with phosphorus tribromide ($PBr_3$) with 3-buten-1-ol in a molar amount twice that of the compound, and then oxidizing one of carbon-carbon double bonds with m-chloroperbenzoic acid (mCPBA).

The obtained compound (CG) was subjected to $^1$H-NMR and $^{19}$F-NMR measurements, and a structure thereof was identified based on the following results.

$^1$H-NMR (acetone-$D_6$): δ [ppm]=1.65 to 1.85 (8H), 3.40 to 3.85 (62H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 46

The compound represented by Formula (CH) was obtained by a method shown below.

The same operation as in Example 39, except that a compound represented by Formula (9-12) was used instead of the compound represented by Formula (9-1), was performed to obtain 4.24 g of the compound (CH) (in Formula (CH), $Rf_1$ is the PFPE chain represented by Formula (4-1), and in the three $Rf_1$'s, h indicating an average degree of polymerization represents 4.5 and i indicating an average degree of polymerization represents 4.5).

The compound represented by Formula (9-12) was synthesized by reacting 2,2,3,3-tetrafluoro-1,4-butanediol with 1-bromo-4-pentene having the equimolar amount as 2,2,3,3-tetrafluoro-1,4-butanediol, and then reacting the equimolar amount of 2-bromoethyl oxirane therewith.

The obtained compound (CH) was subjected to $^1$H-NMR and $^{19}$F-NMR measurements, and a structure thereof was identified based on the following results.

$^1$H-NMR (acetone-$D_6$): δ [ppm]=1.65 to 1.85 (12H), 3.40 to 3.85 (46H), 3.85 to 4.10 (20H)

$^{19}$F-NMR (acetone-$D_6$): δ [ppm]=−55.5 to −51.5 (27F), −78.5 (6F), −80.5 (6F), −91.0 to −88.5 (54F), −130.0 (8F)

Example 47

The compound represented by Formula (CI) was obtained by a method shown below.

The same operation as in Example 39, except that a compound represented by Formula (9-15) was used instead of the compound represented by Formula (9-1), was performed to obtain 3.93 g of the compound (CI) (in Formula (CI), $Rf_1$ is the PFPE chain represented by Formula (4-1), and in the three $Rf_1$'s, h indicating an average degree of polymerization represents 4.5 and i indicating an average degree of polymerization represents 4.5).

The compound represented by Formula (9-15) was synthesized by performing subjecting epibromohydrin and 3-buten-1-ol in a molar amount twice that of epibromohydrin to an addition reaction, protecting a hydroxy group generated by the addition reaction using dihydropyran, and further oxidizing one of carbon-carbon double bonds with m-chloroperbenzoic acid (mCPBA).

The obtained compound (CI) was subjected to $^1$H-NMR and $^{19}$F-NMR measurements, and a structure thereof was identified based on the following results.

$^1$H-NMR (acetone-D$_6$): δ [ppm]=1.65 to 1.85 (8H), 3.40 to 3.85 (58H), 3.85 to 4.10 (12H)

$^{19}$F-NMR (acetone-D$_6$): δ [ppm]=−55.5 to −51.5 (27F), −78.5 (6F), −80.5 (6F), −91.0 to −88.5 (54F)

Example 48

The compound represented by Formula (CJ) was obtained by a method shown below.

The same operation as in Example 39, except that a compound represented by Formula (9-18) was used instead of the compound represented by Formula (9-1), was performed to obtain 3.93 g of the compound (CJ) (in Formula (CJ), Rf$_1$ is the PFPE chain represented by Formula (4-1), and in the three Rf$_1$'s, h indicating an average degree of polymerization represents 4.5 and i indicating an average degree of polymerization represents 4.5).

The compound represented by Formula (9-18) was synthesized by reacting 3-buten-1-ol with an equimolar amount of epibromohydrin.

The obtained compound (CJ) was subjected to $^1$H-NMR and $^{19}$F-NMR measurements, and a structure thereof was identified based on the following results.

$^1$H-NMR (acetone-D$_6$): δ [ppm]=1.65 to 1.85 (4H), 3.40 to 3.85 (46H), 3.85 to 4.10 (12H)

$^{19}$F-NMR (acetone-D$_6$): δ [ppm]=−55.5 to −51.5 (27F), −78.5 (6F), −80.5 (6F), −91.0 to −88.5 (54F)

Example 49

The compound represented by Formula (DA) was obtained by a method shown below.

The same operation as in Example 39, except that in the synthesis of the compound represented by Formula (11) and the compound represented by Formula (14), a compound (number-average molecular weight: 1,000, molecular weight distribution: 1.1) represented by HOCH$_2$CF$_2$CF$_2$O(CF$_2$CF$_2$CF$_2$O)$_j$CF$_2$CF$_2$CH$_2$OH (in the formula, j indicating an average degree of polymerization is 4.5) was used instead of the compound represented by HOCH$_2$CF$_2$O(CF$_2$CF$_2$O)$_h$(CF$_2$O)$_i$CF$_2$CH$_2$OH, was performed to obtain 3.86 g of the compound (DA) (in Formula (DA), Rf$_2$ is the PFPE chain represented by Formula (4-2), and in the three Rf$_2$'s, j indicating an average degree of polymerization represents 4.5).

The obtained compound (DA) was subjected to $^1$H-NMR and $^{19}$F-NMR measurements, and a structure thereof was identified based on the following results.

$^1$H-NMR (acetone-D$_6$): δ [ppm]=1.65 to 1.85 (16H), 3.40 to 3.85 (54H), 3.85 to 4.10 (12H)

$^{19}$F-NMR (acetone-D$_6$): δ [ppm]=−84.0 to −83.0 (54F), −86.4 (12F), −124.3 (12F), −130.0 to −129.0 (27F)

Example 50

The compound represented by Formula (DB) was obtained by a method shown below.

The same operation as in Example 39, except that a compound represented by Formula (5-5) was used instead of the compound represented by Formula (5-1), was performed to obtain 4.01 g of the compound (DB) (in Formula (DB), Rf$_1$ is the PFPE chain represented by Formula (4-1), and in the three Rf$_1$'s, h indicating an average degree of polymerization represents 4.5 and i indicating an average degree of polymerization represents 4.5).

The obtained compound (DB) was subjected to $^1$H-NMR and $^{19}$F-NMR measurements, and a structure thereof was identified based on the following results.

$^1$H-NMR (acetone-D$_6$): δ [ppm]=1.65 to 1.85 (16H), 3.40 to 3.85 (66H), 3.85 to 4.10 (12H)

$^{19}$F-NMR (acetone-D$_6$): δ [ppm]=−55.5 to −51.5 (27F), −78.5 (6F), −80.5 (6F), −91.0 to −88.5 (54F)

Example 51

The compound represented by Formula (DC) was obtained by a method shown below.

The same operation as in Example 39, except that a compound represented by Formula (5-3) was used instead of the compound represented by Formula (5-1), was performed to obtain 3.64 g of the compound (DC) (in Formula (DC), Rf$_1$ is the PFPE chain represented by Formula (4-1), and in the three Rf$_1$'s, h indicating an average degree of polymerization represents 4.5 and i indicating an average degree of polymerization represents 4.5).

The obtained compound (DC) was subjected to $^1$H-NMR and $^{19}$F-NMR measurements, and a structure thereof was identified based on the following results.

$^1$H-NMR (acetone-D$_6$): δ [ppm]=1.65 to 1.85 (20H), 3.40 to 3.85 (46H), 3.85 to 4.10 (12H)

$^{19}$F-NMR (acetone-D$_6$): δ [ppm]=−55.5 to −51.5 (27F), −78.5 (6F), −80.5 (6F), −91.0 to −88.5 (54F)

Example 52

The compound represented by Formula (DD) was obtained by a method shown below.

The same operation as in Example 39, except that a compound represented by Formula (5-4) was used instead of the compound represented by Formula (5-1), was performed to obtain 3.87 g of the compound (DD) (in Formula (DD), Rf$_1$ is the PFPE chain represented by Formula (4-1), and in the three Rf$_1$'s, h indicating an average degree of polymerization represents 4.5 and i indicating an average degree of polymerization represents 4.5).

The obtained compound (DD) was subjected to $^1$H-NMR and $^{19}$F-NMR measurements, and a structure thereof was identified based on the following results.

$^1$H-NMR (acetone-D$_6$): δ [ppm]=1.65 to 1.85 (20H), 3.40 to 3.85 (54H), 3.85 to 4.10 (12H)

$^{19}$F-NMR (acetone-D$_6$): δ [ppm]=−55.5 to −51.5 (27F), −78.5 (6F), −80.5 (6F), −91.0 to −88.5 (54F)

Example 53

The compound represented by Formula (DE) was obtained by a method shown below.

The same operation as in Example 39, except that a compound represented by Formula (5-15) was used instead of the compound represented by Formula (5-1), was performed to obtain 3.95 g of the compound (DE) (in Formula (DE), Rf$_1$ is the PFPE chain represented by Formula (4-1), and in the three Rf$_1$'s, h indicating an average degree of polymerization represents 4.5 and i indicating an average degree of polymerization represents 4.5).

The obtained compound (DE) was subjected to $^1$H-NMR and $^{19}$F-NMR measurements, and a structure thereof was identified based on the following results.

$^1$H-NMR (acetone-D$_6$): δ [ppm]=1.65 to 1.85 (16H), 1.90 (6H), 3.40 to 3.85 (52H), 3.85 to 4.10 (12H), 6.30 to 6.50 (2H)

$^{19}$F-NMR (acetone-D$_6$): δ [ppm]=−55.5 to −51.5 (27F), −78.5 (6F), −80.5 (6F), −91.0 to −88.5 (54F)

Example 54

The compound represented by Formula (DF) was obtained by a method shown below.

The same operation as in Example 39, except that a compound represented by Formula (5-16) was used instead of the compound represented by Formula (5-1), was performed to obtain 3.72 g of the compound (DF) (in Formula (DF), Rf$_1$ is the PFPE chain represented by Formula (4-1), and in the three Rf$_1$'s, h indicating an average degree of polymerization represents 4.5 and i indicating an average degree of polymerization represents 4.5).

The obtained compound (DF) was subjected to $^1$H-NMR and $^{19}$F-NMR measurements, and a structure thereof was identified based on the following results.

$^1$H-NMR (acetone-D$_6$): δ [ppm]=1.65 to 1.85 (16H), 2.00 to 2.10 (4H), 3.40 to 3.85 (48H), 3.85 to 4.10 (12H)

$^{19}$F-NMR (acetone-D$_6$): δ [ppm]=−55.5 to −51.5 (27F), −78.5 (6F), −80.5 (6F), −91.0 to −88.5 (54F)

Example 55

The compound represented by Formula (DG) was obtained by a method shown below.

The same operation as in Example 39, except that a compound represented by Formula (5-11) was used instead of the compound represented by Formula (5-1), was performed to obtain 3.51 g of the compound (DG) (in Formula (DG), Rf$_1$ is the PFPE chain represented by Formula (4-1), and in the three Rf$_1$'s, h indicating an average degree of polymerization represents 4.5 and i indicating an average degree of polymerization represents 4.5).

The obtained compound (DG) was subjected to $^1$H-NMR and $^{19}$F-NMR measurements, and a structure thereof was identified based on the following results.

$^1$H-NMR (acetone-D$_6$): δ [ppm]=1.65 to 1.85 (16H), 3.40 to 3.85 (46H), 3.85 to 4.10 (12H)

$^{19}$F-NMR (acetone-D$_6$): δ [ppm]=−55.5 to −51.5 (27F), −78.5 (6F), −80.5 (6F), −91.0 to −88.5 (54F)

Example 56

The compound represented by Formula (EA) was obtained by a method shown below.

The same operation as in Example 1, except that a compound represented by Formula (7-21) was used instead of the compound represented by Formula (7-1), was performed to obtain 2.82 g of the compound (EA) (in Formula (EA), Rf$_1$ is the PFPE chain represented by Formula (4-1), and in the two Rf$_1$'s, h indicating an average degree of polymerization represents 4.5 and i indicating an average degree of polymerization represents 4.5).

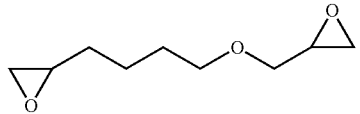

(7-21)

The compound represented by Formula (7-21) was synthesized by reacting epibromohydrin with the equimolar amount of 5-hexen-1-ol, and then oxidizing the product with m-chloroperbenzoic acid (mCPBA).

The obtained compound (EA) was subjected to $^1$H-NMR and $^{19}$F-NMR measurements, and a structure thereof was identified based on the following results.

$^1$H-NMR (acetone-D$_6$): δ [ppm]=1.65 to 1.85 (6H), 3.65 to 3.85 (34H), 3.85 to 4.10 (8H)

$^{19}$F-NMR (acetone-D$_6$): δ [ppm]=−55.5 to −51.5 (18F), −78.5 (4F), −80.5 (4F), −91.0 to −88.5 (36F)

Example 57

The compound represented by Formula (EB) was obtained by a method shown below.

The same operation as in Example 1, except that a compound represented by Formula (7-21) was used instead of the compound represented by Formula (7-1), and a compound represented by Formula (5-11) was used instead of the compound represented by Formula (5-1), was performed to obtain 2.66 g of the compound (EB) (in Formula (EB), Rf$_1$ is the PFPE chain represented by Formula (4-1), and in the two Rf$_1$'s, h indicating an average degree of polymerization represents 4.5 and i indicating an average degree of polymerization represents 4.5).

The obtained compound (EB) was subjected to $^1$H-NMR and $^{19}$F-NMR measurements, and a structure thereof was identified based on the following results.

$^1$H-NMR (acetone-D$_6$): δ [ppm]=1.65 to 1.85 (6H), 3.65 to 3.85 (26H), 3.85 to 4.10 (8H)

$^{19}$F-NMR (acetone-D$_6$): δ [ppm]=−55.5 to −51.5 (18F), −78.5 (4F), −80.5 (4F), −91.0 to −88.5 (36F)

Example 58

The compound represented by Formula (EC) was obtained by a method shown below.

The same operation as in Example 1, except that a compound represented by Formula (7-15) was used instead of the compound represented by Formula (7-1), and a compound represented by Formula (5-11) was used instead of the compound represented by Formula (5-1), was performed to obtain 2.81 g of the compound (EC) (in Formula (EC), Rf$_1$ is the PFPE chain represented by Formula (4-1), and in the two Rf$_1$'s, h indicating an average degree of polymerization represents 4.5 and i indicating an average degree of polymerization represents 4.5).

The obtained compound (EC) was subjected to $^1$H-NMR and $^{19}$F-NMR measurements, and a structure thereof was identified based on the following results.

$^1$H-NMR (acetone-D$_6$): δ [ppm]=1.65 to 1.85 (4H), 3.65 to 3.85 (32H), 3.85 to 4.10 (8H)

$^{19}$F-NMR (acetone-D$_6$): δ [ppm]=−55.5 to −51.5 (18F), −78.5 (4F), −80.5 (4F), −91.0 to −88.5 (36F)

The values of x and the structures of $R^1$, $R^2$, $R^3$, and $R^4$ in a case where the compounds (AA) to (AT), (BA) to (BR), (CA) to (CJ), (DA) to (DG), and (EA) to (EC) of Examples 1 to 58 obtained as described above were each applied to Formula (1) are shown in Tables 1 to 3.

TABLE 1

| Compound | x | R¹ | R² | R³ | R⁴ |
|---|---|---|---|---|---|
| (AA) | 1 | (3-1) p = 0/q = 0/r = 1/B = hydroxy group | (4-1) | (2-1) a11 = 1/a12 = 1/c = 4 | (3-1) p = 0/q = 0/r = 1/B = hydroxy group |
| (AB) | 1 | (3-1) p = 0/q = 0/r = 1/B = hydroxy group | (4-1) | (2-1) a11 = 3/a12 = 3/c = 4 | (3-1) p = 0/q = 0/r = 1/B = hydroxy group |
| (AC) | 1 | (3-1) p = 0/q = 0/r = 1/B = hydroxy group | (4-1) | (2-1) a11 = 1/a12 = 1/c = 2 | (3-1) p = 0/q = 0/r = 1/B = hydroxy group |
| (AD) | 1 | (3-1) p = 0/q = 0/r = 1/B = hydroxy group | (4-1) | (2-1) a11 = 1/a12 = 1/c = 6 | (3-1) p = 0/q = 0/r = 1/B = hydroxy group |
| (AE) | 1 | (3-1) p = 0/q = 0/r = 1/B = hydroxy group | (4-1) | (2-1) a11 = 1/a12 = 1/c = 8 | (3-1) p = 0/q = 0/r = 1/B = hydroxy group |
| (AF) | 1 | (3-1) p = 0/q = 0/r = 1/B = hydroxy group | (4-1) | (2-1) a11 = 2/a12 = 2/c = 3 | (3-1) p = 0/q = 0/r = 1/B = hydroxy group |
| (AG) | 1 | (3-1) p = 0/q = 0/r = 1/B = hydroxy group | (4-1) | (2-1) a11 = 2/a12 = 2/c = 2 | (3-1) p = 0/q = 0/r = 1/B = hydroxy group |
| (AH) | 1 | (3-1) p = 0/q = 0/r = 1/B = hydroxy group | (4-1) | (2-2) a21 = 1/a22 = 1/d = 2 | (3-1) p = 0/q = 0/r = 1/B = hydroxy group |
| (AI) | 1 | (3-1) p = 0/q = 0/r = 1/B = hydroxy group | (4-1) | (2-2) a21 = 1/a22 = 1/d = 4 | (3-1) p = 0/q = 0/r = 1/B = hydroxy group |
| (AJ) | 1 | (3-1) p = 0/q = 0/r = 1/B = hydroxy group | (4-1) | (2-2) a21 = 1/a22 = 1/d = 2 | (3-1) p = 0/q = 0/r = 1/B = hydroxy group |
| (AK) | 1 | (3-1) p = 0/q = 0/r = 1/B = hydroxy group | (4-1) | (2-2) a21 = 3/a22 = 3/d = 2 | (3-1) p = 0/q = 0/r = 1/B = hydroxy group |
| (AL) | 1 | (3-1) p = 0/q = 0/r = 1/B = hydroxy group | (4-1) | (2-3) a31 = 1/a32 = 1/e = 2 | (3-1) p = 0/q = 0/r = 1/B = hydroxy group |
| (AM) | 1 | (3-1) p = 0/q = 0/r = 1/B = hydroxy group | (4-1) | (2-3) a31 = 1/a32 = 1/e = 6 | (3-1) p = 0/q = 0/r = 1/B = hydroxy group |
| (AN) | 1 | (3-1) p = 0/q = 0/r = 1/B = hydroxy group | (4-1) | (2-3) a31 = 3/a32 = 3/e = 2 | (3-1) p = 0/q = 0/r = 1/B = hydroxy group |
| (AO) | 1 | (3-1) p = 0/q = 0/r = 1/B = hydroxy group | (4-1) | (2-4) a41 = 1/a42 = 1/f1 = 1/f2 = 1 | (3-1) p = 0/q = 0/r = 1/B = hydroxy group |
| (AP) | 1 | (3-1) p = 0/q = 0/r = 1/B = hydroxy group | (4-1) | (2-4) a41 = 1/a42 = 1/f1 = 1/f2 = 6 | (3-1) p = 0/q = 0/r = 1/B = hydroxy group |
| (AQ) | 1 | (3-1) p = 0/q = 0/r = 1/B = hydroxy group | (4-1) | (2-4) a41 = 3/a42 = 3/f1 = 1/f2 = 1 | (3-1) p = 0/q = 0/r = 1/B = hydroxy group |
| (AR) | 1 | (3-1) p = 0/q = 0/r = 1/B = hydroxy group | (4-1) | (2-5) a51 = 1/a52 = 0 | (3-1) p = 0/q = 0/r = 1/B = hydroxy group |
| (AS) | 1 | (3-1) p = 0/q = 0/r = 1/B = hydroxy group | (4-1) | (2-5) a51 = 5/a52 = 0 | (3-1) p = 0/q = 0/r = 1/B = hydroxy group |
| (AT) | 1 | (3-1) p = 0/q = 0/r = 1/B = hydroxy group | (4-1) | (2-5) a51 = 3/a52 = 3 | (3-1) p = 0/q = 0/r = 1/B = hydroxy group |

TABLE 2

| Compound | x | R¹ | R² | R³ | R⁴ |
|---|---|---|---|---|---|
| (BA) | 1 | (3-1) p = 0/q = 0/r = 1/B = hydroxy group | (4-2) | (2-1) a11 = 1/a12 = 1/c = 4 | (3-1) p = 0/q = 0/r = 1/B = hydroxy group |
| (BB) | 1 | (3-1) p = 0/q = 0/r = 1/B = hydroxy group | (4-3) | (2-1) a11 = 1/a12 = 1/c = 4 | (3-1) p = 0/q = 0/r = 1/B = hydroxy group |
| (BC) | 1 | (3-1) p = 0/q = 0/r = 2/B = hydroxy group | (4-1) | (2-1) a11 = 1/a12 = 1/c = 4 | (3-1) p = 0/q = 0/r = 2/B = hydroxy group |
| (BD) | 1 | (3-2) s = 0/t = 1 | (4-1) | (2-1) a11 = 1/a12 = 1/c = 4 | (3-2) s = 0/t = 1 |
| (BE) | 1 | (3-1) p = 1/q = 0/r = 1/B = hydroxy group | (4-1) | (2-1) a11 = 1/a12 = 1/c = 4 | (3-1) p = 0/q = 0/r = 1/B = hydroxy group |
| (BF) | 1 | (3-1) p = 0/q = 1/r = 1/B = hydroxy group | (4-1) | (2-1) a11 = 1/a12 = 1/c = 4 | (3-1) p = 0/q = 1/r = 1/B = hydroxy group |
| (BG) | 1 | (3-2) s = 1/t = 1 | (4-1) | (2-1) a11 = 1/a12 = 1/c = 4 | (3-2) s = 1/t = 1 |
| (BH) | 1 | (3-1) p = 1/q = 1/r = 1/B = hydroxy group | (4-1) | (2-1) a11 = 1/a12 = 1/c = 4 | (3-1) p = 1/q = 1/r = 1/B = hydroxy group |
| (BI) | 1 | (3-1) p = 0/q = 0/r = 1/B = hydroxy group | (4-1) | (2-1) a11 = 1/a12 = 1/c = 4 | (3-1) p = 0/q = 1/r = 1/B = hydroxy group |
| (BJ) | 1 | (3-1) p = 0/q = 0/r = 5/B = hydroxy group | (4-1) | (2-1) a11 = 1/a12 = 1/c = 4 | (3-1) p = 0/q = 0/r = 1/B = hydroxy group |
| (BK) | 1 | (3-2) s = 0/t = 5 | (4-1) | (2-1) a11 = 1/a12 = 1/c = 4 | (3-2) s = 0/t = 5 |
| (BL) | 1 | (3-1) p = 3/q = 0/r = 1/B = hydroxy group | (4-1) | (2-1) a11 = 1/a12 = 1/c = 4 | (3-1) p = 3/q = 0/r = 1/B = hydroxy group |
| (BM) | 1 | (3) l = 1/m = 1/n = 1/A = hydrogen atom | (4-1) | (2-1) a11 = 1/a12 = 1/c = 4 | (3) l = 1/m = 1/n = 1/A = hydrogen atom |
| (BN) | 1 | (3) l = 2/m = 1/n = 1/A = hydrogen atom | (4-1) | (2-1) a11 = 1/a12 = 1/c = 4 | (3) l = 2/m = 1/n = 1/A = hydrogen atom |
| (BO) | 1 | (3) l = 2/m = 1/n = 1/A = allyl group | (4-1) | (2-1) a11 = 1/a12 = 1/c = 4 | (3) l = 2/m = 1/n = 1/A = allyl group |
| (BP) | 1 | (3) l = 1/m = 1/n = 1 A = p-methoxyphenyl group | (4-1) | (2-1) a11 = 1/a12 = 1/c = 4 | (3) l = 1/m = 1/n = 1 A = p-methoxyphenyl group |

TABLE 2-continued

| Compound | x | R¹ | | R² | R³ | | R⁴ | |
|---|---|---|---|---|---|---|---|---|
| (BQ) | 1 | (3-1) | p = 0/q = 0/r = 1/B = acetamide group | (4-1) | (2-1) | a11 = 1/a12 = 1/c = 4 | (3-1) | p = 0/q = 0/r = 1/B = acetamide group |
| (BR) | 1 | (3-1) | p = 0/q = 0/r = 1/B = cyano group | (4-1) | (2-1) | a11 = 1/a12 = 1/c = 4 | (3-1) | p = 0/q = 0/r = 1/B = cyano group |

TABLE 3

| Compound | x | R¹ | | R² | R³ | | R⁴ | |
|---|---|---|---|---|---|---|---|---|
| (CA) | 2 | (3-1) | p = 0/q = 0/r = 1/B = hydroxy group | (4-1) | (2-1) | a11 = 1/a12 = 1/c = 4 | (3-1) | p = 0/q = 0/r = 1/B = hydroxy group |
| (CB) | 2 | (3-1) | p = 0/q = 0/r = 1/B = hydroxy group | (4-1) | (2-1) | a11 = 3/a12 = 3/c = 4 | (3-1) | p = 0/q = 0/r = 1/B = hydroxy group |
| (CC) | 2 | (3-1) | p = 0/q = 0/r = 1/B = hydroxy group | (4-1) | (2-1) | a11 = 1/a12 = 1/c = 2 | (3-1) | p = 0/q = 0/r = 1/B = hydroxy group |
| (CD) | 2 | (3-1) | p = 0/q = 0/r = 1/B = hydroxy group | (4-1) | (2-1) | a11 = 1/a12 = 1/c = 8 | (3-1) | p = 0/q = 0/r = 1/B = hydroxy group |
| (CE) | 2 | (3-1) | p = 0/q = 0/r = 1/B = hydroxy group | (4-1) | (2-1) | a11 = 2/a12 = 2/c = 3 | (3-1) | p = 0/q = 0/r = 1/B = hydroxy group |
| (CF) | 2 | (3-1) | p = 0/q = 0/r = 1/B = hydroxy group | (4-1) | (2-1) | a11 = 2/a12 = 2/c = 2 | (3-1) | p = 0/q = 0/r = 1/B = hydroxy group |
| (CG) | 2 | (3-1) | p = 0/q = 0/r = 1/B = hydroxy group | (4-1) | (2-2) | a21 = 1/a22 = 1/d = 2 | (3-1) | p = 0/q = 0/r = 1/B = hydroxy group |
| (CH) | 2 | (3-1) | p = 0/q = 0/r = 1/B = hydroxy group | (4-1) | (2-3) | R³ on R¹ side: a31 = 2/a32 = 1/e = 2  R³ on R⁴ side: a31 = 1/a32 = 2/c = 2 | (3-1) | p = 0/q = 0/r = 1/B = hydroxy group |
| (CI) | 2 | (3-1) | p = 0/q = 0/r = 1/B = hydroxy group | (4-1) | (2-4) | a41 = 1/a42 = 1/f1 = 1/f2 = 1 | (3-1) | p = 0/q = 0/r = 1/B = hydroxy group |
| (CJ) | 2 | (3-1) | p = 0/q = 0/r = 1/B = hydroxy group | (4-1) | (2-5) | R³ on R¹ side: a51 = 1/a52 = 0  R³ on R⁴ side: a51 = 0/a52 = 1 | (3-1) | p = 0/q = 0/r = 1/B = hydroxy group |
| (DA) | 2 | (3-1) | p = 0/q = 0/r = 1/B = hydroxy group | (4-2) | (2-1) | a11 = 1/a12 = 1/c = 4 | (3-1) | p = 0/q = 0/r = 1/B = hydroxy group |
| (DB) | 2 | (3-1) | p = 0/q = 1/r = 1/B = hydroxy group | (4-1) | (2-1) | a11 = 1/a12 = 1/c = 4 | (3-1) | p = 0/q = 1/r = 1/B = hydroxy group |
| (DC) | 2 | (3-2) | s = 0/t = 1 | (4-1) | (2-1) | a11 = 1/a12 = 1/c = 4 | (3-2) | s = 0/t = 1 |
| (DD)) | | (3-1) | p = 1/q = 0/r = 1/B = hydroxy group | (4-1) | (2-1) | a11 = 1/a12 = 1/c = 4 | (3-1) | p = 1/q = 0/r = 1/B = hydroxy group |
| (DE) | 2 | (3-1) | p = 0/q = 0/r = 1/B = acetamide group | (4-1) | (2-1) | a11 = 1/a12 = 1/c = 4 | (3-1) | p = 0/q = 0/r = 1/B = acetamide group |
| (DF) | 2 | (3-1) | p = 0/q = 0/r = 1/B = cyano group | (4-1) | (2-1) | a11 = 1/a12 = 1/c = 4 | (3-1) | p = 0/q = 0/r = 1/B = cyano group |
| (DG) | 2 | (3) | 1 = 1/m = 1/n = 1/A = hydrogen atom | (4-1) | (2-1) | a11 = 1/a12 = 1/c = 4 | (3) | 1 = 1/m = 1/n = 1/A = hydrogen atom |
| (EA) | 1 | (3-1) | p = 0/q = 0/r = 1/B = hydroxy group | (4-1) | (2-5) | a51 = 3/a52 = 0 | (3-1) | p = 0/q = 0/r = 1/B = hydroxy group |
| (EB) | 1 | (3) | 1 = 1/m = 1/n = 1/A = hydrogen atom | (4-1) | (2-5) | a51 = 3/a52 = 0 | (3) | 1 = 1/m = 1/n = 1/A = hydrogen atom |
| (EC) | 1 | (3) | 1 = 1/m = 1/n = 1/A = hydrogen atom | (4-1) | (2-4) | a41 = 1/a42 = 1/f1 = 1/f2 = 1 | (3) | 1 = 1/m = 1/n = 1/A = hydrogen atom |

Comparative Example 1

A compound represented by Formula (ZA) was synthesized by the method described in Patent Document 1.

(in Formula (ZA), $Rf_1$ is the PFPE chain represented by Formula (4-1), and in the two $Rf_1$'s, h indicating an average degree of polymerization represents 7.0 and i indicating an average degree of polymerization represents 0).

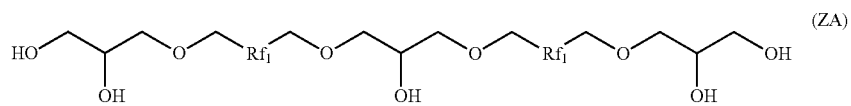

(ZA)

Comparative Example 2

A compound represented by Formula (ZB) was synthesized by the method described in Patent Document 2.

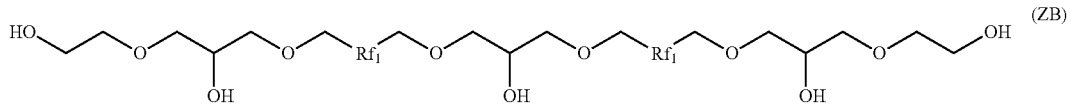

(in Formula (ZB), $Rf_1$ is the PFPE chain represented by Formula (4-1), and in the two $Rf_1$'s, h indicating an average degree of polymerization represents 4.5 and i indicating an average degree of polymerization represents 4.5).

Comparative Example 3

A compound represented by Formula (ZC) was synthesized by the method described in Patent Document 3.

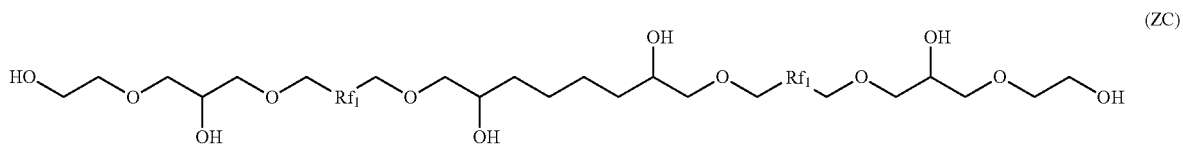

(in Formula (ZC), $Rf_1$ is the PFPE chain represented by Formula (4-1), and in the two $Rf_1$'s, h indicating an average degree of polymerization represents 4.5 and i indicating an average degree of polymerization represents 4.5).

Comparative Example 4

A compound represented by Formula (ZD) was synthesized by the method described in Patent Document 4.

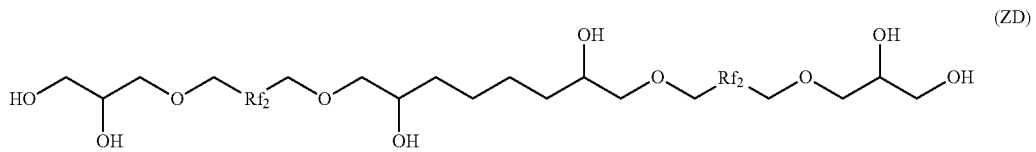

(in Formula (ZD), $Rf_2$ is the PFPE chain represented by Formula (4-2), and in the two $Rf_2$'s, j indicating an average degree of polymerization represents 4.5).

Comparative Example 5

A compound represented by Formula (ZE) was synthesized by the method described in Patent Document 5.

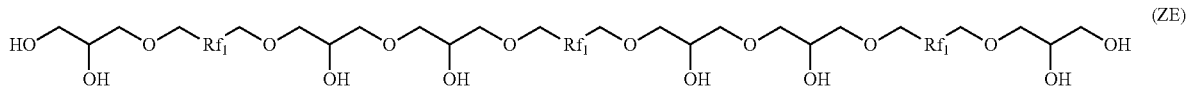

(in Formula (ZE), $Rf_1$ is the PFPE chain represented by Formula (4-1), and in the three $Rf_1$'s, h indicating an average degree of polymerization represents 7.0 and i indicating an average degree of polymerization represents 0).

Comparative Example 6

The compound represented by Formula (ZF) was synthesized by the method described in Patent Document 6.

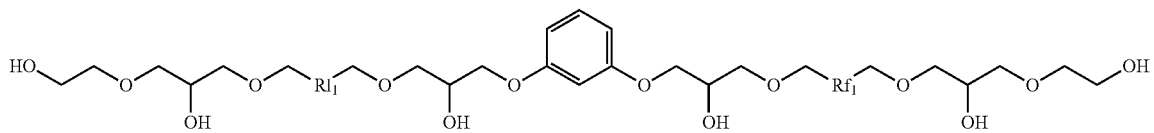

(ZF)

(in Formula (ZF), $Rf_1$ is the PFPE chain represented by Formula (4-1), and in the two $Rf_1$'s, h indicating an average degree of polymerization represents 4.5 and i indicating an average degree of polymerization represents 4.5).

Comparative Example 7

A compound represented by Formula (ZG) was synthesized by the method described in Patent Document 7.

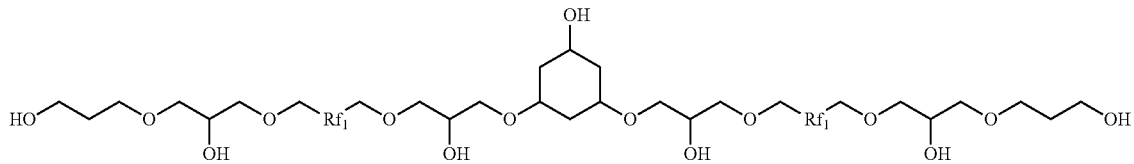

(in Formula (ZG), $Rf_1$ is the PFPE chain represented by Formula (4-1), and in the two $Rf_1$'s, h indicating an average degree of polymerization represents 4.5 and i indicating an average degree of polymerization represents 4.5).

Comparative Example 8

A compound represented by Formula (ZH) was synthesized by the method described in Patent Document 8.

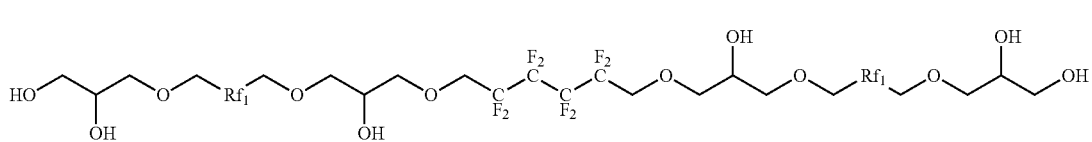

(ZH)

(in Formula (ZH), $Rf_1$ is the PFPE chain represented by Formula (4-1), and in the two $Rf_1$'s, h indicating an average degree of polymerization represents 4.5 and i indicating an average degree of polymerization represents 4.5).

The number-average molecular weight (Mn) of the compounds of Examples 1 to 58 and Comparative Examples 1 to 8 obtained as above were measured by the above-described method. The results thereof are shown in Tables 4 to 7.

Next, a lubricating layer forming solution was prepared using the compound obtained in each of Examples 1 to 58 and Comparative Examples 1 to 8 by a method shown below. Then, a lubricating layer of a magnetic recording medium was formed by a method shown below using the obtained lubricating layer forming solution, thereby obtaining a magnetic recording medium of each of Examples 1 to 58 and Comparative Examples 1 to 8.

"Lubricating Layer Forming Solution"

The compounds obtained in Examples 1 to 58 and Comparative Examples 1 to 8 were each dissolved in a fluorine-based solvent, Vertrel (registered trademark) XF (product name, manufactured by Mitsui DuPont Fluorochemicals Co., Ltd.), and diluted with Vertrel XF such that a film thickness in a case of being applied onto the protective layer was 9.0 Å to 9.5 Å, thereby obtaining a lubricating layer forming solution.

"Magnetic Recording Medium"

A magnetic recording medium in which an adhesion layer, a soft magnetic layer, a first underlayer, a second underlayer, a magnetic layer, and a protective layer had been sequentially provided on a substrate having a diameter of 65 mm was prepared. The protective layer was made of carbon.

The lubricating layer forming solutions of Examples 1 to 58 and Comparative Examples 1 to 8 were each applied on the protective layer of the magnetic recording medium, on which each of the layers up to the protective layer had been formed, by a dipping method. Furthermore, the dipping method was performed under the conditions of an immersion speed of 10 mm/see, an immersion time of 30 sec, and a pulling-up speed of 1.2 mm/sec.

Thereafter, the magnetic recording medium on which the lubricating layer forming solution had been applied was placed in a thermostatic chamber and subjected to a thermal treatment at 120° C. for 10 minutes to remove the solvent in the lubricating layer forming solution and to improve the adhesion between the protective layer and the lubricating layer, thereby forming a lubricating layer on the protective layer to obtain a magnetic recording medium.

(Measurement of Film Thickness)

The film thickness of the lubricating layer contained in the magnetic recording medium of each of Examples 1 to 58 and Comparative Examples 1 to 8 obtained as above was measured using a Fourier transform infrared spectrophotometer (FT-IR, product name: Nicolet iS50, manufactured by Thermo Fisher Scientific). The results thereof are shown in Tables 4 to 7.

Next, the magnetic recording medium of each of Examples 1 to 58 and Comparative Examples 1 to 8 was subjected to a corrosion resistance test and spin-off characteristic test, each shown below. The results thereof are shown in Tables 4 to 7.

[Corrosion Resistance Test]

The magnetic recording medium was exposed for 48 hours under the conditions of a temperature of 85° C. and a relative humidity of 90%. Thereafter, the number of the corrosion spots having a diameter of 5 μm or more generated on a surface of the magnetic recording medium was counted using an optical surface analyzer (Candela 7140 manufactured by KLA-Tencor Corporation), and evaluated based on the following evaluation criteria.

"Evaluation Criteria for Corrosion Resistance"
- A+: The number of corrosion spots was less than 100.
- A: The number of corrosion spots was 100 or more and less than 300.
- B: The number of corrosion spots was 300 or more and less than 500.
- C: The number of corrosion spots was 500 or more and less than 1,000.
- D: The number of corrosion spots was 1,000 or more.

[Spin-Off Characteristic Test]

The magnetic recording medium was mounted on a spin stand and rotated for 72 hours at a rotation speed of 10,000 rpm in an environment of 80° C. Before and after this operation, a film thickness of the lubricating layer at a position of 20 mm from the center of the magnetic recording medium was measured using FT-IR, and a film thickness reduction rate of the lubricating layer before and after the test was calculated. The spin-off characteristics were evaluated in accordance with an evaluation criteria shown below, using the calculated film thickness reduction rate.

"Evaluation Criteria for Spin-Off Characteristics"
- A+: The film thickness reduction rate is less than 2%.
- A: The film thickness reduction rate is 2% or more and less than 3%.
- B: The film thickness reduction rate is 3% or more and less than 5%.
- C: The film thickness reduction rate is 5% or more and less than 10%.
- D: The film thickness reduction rate is 10% or more.

[Comprehensive Evaluations]

From the results of the corrosion resistance test and the spin-off characteristic test, a comprehensive evaluation was performed based on the following criteria.

[Comprehensive Evaluations]
- A: Both the evaluation of the corrosion resistance test and the evaluation of the spin-off characteristic test were A+ or A.
- B: One of the evaluation of the corrosion resistance test and the evaluation of the spin-off characteristic test was B, and the other was A+, A, or B.
- C: One of the evaluation of the corrosion resistance test and the evaluation of the spin-off characteristic test was C, and the other was A+, A, B, or C.
- D: At least one of the evaluation of the corrosion resistance test and the evaluation of the spin-off characteristic test was D.

TABLE 4

| | Compound | Molecular weight | Film thickness (Å) | Corrosion resistance test | Spin-off characteristic test | Comprehensive evaluation |
|---|---|---|---|---|---|---|
| Example 1 | (AA) | 2,471 | 9.1 | A+ | A | A |
| Example 2 | (AB) | 2,524 | 9.5 | A+ | B | B |
| Example 3 | (AC) | 2,437 | 9.0 | A | A | A |
| Example 4 | (AD) | 2,501 | 9.4 | A+ | B | B |
| Example 5 | (AE) | 2,542 | 9.5 | A+ | B | B |
| Example 6 | (AF) | 2,508 | 9.2 | A+ | A | A |
| Example 7 | (AG) | 2,493 | 9.2 | A+ | A | A |
| Example 8 | (AH) | 2,482 | 9.2 | A | A+ | A |
| Example 9 | (AI) | 2,567 | 9.3 | B | A+ | B |
| Example 10 | (AJ) | 2,505 | 9.1 | A | A+ | A |
| Example 11 | (AK) | 2,543 | 9.1 | A | A+ | A |
| Example 12 | (AL) | 2,545 | 9.2 | A+ | A | A |
| Example 13 | (AM) | 2,738 | 9.0 | A+ | A | A |
| Example 14 | (AN) | 2,610 | 9.3 | A+ | B | B |
| Example 15 | (AO) | 2,483 | 9.1 | B | A+ | B |
| Example 16 | (AP) | 2,554 | 9.0 | B | A+ | B |
| Example 17 | (AQ) | 2,538 | 9.4 | B | A+ | B |
| Example 18 | (AR) | 2,376 | 9.2 | A | A+ | A |
| Example 19 | (AS) | 2,448 | 9.4 | A | A | A |
| Example 20 | (AT) | 2,465 | 9.3 | A+ | A | A |

TABLE 5

| | Compound | Molecular weight | Film thickness | Corrosion resistance test | Spin-off characteristic test | Comprehensive evaluation |
|---|---|---|---|---|---|---|
| Example 21 | (BA) | 2,475 | 9.0 | A+ | A | A |
| Example 22 | (BB) | 2,466 | 9.0 | A+ | A | A |
| Example 23 | (BC) | 2,502 | 9.1 | A+ | A | A |

TABLE 5-continued

|  | Compound | Molecular weight | Film thickness | Corrosion resistance test | Spin-off characteristic test | Comprehensive evaluation |
|---|---|---|---|---|---|---|
| Example 24 | (BD) | 2,416 | 9.3 | A+ | A | A |
| Example 25 | (BE) | 2,505 | 9.2 | A+ | A | A |
| Example 26 | (BF) | 2,604 | 9.3 | A | A+ | A |
| Example 27 | (BG) | 2,575 | 9.1 | A | A+ | A |
| Example 28 | (BH) | 2,638 | 9.4 | A | A+ | A |
| Example 29 | (BI) | 2,548 | 9.0 | A | A+ | A |
| Example 30 | (BJ) | 2,589 | 9.3 | A | B | B |
| Example 31 | (BK) | 2,528 | 9.3 | A | B | B |
| Example 32 | (BL) | 2,563 | 9.5 | A | B | B |
| Example 33 | (BM) | 2,385 | 9.3 | A | A | A |
| Example 34 | (BN) | 2,532 | 9.2 | B | A | B |
| Example 35 | (BO) | 2,641 | 9.3 | A+ | B | B |
| Example 36 | (BP) | 2,615 | 9.1 | A+ | B | B |
| Example 37 | (BQ) | 2,560 | 9.2 | A+ | A | A |
| Example 38 | (BR) | 2,496 | 9.4 | A+ | A | A |

TABLE 6

|  | Compound | Molecular weight | Film thickness (Å) | Corrosion resistance test | Spin-off characteristic test | Comprehensive evaluation |
|---|---|---|---|---|---|---|
| Example 39 | (CA) | 3,725 | 9.3 | A+ | A | A |
| Example 40 | (CB) | 3,839 | 9.2 | A+ | B | B |
| Example 41 | (CC) | 3,655 | 9.0 | A | A | A |
| Example 42 | (CD) | 3,839 | 9.1 | A+ | B | B |
| Example 43 | (CE) | 3,749 | 9.0 | A+ | A | A |
| Example 44 | (CF) | 3,723 | 9.1 | A+ | A | A |
| Example 45 | (CG) | 3,750 | 9.0 | A | A+ | A |
| Example 46 | (CH) | 3,942 | 9.4 | A+ | A | A |
| Example 47 | (CI) | 3,730 | 9.4 | B | A+ | B |
| Example 48 | (CJ) | 3,541 | 9.3 | A | A+ | A |
| Example 49 | (DA) | 3,726 | 9.5 | A+ | A | A |
| Example 50 | (DB) | 3,872 | 9.3 | B | A+ | B |
| Example 51 | (DC) | 3,669 | 9.1 | A+ | A | A |
| Example 52 | (DD) | 3,763 | 9.3 | A+ | A | A |
| Example 53 | (DE) | 3,825 | 9.2 | A+ | A | A |
| Example 54 | (DF) | 3,762 | 9.3 | A+ | A | A |
| Example 55 | (DG) | 3,644 | 9.3 | B | B | B |
| Example 56 | (EA) | 2,404 | 9.2 | A | A | A |
| Example 57 | (EB) | 2,348 | 9.4 | A | A | A |
| Example 58 | (EC) | 2,405 | 9.4 | B | A | B |

TABLE 7

|  | Compound | Molecular weight | Film thickness (Å) | Corrosion resistance test | Spin-off characteristic test | Comprehensive evaluation |
|---|---|---|---|---|---|---|
| Comparative Example 1 | (ZA) | 2,206 | 9.2 | C | D | D |
| Comparative Example 2 | (ZB) | 2,278 | 9.4 | B | D | D |
| Comparative Example 3 | (ZC) | 2,382 | 9.1 | C | D | D |
| Comparative Example 4 | (ZD) | 2,292 | 9.4 | C | D | D |
| Comparative Example 5 | (ZE) | 3,413 | 9.0 | D | C | D |
| Comparative Example 6 | (ZF) | 2,450 | 9.2 | C | C | C |
| Comparative Example 7 | (ZG) | 2,474 | 9.1 | C | C | C |
| Comparative Example 8 | (ZH) | 2,541 | 9.5 | C | B | C |

As shown in Tables 4 to 6, in all of the magnetic recording media of Examples 1 to 58, in which $R^3$ arranged between the perfluoropolyether chains ($R^2$) is the divalent linking group represented by any of Formulae (2-1) to (2-5) and the fluorine-containing ether compounds (AA) to (AT), (BA) to (BR), (CA) to (CJ), (DA) to (DG), and (EA) to (EC) satisfying Formula (1) were used, the evaluation of the corrosion resistance test and the spin-off characteristic test was any of A+, A, and B, and the comprehensive evaluation was A or B. Thus, it was confirmed that the lubricating layer of the magnetic recording medium of each of Examples 1 to 58 had good corrosion resistance and a high spin-off suppressing effect.

Moreover, Examples 1 to 20 and 39 to 48 using compounds (AA) to (AT) and (CA) to (CJ), in which $R^1$ and $R^4$ are each the terminal group represented by Formula (3-1), where p is 0, q is 0, and r is 1, and $R^2$ is the perfluoropolyether chain represented by Formula (4-1), were compared.

As a result, in Examples 1, 2, 4 to 7, 12 to 14, 39, 40, 42 to 44, and 46 using the compounds (AA), (AB), (AD) to (AG), (AL) to (AN), (CA), (CB), (CD) to (CF), and (CH), in which $R^3$ is the linking group represented by Formula (2-1) or (2-3) and Y in Formula (2) includes 3 or more carbon atoms, the evaluation of the corrosion resistance test was A+, which was good.

In addition, in Examples 8 to 11, 15 to 17, 45, and 47 using the compounds (AH) to (AK), (AO) to (AQ), (CG), and (CI), in which $R^3$ is the linking group represented by Formula (2-2) or Formula (2-4), the evaluation of the spin-off characteristic test was A+, which showed good results.

Moreover, Examples 18 to 20 using the compound (AR) to (AT), in which $R^3$ was the linking group represented by Formula (2-5), were compared. As a result, in Example 18 using the compound (AR), in which $R^3$ includes the smallest number of carbon atoms, the evaluation of the spin-off resistance test was A+, which showed good results. In addition, in Example 20 using the compound (AT), in which $R^3$ includes the largest number of carbon atoms, the evaluation of the corrosion resistance test was A+, which showed good results.

On the other hand, in Comparative Examples 1 to 8 using the compounds (ZA) to (ZH), all the evaluations of the corrosion resistance test and the spin-off characteristic test were any of B, C, and D, and the comprehensive evaluation was either of C and D, as shown in Table 7.

More specifically, in the compound (ZA) used in Comparative Example 1 and the compound (ZB) used in Comparative Example 2, only one hydroxy group was included in the linking group between the perfluoropolyether chains. Therefore, it is considered that a sufficient interaction between the linking group between the perfluoropolyether chains and the protective layer is not obtained, the central part of the fluorine-containing ether compound floats, and thus, the fluorine-containing ether compound in the lubricating layer is likely to scatter and the result in the spin-off characteristic test was D.

In the compound (ZC) used in Comparative Example 3 and the compound (ZD) used in Comparative Example 4, two hydroxy groups included in the linking group between the perfluoropolyether chains are bonded only through a rigid alkylene chain. Therefore, it is considered that free motion of the hydroxy group included in the linking group is hindered and the hydroxy group is not likely to be involved in the interaction with the polar group in the other fluorine-containing ether compound present in active points on the protective layer or the lubricating layer, and the evaluation in the spin-off characteristic test was D.

Moreover, in the compound (ZE) used in Comparative Example 5, the perfluoropolyether chains are bonded to each other by a flexible linking group having two hydroxy groups. However, since the distance between the two hydroxy groups contained in the linking group is short, the two hydroxy groups contained in the linking group easily interact with each other in the molecule. Therefore, it is considered that since the two hydroxy groups contained in the linking group are not likely to be involved in the interaction with the polar group included in the other fluorine-containing ether compound molecules present in the lubricating layer and water which causes corrosion is likely to be incorporated in the vicinity of the linking group, the evaluation in the corrosion resistance test was D.

In addition, the compound (ZF) used in Comparative Example 6 and the compound (ZG) used in Comparative Example 7 have two or three hydroxy groups in the linking group between the perfluoropolyether chains. However, since the linking group between the perfluoropolyether chains includes a rigid ring structure in the compounds (ZF) and (ZG), the motion of the hydroxy group included in the linking group is restricted by the rigid ring structure. Therefore, it is considered that a sufficient interaction between the hydroxy group included in the linking group and the protective layer was not obtained, resulting in a result of C in the corrosion resistance test and the spin-off characteristic test.

In addition, in the compound (ZH) used in Comparative Example 8, the perfluoropolyether chains are bonded to each other by a linking group having two hydroxy groups, and a partially fluorinated saturated hydrocarbon group is arranged between the two hydroxy groups. In Comparative Example 8, since the partially fluorinated saturated hydrocarbon group is arranged between the two hydroxy groups included in the linking group between the perfluoropolyether chains, the evaluation of the corrosion resistance test and the spin-off characteristic test is higher than that of Comparative Example 5 using the compound (ZE). However, it was considered that since both a1 and a2 in Formula (2) of the compound (ZH) used in Comparative Example 8 were 0, the hydrophobicity of the linking group between the perfluoropolyether chains was insufficient and the result of the corrosion resistance test was C.

INDUSTRIAL APPLICABILITY

By using the lubricant for a magnetic recording medium including the fluorine-containing ether compound of the present invention, a lubricating layer having a good corrosion resistance and a high spin-off suppressing effect can be formed even in a case where the thickness is small.

REFERENCE SIGNS LIST

10: magnetic recording medium
11: substrate
12: adhesion layer
13: soft magnetic layer
14: first underlayer
15: second underlayer
16: magnetic layer
17: protective layer
18: lubricating layer

What is claimed is:

1. A fluorine-containing ether compound represented by Formula (1),

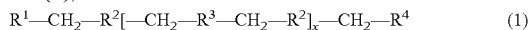

(in Formula (1), x represents 1 or 2; $R^2$ is a perfluoropolyether chain; (x+1) pieces of $R^2$'s may be partially or entirely the same as or different from each other; $R^3$ is a divalent linking group represented by Formula (2); in a case where x is 2, two $R^3$'s may be the same as or different from each other; $R^1$ and $R^4$ are each a terminal group having 1 to 50 carbon atoms, which has 1 to 4 polar groups; and $R^1$ and $R^4$ may be the same as or different from each other)

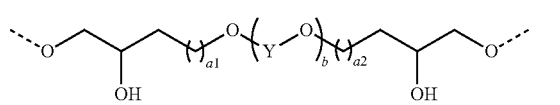

(in Formula (2), a1 and a2 each represent an integer of 0 to 5; a1 and a2 may be the same as or different from each other, and at least one of a1 and a2 is 1 or more; b represents 0 or 1; Y is an acyclic divalent saturated hydrocarbon group having 2 to 8 carbon atoms; the saturated hydrocarbon group is a partially fluorinated saturated hydrocarbon group which does not include an ether oxygen atom between carbon atoms, or a non-fluorinated saturated hydrocarbon group which may include an ether oxygen atom between carbon atoms and may have only one polar group, provided that in a case where the non-fluorinated saturated hydrocarbon group has the polar group, the polar group is bonded to a carbon atom other than a bonding terminal of Y; and an oxygen atom at a left terminal of Formula (2) is bonded to a methylene group on an $R^1$ side in Formula (1), and an oxygen atom at a right terminal is bonded to a methylene group on an $R^4$ side in Formula (1)).

2. The fluorine-containing ether compound according to claim 1,
wherein Formula (2) is a linking group represented by any of Formulae (2-1) to (2-5),

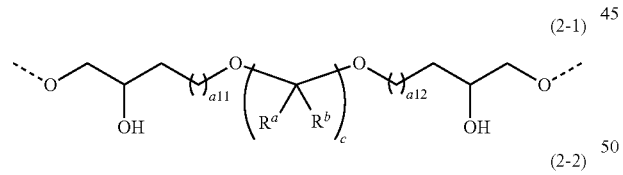

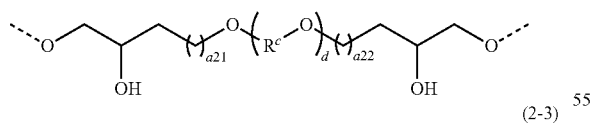

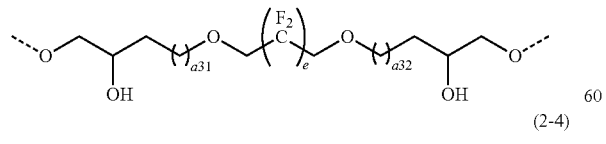

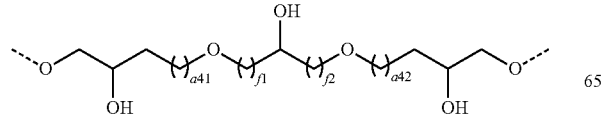

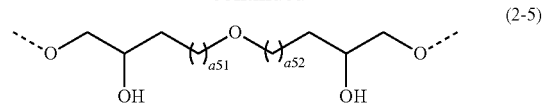

(in Formula (2-1), a11 and a12 each represent an integer of 0 to 5; a11 and a12 may be the same as or different from each other; a total value of a11 and a12 is 1 to 6; c represents an integer of 2 to 8; c pieces of $R^a$'s and $R^b$'s each independently represent a hydrogen atom or a methyl group; a total number of carbon atoms included in the c pieces of ($-CR^aR^b-$)'s is 2 to 8; and an oxygen atom at a left terminal of Formula (2-1) is bonded to the methylene group on the $R^1$ side in Formula (1), and an oxygen atom at a right terminal is bonded to the methylene group on the $R^4$ side in Formula (1))

(in Formula (2-2), a21 and a22 each represent an integer of 0 to 5; a21 and a22 may be the same as or different from each other; a total value of a21 and a22 is 1 to 6; d represents an integer of 2 to 4; d pieces of $R^c$'s each independently represent $-CH_2CH_2-$, $-CH_2CH_2CH_2-$, $-CH(CH_3)CH_2-$, or $-CH_2CH(CH_3)-$; a total number of carbon atoms included in the d pieces of $R^c$'s is 4 to 8; and an oxygen atom at a left terminal of Formula (2-2) is bonded to the methylene group on the $R^1$ side in Formula (1), and an oxygen atom at a right terminal is bonded to the methylene group on the $R^4$ side in Formula (1))

(in Formula (2-3), a31 and a32 each represent an integer of 0 to 5; a31 and a32 may be the same as or different from each other; a total value of a31 and a32 is 1 to 6; e represents an integer of 1 to 6; and an oxygen atom at a left terminal of Formula (2-3) is bonded to the methylene group on the $R^1$ side in Formula (1), and an oxygen atom at a right terminal is bonded to the methylene group on the $R^4$ side in Formula (1))

(in Formula (2-4), a41 and a42 each represent an integer of 1 to 5; a41 and a42 may be the same as or different from each other; a total value of a41 and a42 is 2 to 6; f1 and f2 each represent an integer of 1 to 6; f1 and f2 may be the same as or different from each other, and a total value of f1 and f2 is 2 to 7; and an oxygen atom at a left terminal of Formula (2-4) is bonded to the methylene group on the $R^1$ side in Formula (1), and an oxygen atom at a right terminal is bonded to the methylene group on the $R^4$ side in Formula (1))

(in Formula (2-5), a51 and a52 each represent an integer of 0 to 5; a51 and a52 may be the same as or different from each other; a total value of a51 and a52 is 1 to 6; and an oxygen atom at a left terminal of Formula (2-5) is bonded to the methylene group on the $R^1$ side in Formula (1), and an oxygen atom at a right terminal is bonded to the methylene group on the $R^4$ side in Formula (1)).

3. The fluorine-containing ether compound according to claim 1,
wherein $R^1$ and $R^4$ in Formula (1) are each independently a terminal group represented by Formula (3),

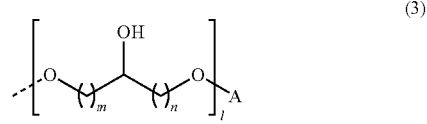

(in Formula (3), l represents an integer of 1 to 3; l pieces of m's each independently represent an integer of 1 to 6; l pieces of n's each independently represent an integer of 1 to 6; in one repeating unit, at least one of m and n is 1; and A represents an alkyl group which may have a polar group, an organic group including a carbon-carbon unsaturated bond, which may have a polar group, or a hydrogen atom).

4. The fluorine-containing ether compound according to claim 1,
wherein $R^1$ and $R^4$ in Formula (1) are each independently a terminal group represented by Formula (3-1) or (3-2),

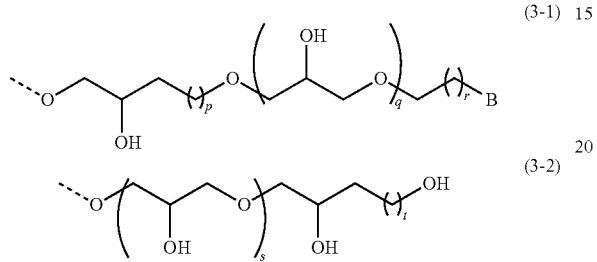

(3-1)

(3-2)

(in Formula (3-1), p represents an integer of 0 to 3, q represents an integer of 0 to 2, and r represents an integer of 1 to 5; a total value of p and r is 1 to 5; and B represents a polar group)

(in Formula (3-2), s represents an integer of 0 to 2, and t represents an integer of 1 to 5).

5. The fluorine-containing ether compound according to claim 1,
wherein $R^1$ and $R^4$ in Formula (1) are the same as each other.

6. The fluorine-containing ether compound according to claim 1,
wherein a total number of the polar groups contained in $R^1$ and the polar groups contained in $R^4$ in Formula (1) is 2 to 6.

7. The fluorine-containing ether compound according to claim 1,
wherein all of the polar groups contained in $R^1$, the polar groups contained in $R^3$, and the polar groups contained in $R^4$ in Formula (1) are hydroxy groups.

8. The fluorine-containing ether compound according to claim 1,
wherein the (x+1) pieces of $R^2$'s in Formula (1) are each independently a perfluoropolyether chain represented by Formula (4),

(4)

(in Formula (4), w2, w3, w4, and w5 each indicate an average degree of polymerization and each independently represent 0 to 20, provided that all of w2, w3, w4, and w5 are not 0 at the same time; w1 and w6 are each an average value indicating the number of $CF_2$'s and each independently represent 1 to 3; and ($CF_2O$), ($CF_2CF_2O$), ($CF_2CF_2CF_2O$), and ($CF_2CF_2CF_2CF_2O$), which are repeating units in Formula (4), is not particularly limited in the sequence order).

9. The fluorine-containing ether compound according to claim 1,
wherein the (x+1) pieces of $R^2$'s in Formula (1) are each independently any one selected from perfluoropolyether chains represented by Formulae (4-1) to (4-4),

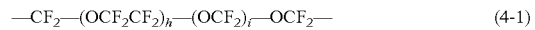

(4-1)

(in Formula (4-1), h and i each indicate an average degree of polymerization, h represents 1 to 20, and i represents 0 to 20)

(4-2)

(in Formula (4-2), j indicates an average degree of polymerization and represents 1 to 15)

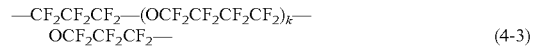

(4-3)

(in Formula (4-3), k indicates an average degree of polymerization and represents 1 to 10)

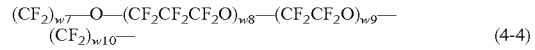

(4-4)

(in Formula (4-4), w8 and w9 each indicate an average degree of polymerization and each independently represent 1 to 20; and w7 and w10 are each an average value indicating the number of $CF_2$'s and each independently represent 1 or 2).

10. The fluorine-containing ether compound according to claim 1,
wherein the fluorine-containing ether compound has a number-average molecular weight in a range of 500 to 10,000.

11. A lubricant for a magnetic recording medium, comprising:
the fluorine-containing ether compound according to claim 1.

12. A magnetic recording medium comprising, in the following order, on a substrate, at least:
a magnetic layer;
a protective layer; and
a lubricating layer,
wherein the lubricating layer includes the fluorine-containing ether compound according to claim 1.

13. The magnetic recording medium according to claim 12,
wherein an average film thickness of the lubricating layer is 0.5 nm to 2.0 nm.

* * * * *